(12) United States Patent
Fukui

(10) Patent No.: US 12,394,092 B2
(45) Date of Patent: Aug. 19, 2025

(54) IMAGE PICKUP APPARATUS USED AS ACTION CAMERA, CALIBRATOR, CONTROL METHODS THEREFOR, AND STORAGE MEDIA STORING CONTROL PROGRAMS THEREFOR

(71) Applicant: CANON KABUSHIKI KAISHA, Tokyo (JP)

(72) Inventor: Takaaki Fukui, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 18/397,080

(22) Filed: Dec. 27, 2023

(65) Prior Publication Data

US 2024/0233181 A1     Jul. 11, 2024

(30) Foreign Application Priority Data

Jan. 5, 2023 (JP) ................................. 2023-000730

(51) Int. Cl.
*G06T 7/80* (2017.01)
*H04N 5/262* (2006.01)
(Continued)

(52) U.S. Cl.
CPC ............. *G06T 7/80* (2017.01); *H04N 5/2628* (2013.01); *H04N 17/002* (2013.01);
(Continued)

(58) Field of Classification Search
CPC . G06T 7/80; G06T 2207/30196; H04N 23/67; H04N 23/611; H04N 23/62; H04N 5/2628; H04N 17/002; H04N 23/698
See application file for complete search history.

(56) References Cited

U.S. PATENT DOCUMENTS 9,898,868 B2 * 2/2018 Aonuma ............... G06T 19/006
10,681,269 B2 * 6/2020 Nakao .................... G06V 20/17
(Continued)

FOREIGN PATENT DOCUMENTS

CN       105259125 B  * 11/2015
JP       2007-074033 A    3/2007

OTHER PUBLICATIONS

Xiang, Shao-qing translation of CN 105259125 B Nov. 10, 2015 (Year: 2015).*

*Primary Examiner* — Zaihan Jiang
(74) *Attorney, Agent, or Firm* — Venable LLP

(57) ABSTRACT

An image pickup apparatus that eliminates manual change of an image pickup direction during an image pickup operation. The image pickup apparatus is worn on a body part of a user other than a head and includes an image pickup unit that obtains a wide-angle image, a memory device that stores instructions, and a processor that executes the instructions to: detect a visual-line direction of the user, set an observation direction of the image pickup unit to be parallel to the visual-line direction, obtain an image extraction position from the wide-angle image, detect an object in the observation direction from the wide-angle image in picking up an image of the object, detect an object distance from the image pickup unit to the object, correct the image extraction position according to the visual-line direction and the object distance, and output and record a corrected image extraction position to a memory.

16 Claims, 64 Drawing Sheets

(51) Int. Cl.
  *H04N 17/00*     (2006.01)
  *H04N 23/611*    (2023.01)
  *H04N 23/62*     (2023.01)
  *H04N 23/67*     (2023.01)
  *H04N 23/698*    (2023.01)

(52) U.S. Cl.
  CPC .......... *H04N 23/611* (2023.01); *H04N 23/62* (2023.01); *H04N 23/67* (2023.01); *G06T 2207/30196* (2013.01); *H04N 23/698* (2023.01)

(56) References Cited

U.S. PATENT DOCUMENTS

| | | | |
|---|---|---|---|
| 2007/0058136 A1* | 3/2007 | Sakai | G03B 21/26 |
| | | | 353/34 |
| 2014/0104423 A1* | 4/2014 | Choi | G06V 20/58 |
| | | | 348/148 |
| 2016/0090100 A1* | 3/2016 | Oyama | B62D 15/025 |
| | | | 701/23 |
| 2017/0313304 A1* | 11/2017 | Shiraishi | B60W 30/04 |
| 2018/0268551 A1* | 9/2018 | Lee | G06T 7/00 |
| 2020/0211256 A1* | 7/2020 | Kim | G06T 17/05 |
| 2021/0360205 A1* | 11/2021 | Alakarhu | H04N 7/188 |
| 2022/0132018 A1* | 4/2022 | Allen | H04N 7/186 |
| 2022/0309700 A1* | 9/2022 | Ito | H04N 23/45 |
| 2023/0169685 A1* | 6/2023 | Mori | H04N 7/181 |
| | | | 348/187 |
| 2023/0335253 A1* | 10/2023 | Connor | G06F 3/013 |

* cited by examiner

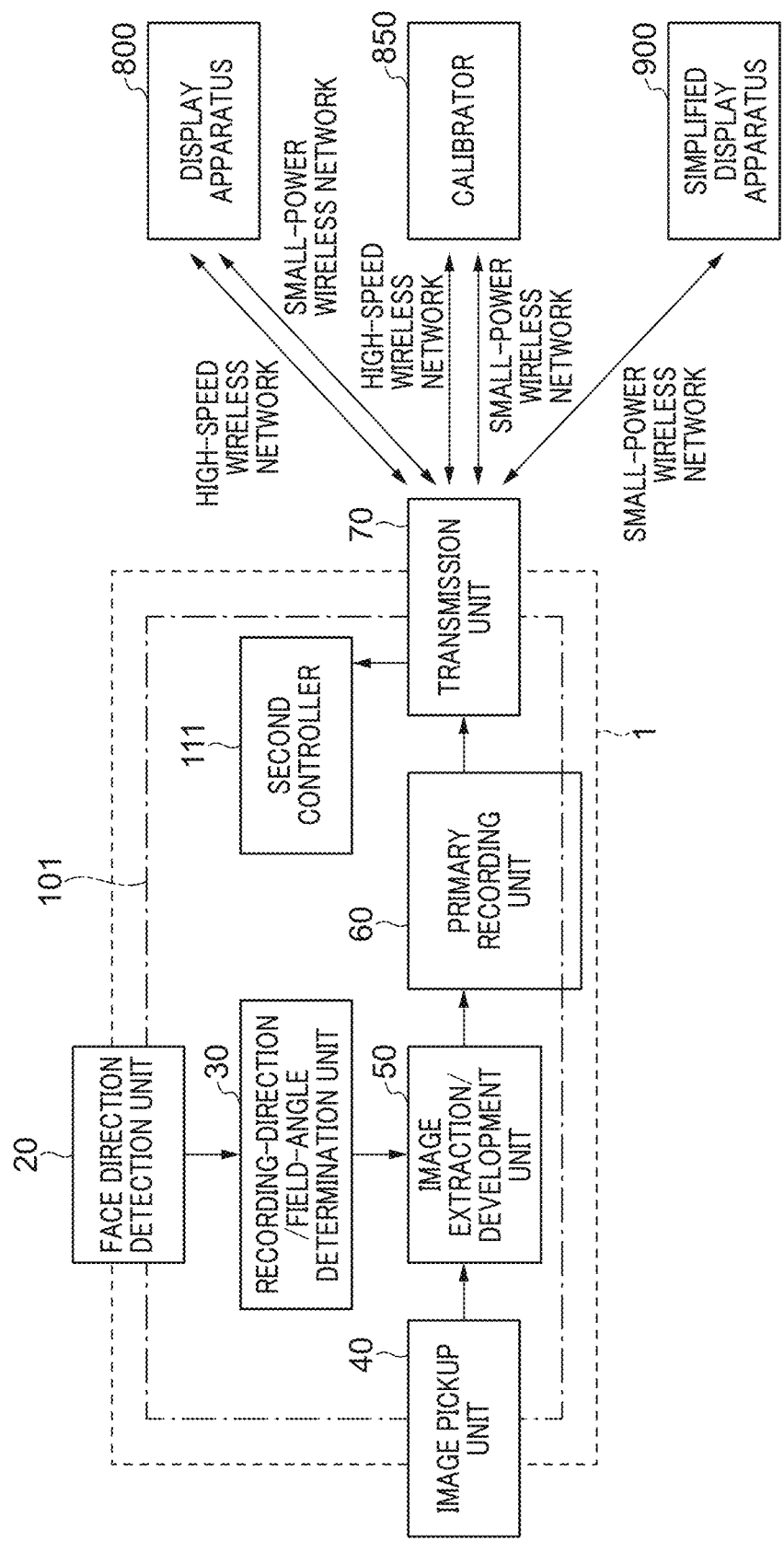

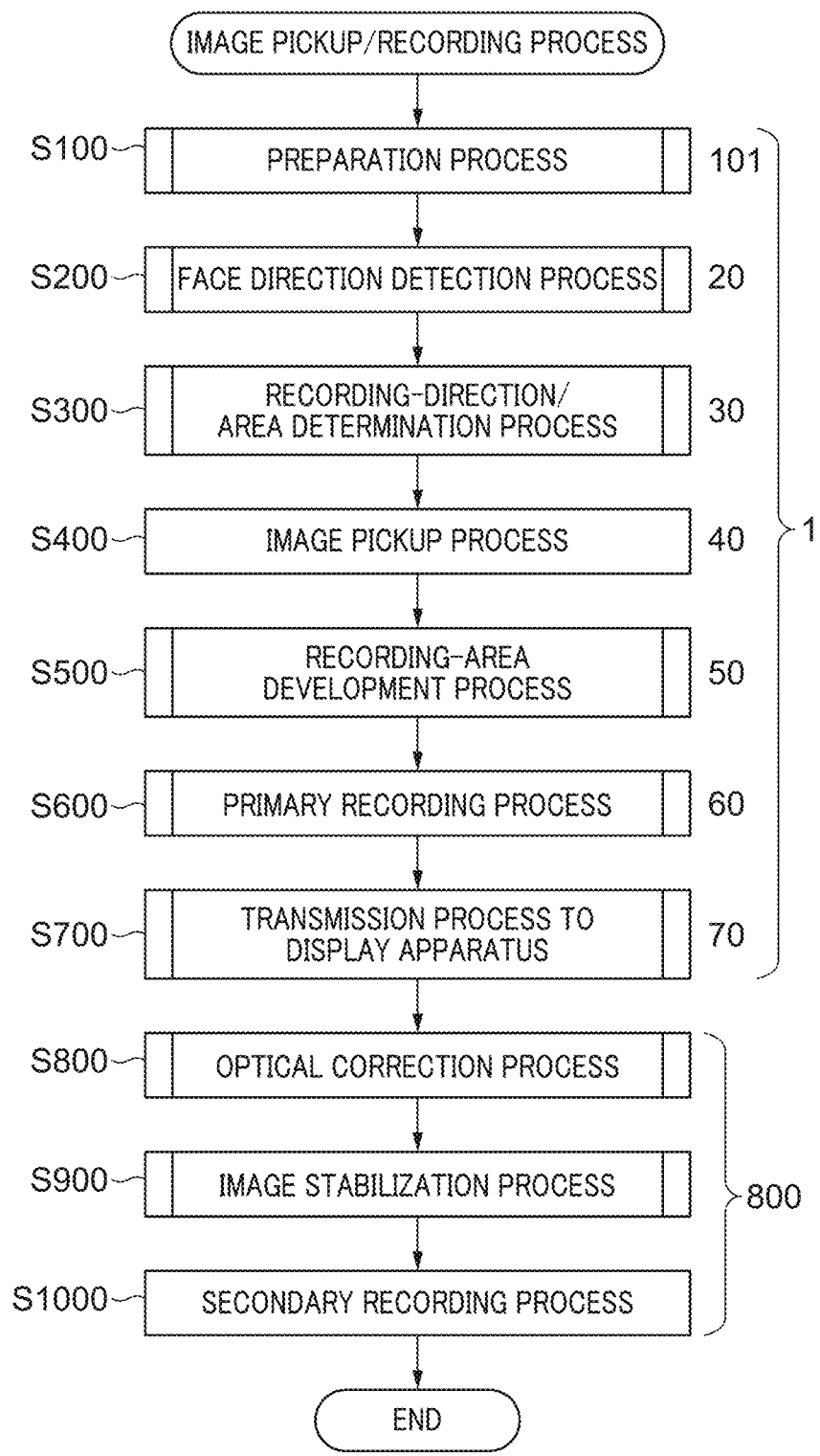

*FIG. 18A*  *FIG. 18B*  *FIG. 18C*
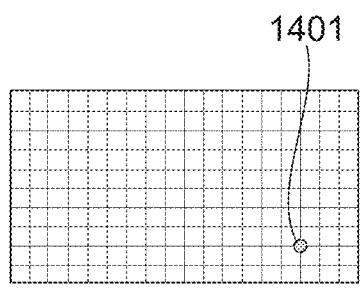
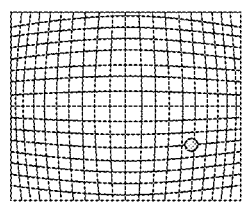
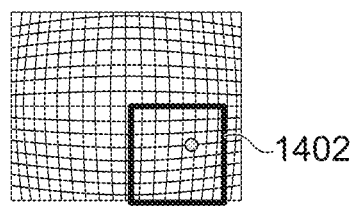
OBJECT  IMAGE ON IMAGE SENSOR  DEVELOPMENT AREA
*FIG. 18D*  *FIG. 18E*  *FIG. 18F*
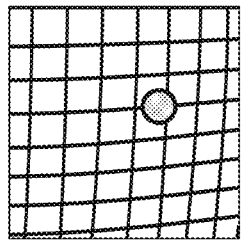
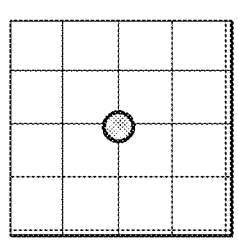
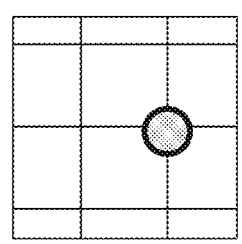
EXTRACTION AND DEVELOPMENT  AFTER DISTORTION CORRECTION PROCESS  AFTER IMAGE STABILIZATION

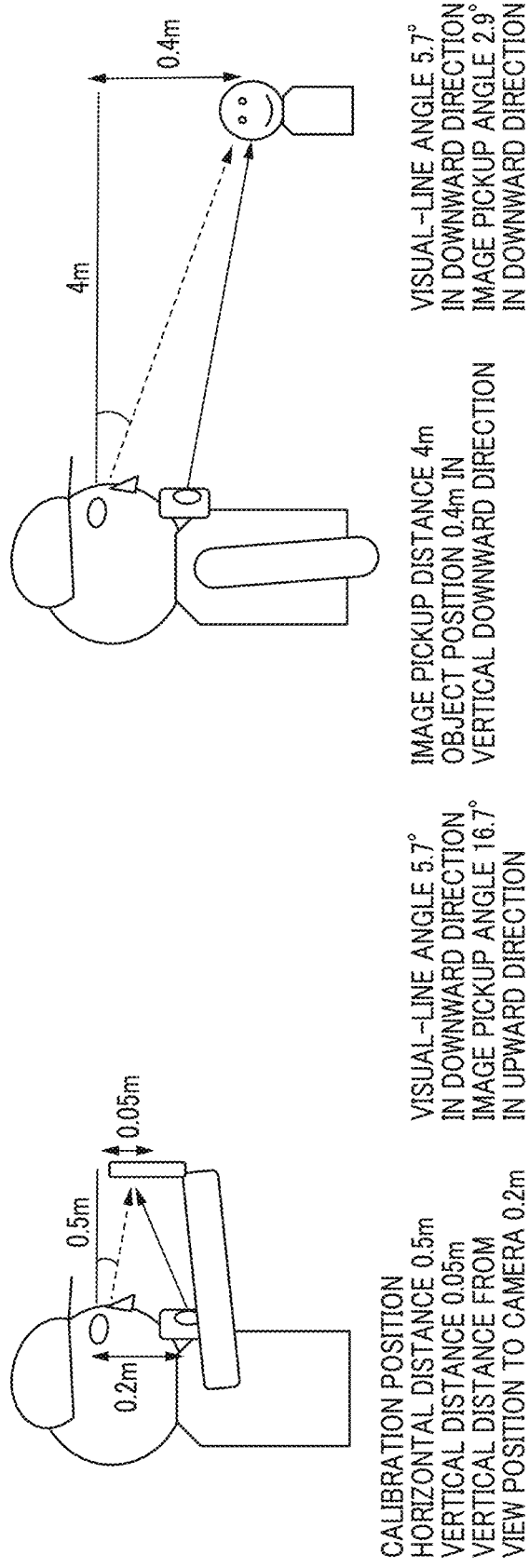

| IMAGE PICKUP ANGLE (DEGREES) | | OBJECT DISTANCE (m) | | | | | |
|---|---|---|---|---|---|---|---|
| | | 0.5 | 1 | 2 | 4 | 8 | 16 |
| VISUAL-LINE ANGLE (DEGREES) | -30 | -44.3 | -37.9 | -34.1 | -32.1 | -31.1 | -30.5 |
| | -15 | -33.7 | -25.1 | -20.2 | -17.6 | -16.3 | -15.7 |
| | 0 | -21.8 | -11.3 | -5.7 | -2.9 | -1.4 | -0.7 |
| | 15 | -7.5 | 3.9 | 9.5 | 12.3 | 13.7 | 14.3 |
| | 30 | 10.1 | 20.7 | 25.5 | 27.8 | 28.9 | 29.5 |
| | 45 | 31.0 | 38.7 | 42.0 | 43.5 | 44.3 | 44.6 |

| EXTRACTION POSITION CORRECTION AMOUNT | | OBJECT DISTANCE (m) | | | | | |
|---|---|---|---|---|---|---|---|
| | | 0.5 | 1 | 2 | 4 | 8 | 16 |
| VISUAL-LINE ANGLE (DEGREES) | −30 | 14.3 | 7.9 | 4.1 | 2.1 | 1.1 | 0.5 |
| | −15 | 18.7 | 10.1 | 5.2 | 2.6 | 1.3 | 0.7 |
| | 0 | 21.8 | 11.3 | 5.7 | 2.9 | 1.4 | 0.7 |
| | 15 | 22.5 | 11.1 | 5.5 | 2.7 | 1.3 | 0.7 |
| | 30 | 19.9 | 9.3 | 4.5 | 2.2 | 1.1 | 0.5 |
| | 45 | 14.0 | 6.3 | 3.0 | 1.5 | 0.7 | 0.4 |

IMAGE PICKUP APPARATUS USED AS ACTION CAMERA, CALIBRATOR, CONTROL METHODS THEREFOR, AND STORAGE MEDIA STORING CONTROL PROGRAMS THEREFOR

BACKGROUND OF THE INVENTION

Field of the Invention

The present invention relates to an image pickup apparatus used as an action camera, a calibrator, control methods therefor, and storage media storing control programs therefor.

Description of the Related Art

When a user picks up an image of an object with a camera, the user needs to continuously direct the camera toward the object. Accordingly, the user may find it difficult to manage actions other than an image pickup action because the user is busy in an image pickup operation. Further, the user may find it difficult to focus their attention on their immediate surroundings because the user must focus their attention on the image pickup operation.

For example, if the user is a parent, the user cannot play with a child while performing an image pickup operation with the child as the object, and the image pickup operation becomes impossible while playing with the child.

As a further example, if the user performs an image pickup operation while watching a sport game, the user cannot focus their attention on the game (e.g., cheer or remember game contents), and the image pickup operation becomes impossible while focusing attention to watch the sports game. Similarly, when a user performs an image pickup operation during group travel, the user cannot focus their attention on the travel experience to the same extent as other group members, and when the user gives priority to their travel experience, the image pickup operation suffers as a result.

As a method for solving these matters, methods have been contemplated wherein a camera is fixed to the head of a user using a fixing-to-head accessory to pick up an image in an observing direction. This enables the user to perform an image pickup operation without being occupied with the image pickup operation.

However, the above method needs a troublesome action that equips the head with the fixing-to-head accessory 902 to which a main body of an action camera 901 is fixed, as shown in FIG. 34A. Moreover, as shown in FIG. 34B, when the user equips the head with the action camera 901 with the fixing-to-head accessory 902, appearance is bad and also a hairstyle of the user is disheveled. Furthermore, the user may feel uneasy about the existence of the fixing-to-head accessory 902 and the action camera 901 because of their weights, and may worry about having a bad appearance to third persons. Accordingly, the user may find it difficult to perform an image pickup operation because the user cannot focus attention on their experience in the state shown in FIG. 34B, or because the user feels resistance to the style shown in FIG. 34B.

Moreover, as a method to solve the above problem, Japanese Laid-Open Patent Publication (Kokai) No. 2007-74033 (JP 2007-74033A) discloses a technique that uses a second camera that picks up a user in addition to a first camera that picks up an object. This technique calculates a moving direction and visual-line direction of a user from an image picked up by the second camera, determines an image pickup direction of the first camera, and picks up an image of an object estimated on the basis of user's liking and state.

However, since the second camera of the above publication picks up an image of the user from a position distant from the user, the second camera needs high optical performance in order to calculate the moving direction and visual-line direction of the user from the image picked up by the second camera. Moreover, since high arithmetic processing capability is needed for processing the image picked up by the second camera, a scale of an apparatus becomes large. Furthermore, even if the high optical performance and the high arithmetic processing capability are satisfied, the user's observation direction cannot be precisely calculated. Accordingly, since an object that the user wants to pick up cannot be estimated with sufficient accuracy on the basis of the user's liking and state, an image other than what is wanted by the user may be picked up.

Further, in a scene in which an image in the visual-line direction is picked up, the user often moves around, and in consideration of such an image pickup situation, the first camera is desirably a wearable camera that can be mounted on the user. When a wearable camera is applied as the first camera, it is desirable to mount the wearable camera at a position other than the head of the user as described above. However, in this case, there is a problem in that parallax occurs between the visual-line direction and the actual image pickup area because there is a distance between an eye position (a view position) and the first camera. For example, it is assumed that the first camera is a wearable camera that is worn under the chin of the face and picks up an image in the object direction and the second camera detects the direction in which the face is facing. In this case, when the direction (visual-line direction) in which the user's face is directed is detected from the image of the second camera and an image in the detected visual-line direction is extracted from the image of the first camera, the position (field angle) to be actually extracted is determined according to the distance between the first camera and the object. Specifically, as the distance to the object becomes shorter, the field angle needs to be shifted downward.

As described above, there is a problem in that it is difficult to extract an image of the preferable field angle from the image picked up by the wearable camera because parallax occurs in a case where there is a distance between the view position of the user and the wearable camera that picks up an image in the object direction.

SUMMARY OF THE INVENTION

The present invention provides an image pickup apparatus, a calibrator, control methods therefor, and storage media storing control programs therefor, which eliminate manual change of an image pickup direction during an image pickup operation, and which can easily obtain an image that records experience while allowing a user to focus attention on the experience.

Accordingly, an aspect of the present invention provides an image pickup apparatus to be worn on a body part of a user other than a head of the user. The image pickup apparatus includes a first image pickup unit that obtains a wide-angle image, a memory device that stores a set of instructions, and at least one processor that executes the set of instructions to: detect a visual-line direction of the user, set an observation direction of the first image pickup unit to be parallel to the visual-line direction, obtain an image extraction position from the wide-angle image, detect an object in the observation direction from the wide-angle image in picking up an image of the object, detect an object distance from the first image pickup unit to the object, correct the image extraction position according to the visual-line direction and the object distance, and output and record a corrected image extraction position to a memory.

According to the present invention, manual change of an image pickup direction during an image pickup operation becomes unnecessary, and an image that records experience can be easily obtained while allowing a user to focus attention on the experience.

Further features of the present invention will become apparent from the following description of exemplary embodiments with reference to the attached drawings.

BRIEF DESCRIPTION OF THE DRAWINGS

FIG. 4 is a functional block diagram showing the camera body according the first embodiment.

FIG. 7A is a flowchart schematically showing an image pickup/recording process according to the first embodiment executed by the camera body and display apparatus.

FIG. 18A through FIG. 18F are views for describing a process of applying distortion correction in a step S803 in FIG. 17.

FIG. 29B is a schematic view describing correction in the step S8004 in FIG. 27 with respect to an extraction position calculated during calibration at an image pickup angle different from that in FIG. 29A.

DESCRIPTION OF THE EMBODIMENTS

Figure 1A:
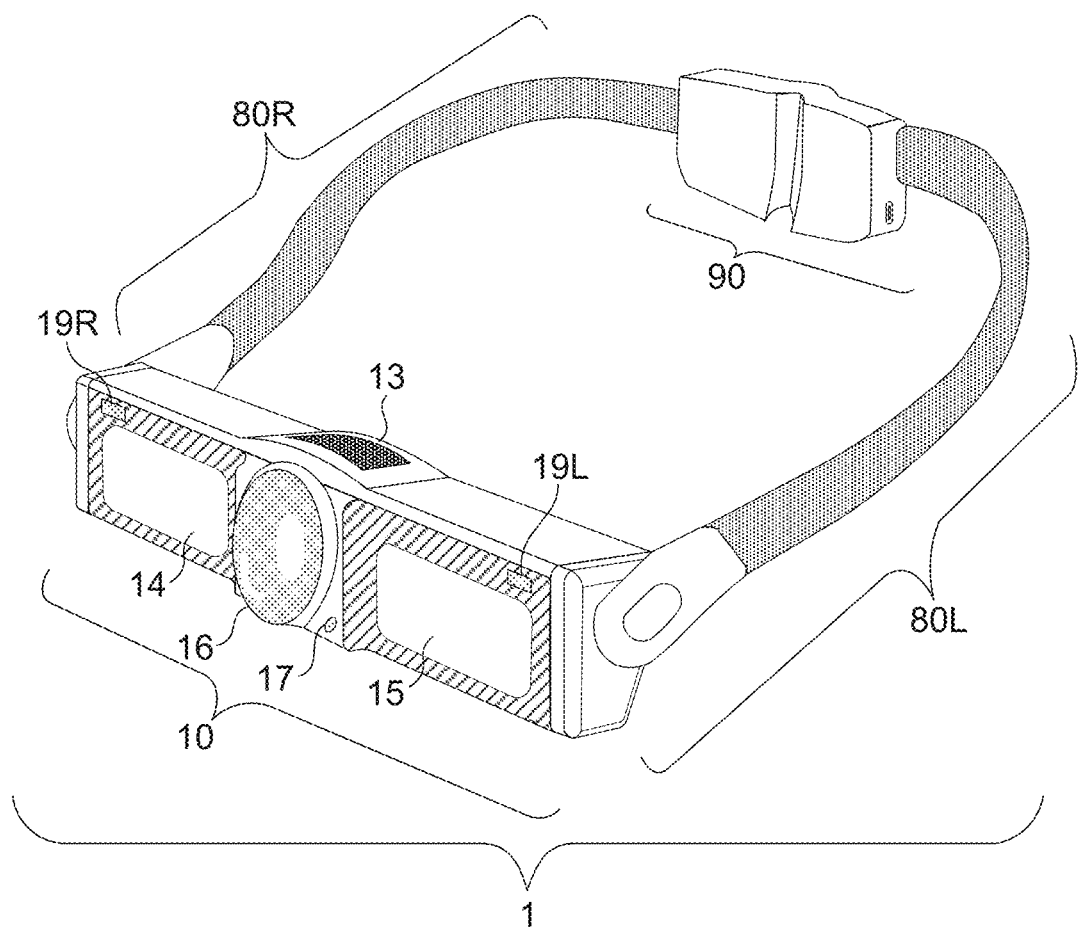
FIG. 1A is an external view showing a camera body including an image-pickup/detection unit as an image pickup apparatus according to a first embodiment.

Hereafter, embodiments according to the present invention will be described in detail by referring to the drawings.

FIG. 1A through FIG. 1D are views for describing a camera system consisting of a camera body 1 and a display apparatus 800 that is separated from the camera body 1. The camera body 1 includes an image-pickup/detection unit 10 as a wearable image pickup apparatus according to a first embodiment. Although the camera body 1 and the display apparatus 800 are separated devices in this embodiment, they may be integrated.

FIG. 1A is an external view showing the camera body 1. The camera body 1 is provided with the image-pickup/detection unit 10, a battery unit 90, a right connection member 80R, and a left connection member 80L as shown in FIG. 1A. The right connection member 80R connects the image-pickup/detection unit 10 and the battery unit 90 on the right side of a user's body (left side in FIG. 1A). The left connection member 80L connects the image-pickup/detection unit 10 and the battery unit 90 on the left side of the user's body (right side in FIG. 1A).

The image-pickup/detection unit 10 is provided with a face direction detection window 13, a start switch 14, a stop switch 15, an image pickup lens 16, an LED 17, and microphones 19L and 19R.

The face direction detection window 13 permits transmission of infrared light projected from infrared LEDs 22 (see FIG. 5) built in the image-pickup/detection unit 10 to detect positions of face parts of the user. The face direction detection window 13 also permits transmission of reflected infrared light from the face.

The start switch 14 is used to start an image pickup operation. The stop switch 15 is used to stop the image pickup operation. The image pickup lens 16 guides light to be picked up to a solid state image sensor 42 (see FIG. 5) inside the image-pickup/detection unit 10. The LED 17 indicates a state that the image pickup operation is on-going. Additionally or alternatively, the LED 17 can function as a warning light.

The microphones 19R and 19L take in peripheral sound. The microphone 19L takes in sound of the left side of user's periphery (right side in FIG. 1A). The microphone 19R takes in sound of the right side of the user's periphery (left side in FIG. 1A).

Figure 1B:
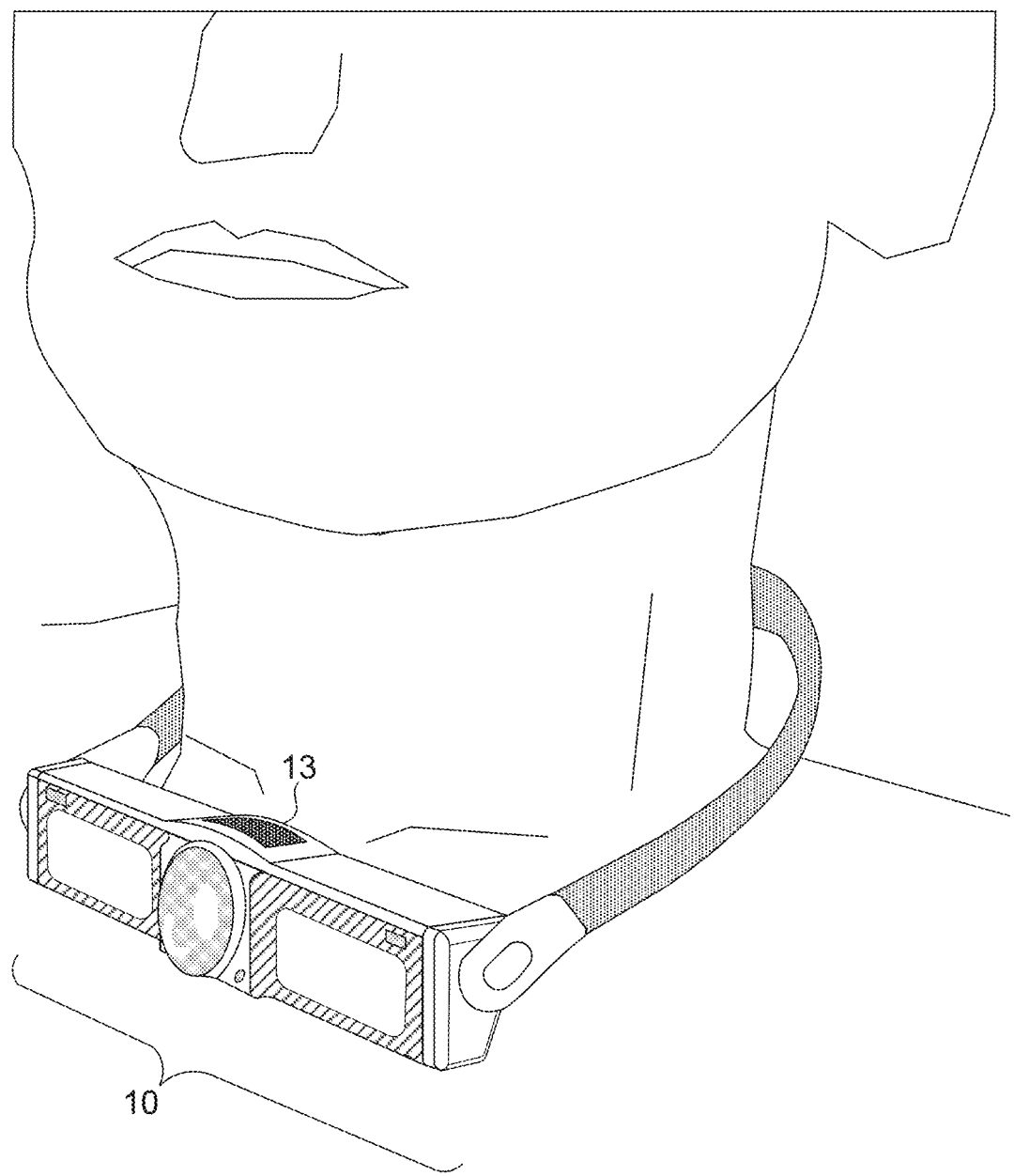
FIG. 1B is a view showing a state where a user wears the camera body.

FIG. 1B is a view showing a state where the user wears the camera body 1.

When the user wears the camera body 1 so that the battery unit 90 is located proximate to a user's back side and the image-pickup/detection unit 10 is located proximate to the front side of the user's body, the image-pickup/detection unit 10 is supported while being energized in a direction toward a chest by the left and right connection members 80L and 80R that are respectively connected to the left and right ends of the image-pickup/detection unit 10. Thereby, the image-pickup/detection unit 10 is positioned in front of clavicles of the user. At this time, the face direction detection window 13 is located under a jaw of the user. An infrared condenser lens 26 shown in FIG. 2E mentioned later is arranged inside the face direction detection window 13. An optical axis (detection optical axis) of the infrared condenser lens 26 is directed to the user's face and is directed to a different direction from an optical axis (image pickup optical axis) of the image pickup lens 16. A face direction detection unit 20 (a visual-line direction detection unit, an observation direction setting unit, and a second image pickup unit) mentioned later including the infrared condenser lens 26 detects a user's observation direction on the basis of the positions of face parts and sets an observation direction of an image pickup unit 40 (a first image pickup unit) mentioned later. This enables the image pickup unit 40 to pick up an image of an object in the observation direction. Adjustment of the setting position due to individual difference of a body shape and difference in clothes will be mentioned later.

Moreover, since the image-pickup/detection unit 10 is arranged in the front side of the body and the battery unit 90 is arranged in the back face in this way, weight of the camera body 1 is distributed, which reduces user's fatigue and reduces displacement of the camera body 1 due to centrifugal force caused by movement of the user.

Although the example in which the user wears the camera body 1 so that the image-pickup/detection unit 10 will be located in front of the clavicles of the user is described in this embodiment, this example is not imperative. That is, the user may wear the camera body 1 in any position of the user's body part other than the head as long as the camera body 1 can detect the user's observation direction and the image pickup unit 40 can pick up an image of an object in the observation direction.

Figure 1C:
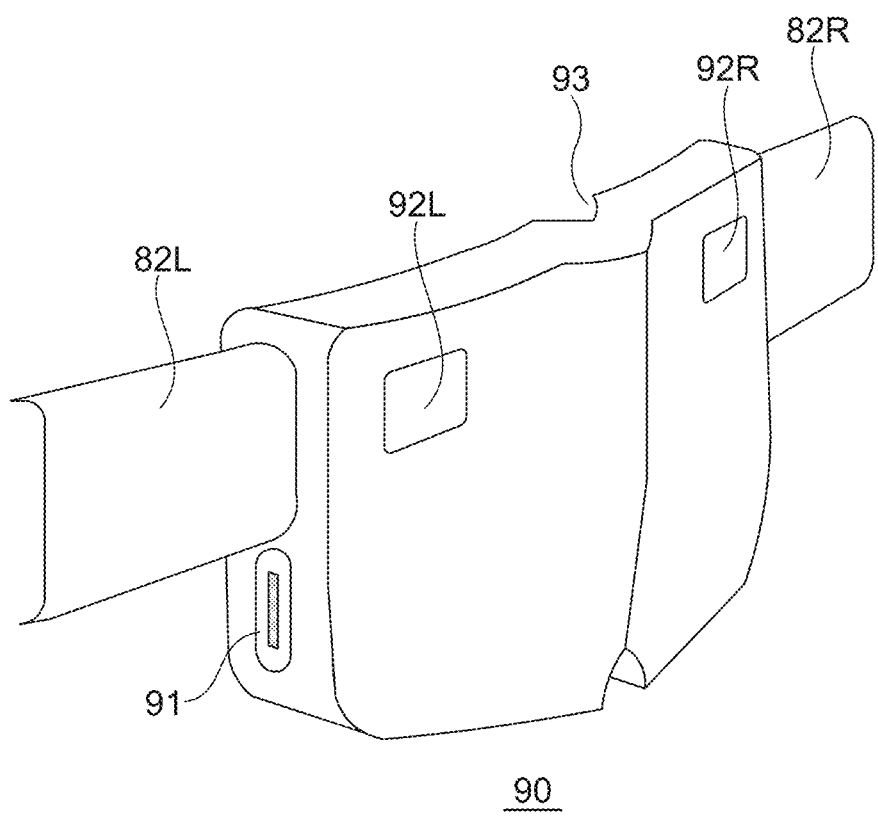
FIG. 1C is a view showing a battery unit in the camera body viewed from a rear side in FIG. 1A.

FIG. 1C is a view showing the battery unit 90 viewed from a rear side in FIG. 1A. The battery unit 90 is provided with a charge cable inserting slot 91, adjustment buttons 92L and 92R, and a backbone escape cutout 93 as shown in FIG. 1C.

A charge cable (not shown) can be connected to the charge cable inserting slot 91. An external power source charges internal batteries 94L and 94R (see FIG. 3A) and supplies electric power to the image-pickup/detection unit 10 through the charge cable.

Adjustment buttons 92L and 92R are used to adjust the respective lengths of the band parts 82L and 82R of the left and right connection members 80L and 80R. The adjustment button 92L is used to adjust the left band part 82L, and the adjustment button 92R is used to adjust the right band part 82R. Although the lengths of the band parts 82L and 82R are independently adjusted with the adjustment buttons 92L and 92R in the embodiment, the lengths of the band parts 82L and 82R may be simultaneously adjusted with one button.

The backbone escape cutout 93 is formed by shaping the battery unit 90 so that the battery unit 90 will not touch the backbone. Since the backbone escape cutout 93 avoids a convex part of the backbone of the body, displeasure of wearing is reduced and lateral displacement of the battery unit 90 is prevented.

Figure 1D:
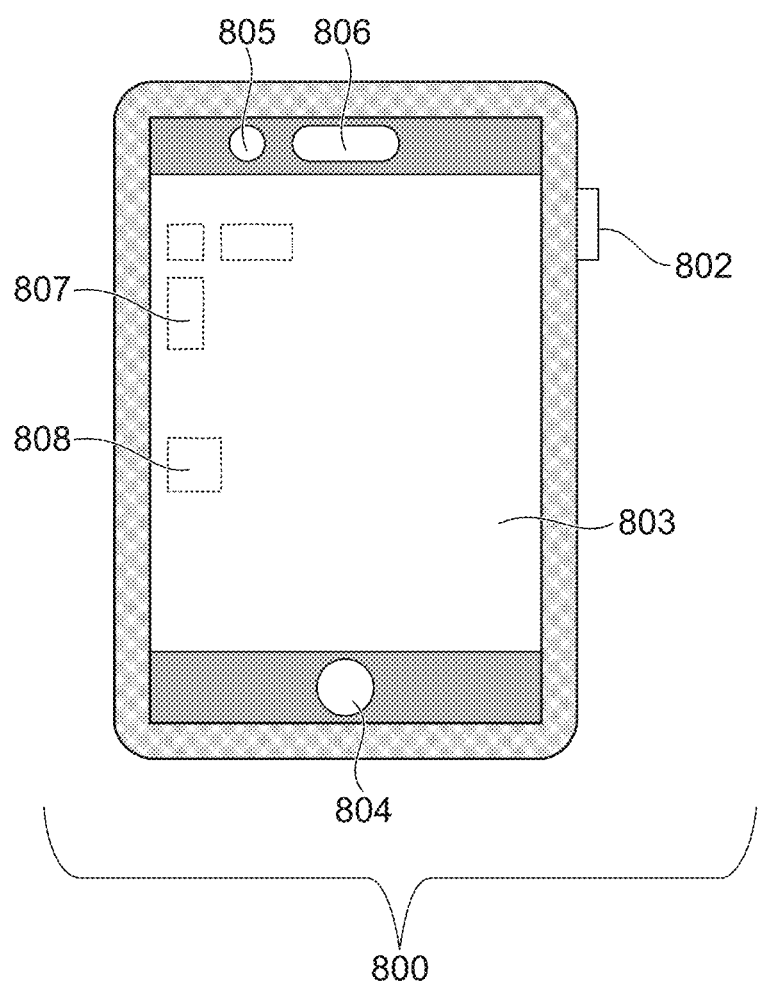
FIG. 1D is an external view showing a display apparatus as a portable device according to the first embodiment that is separated from the camera body.

FIG. 1D is an external view showing the display apparatus 800 as a portable device according to the first embodiment that is separated from the camera body 1. As shown in FIG. 1D, the display apparatus 800 is provided with an A-button 802, a display unit 803, a B-button 804, an in-camera 805, a face sensor 806, an angular speed sensor 807, and an acceleration sensor 808. Moreover, the display apparatus 800 is provided with a wireless LAN unit (not shown in FIG. 1D) that enables high-speed connection with the camera body 1.

The A-button 802 has a function of a power button of the display apparatus 800. The display apparatus 800 receives an ON/OFF operation by a long press of the A-button 802 and receives a designation of another process timing by a short press of the A-button 802.

The display unit 803 is used to check an image picked up by the camera body 1 and can display a menu screen required for setting. In this embodiment, a transparent touch sensor that is provided on the surface of the display unit 803 receives a touch operation to a screen (for example, a menu screen) that is displaying.

The B-button 804 functions as a calibration button 854 used for a calibration process mentioned later. The in-camera 805 can pick up an image of a person who is observing the display apparatus 800.

The face sensor 806 detects a face shape and an observation direction of the person who is observing the display apparatus 800. A concrete configuration of the face sensor 806 is not limited. For example, a structural optical sensor, a ToF (Time of Flight) sensor, and a millimeter wave radar may be employed.

Since the angular speed sensor 807 is built in the display apparatus 800, it is shown by a dotted line as a meaning of a perspective view. Since the display apparatus 800 of this embodiment is also provided with a function of the calibrator mentioned later, a triaxial gyro sensor that enables detection in X, Y, and Z directions is mounted. The acceleration sensor 808 detects a posture of the display apparatus 800.

It should be noted that a general smart phone is employed as the display apparatus 800 according to this embodiment. The camera system of the embodiment is achieved by matching firmware in the smart phone to firmware of the camera body 1. In the meantime, the camera system of the embodiment can be achieved by matching the firmware of the camera body 1 to an application and OS of the smart phone as the display apparatus 800.

FIG. 2A through FIG. 2F are views describing the image-pickup/detection unit 10 in detail. In views from FIG. 2A, a component that has the same function of a part that has been already described is indicated by the same reference numeral and its description in this specification is omitted.

Figure 2A:
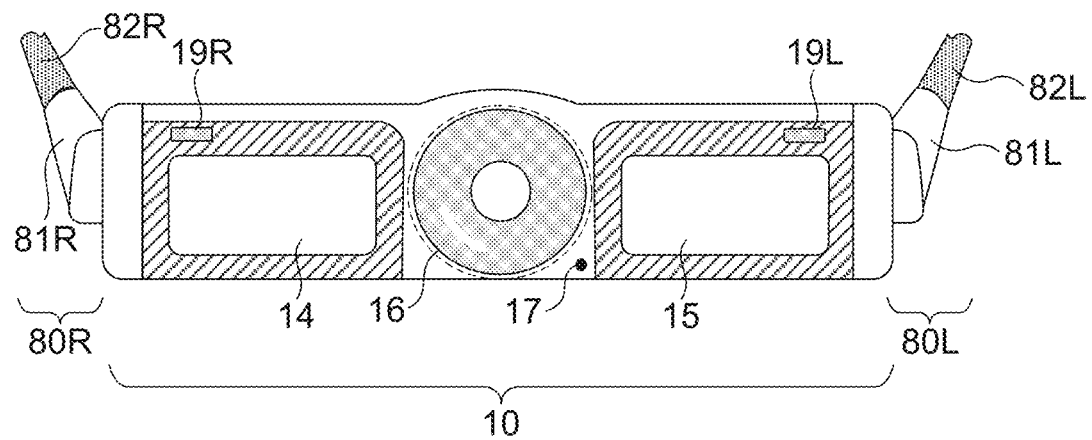
FIG. 2A is a front view showing the image-pickup/detection unit in the camera body.

FIG. 2A is a front view showing the image-pickup/detection unit 10.

The right connection member 80R has the band part 82R and an angle-holding member 81R of hard material that holds an angle with respect to the image-pickup/detection unit 10. The left connection member 80L has the band part 82L and an angle-holding member 81L similarly.

Figure 2B:
FIG. 2B is a view showing a shape of a band part of a connection member in the camera body.

FIG. 2B is a view showing the shapes of the band parts 82L and 82R of the left and right connection members 80L and 80R. In FIG. 2B, the angle holding members 81L and 81R are shown as transparent members in order to show the shapes of the band parts 82L and 82R.

The band part 82L is provided with a left connecting surface 83L and an electric cable 84 that are arranged at the left side of the user's body (right side in FIG. 2B) when the user wears the camera body 1. The band part 82R is provided with a right connecting surface 83R arranged at the right side of the user's body (left side in FIG. 2B) when the user wears the camera body 1.

The left connecting surface 83L is connected with the angle holding member 81L, and its sectional shape is an ellipse but is not a perfect circle. The right connecting surface 83R also has a similar elliptical shape. The right connecting surface 83R and left connecting surface 83L are arranged bisymmetrically in a reverse V-shape. That is, the distance between the right connecting surface 83R and the left connecting surface 83L becomes shorter toward the upper side from the lower side in FIG. 2B. Thereby, since the long axis directions of the left and right connecting surfaces 83L and 83R match the user's body when the user hangs the camera body 1, the band parts 82L and 82R touch the user's body comfortably and movement of the image-pickup/detection unit 10 in the left-and-right direction and front-and-back direction can be prevented.

The electric cable 84 is wired inside the band part 82L and electrically connects the battery unit 90 and the image-pickup/detection unit 10. The electric cable 84 connects the power source of the battery unit 90 to the image-pickup/detection unit 10 or transfers an electrical signal with an external apparatus.

Figure 2C:
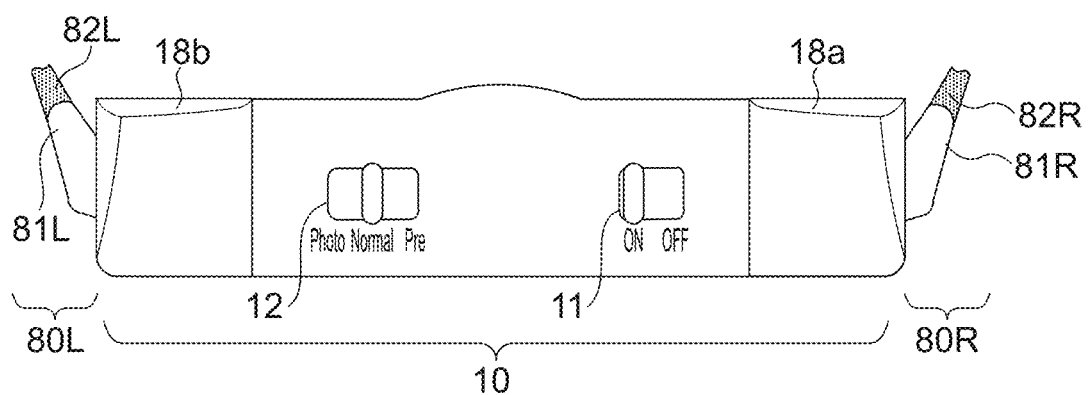
FIG. 2C is a rear view showing the image-pickup/detection unit.

FIG. 2C is a rear view showing the image-pickup/detection unit 10. FIG. 2C shows the side that contacts to the user's body. That is, FIG. 2C is a view viewed from the opposite side of FIG. 2A. Accordingly, the positional relation between the right connection member 80R and the left connection member 80L is reverse to FIG. 2A.

The image-pickup/detection unit 10 is provided with a power switch 11, an image pickup mode switch 12, and chest contact pads 18a and 18b at the back side.

The power switch 11 is used to switch ON/OFF of the power of the camera body 1. Although the power switch 11 of this embodiment is a slide lever type, it is not limited to this. For example, the power switch 11 may be a push type switch or may be a switch that is integrally constituted with a slide cover (not shown) of the image pickup lens 16.

The image pickup mode switch 12 is used to change an image pickup mode, i.e., is used to change a mode in connection with an image pickup operation. In this embodiment, the image pickup mode switch 12 can select the image pickup mode from among a still image mode, a video image mode, and a below-mentioned preset mode that is set using the display apparatus 800. In this embodiment, the image pickup mode switch 12 is a slide lever switch that can select one of "Photo", "Normal", and "Pre" shown in FIG. 2C. The image pickup mode shifts to the still image mode by sliding to "Photo", shifts to the video image mode by sliding to "Normal", and shifts to the preset mode by sliding to "Pre". It should be noted that the configuration of the image pickup mode switch 12 is not limited to the embodiment as long as the switch can change the image pickup mode. For example, the image pickup mode switch 12 may consist of three buttons of "Photo", "Normal", and "Pre".

The chest contact pads 18a and 18b touch the user's body when the image-pickup/detection unit 10 is energized. As shown in FIG. 2A, the image-pickup/detection unit 10 is formed so that a lateral (left-and-right) overall length will become longer than a vertical (up-and-down) overall length in wearing the camera body 1. The chest contact pads 18a and 18b are respectively arranged in vicinities of right and left ends of the image-pickup/detection unit 10. This arrangement reduces rotational blur in the left-and-right direction during the image pickup operation of the camera body 1. Moreover, the chest contact pads 18a and 18b prevent the power switch 11 and the image pickup mode switch 12 from touching the user's body. Furthermore, the chest contact pads 18a and 18b prevent heat transmission to the user's body even if the image-pickup/detection unit 10 heats up due to a long-time image pickup operation and are used for the adjustment of the angle of the image-pickup/detection unit 10.

Figure 2D:
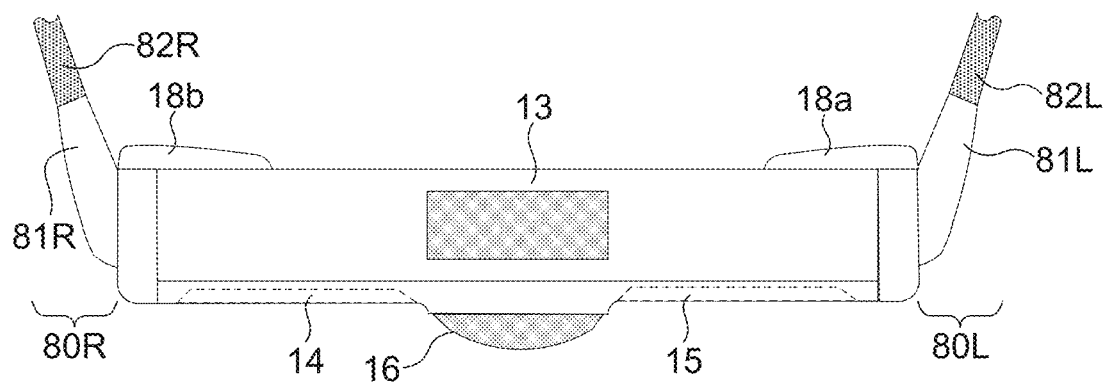
FIG. 2D is a top view showing the image-pickup/detection unit.

FIG. 2D is a top view showing the image-pickup/detection unit 10. As shown in FIG. 2D, the face direction detection window 13 is provided in the central part of the top surface of the image-pickup/detection unit 10, and the chest contact pads 18*a* and 18*b* are projected from the image-pickup/detection unit 10.

Figure 2E:
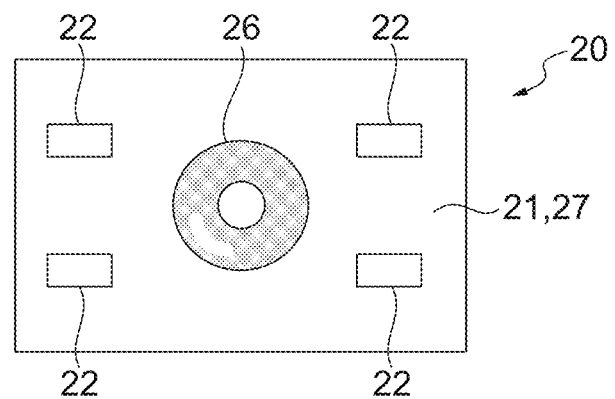
FIG. 2E is a view showing a configuration of a face direction detection unit arranged inside the image-pickup/detection unit and under a face direction detection window in the camera body.

FIG. 2E is a view showing a configuration of the face direction detection unit 20 arranged inside the image-pickup/detection unit 10 and under the face direction detection window 13. The face direction detection unit 20 is provided with the infrared LEDs 22 and the infrared condenser lens 26. The face direction detection unit 20 is also provided with an infrared LED lighting circuit 21 and an infrared detection device 27 shown in FIG. 5 mentioned later.

The infrared LEDs 22 project infrared light 23 (FIG. 5) toward the user. The infrared condenser lens 26 images reflected light 25 (FIG. 5) from the user in projecting the infrared light 23 from the infrared LEDs 22 onto a sensor (not shown) of the infrared detection device 27.

Figure 2F:
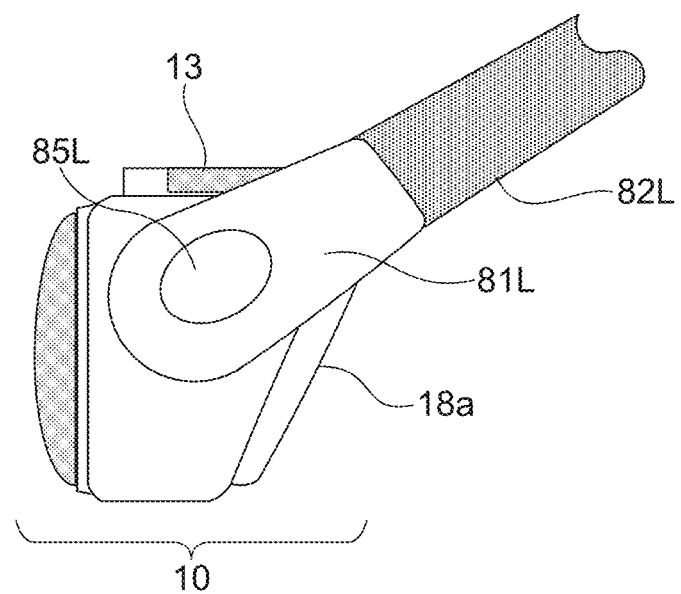
FIG. 2F is a view showing a state where a user wears the camera body viewed from a left side of the user.

FIG. 2F is a view showing a state where a user wears the camera body 1 viewed from the left side of the user.

An angle adjustment button 85L is provided in the angle holding member 81L and is used in adjusting the angle of the image-pickup/detection unit 10. An angle adjustment button (not shown in FIG. 2F) is provided in the opposite angle holding member 81R in the symmetrical position of the angle adjustment button 85L. Although the angle adjustment buttons are actually visible in FIG. 2A, FIG. 2C, and FIG. 2D, they are omitted to simplify the description.

When moving the angle holding member 81L upwardly or downwardly in FIG. 2F while pressing the angle adjustment button 85L, the user can change the angle between the image-pickup/detection unit 10 and the angle holding member 81L. The right side is the same as the left side. Moreover, projection angles of the chest contact pads 18*a* and 18*b* can be changed. The functions of these two kinds of angle change members (the angle adjustment buttons and chest contact pads) can adjust the image-pickup/detection unit 10 so as to keep the optical axis of the image pickup lens 16 horizontally irrespective of individual difference of a chest position shape.

Figure 3A:
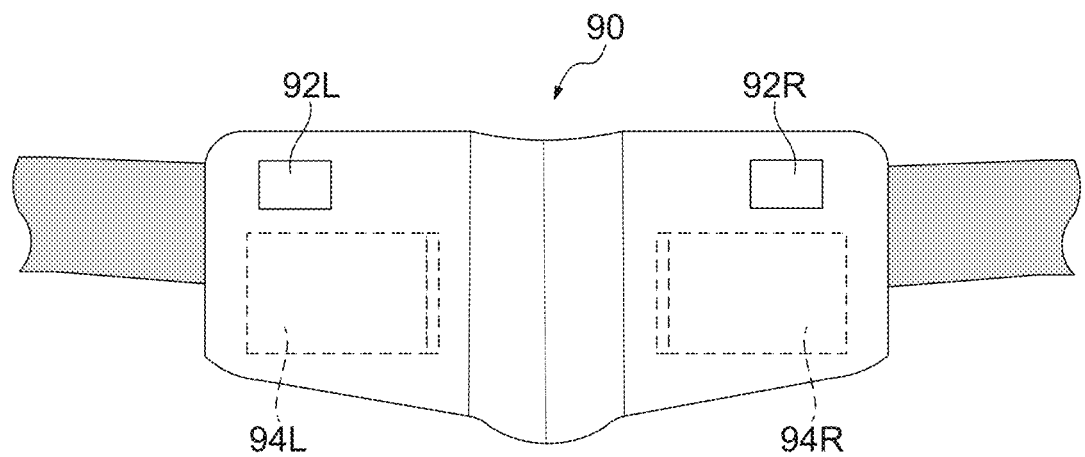
FIG. 3A, FIG. 3B, and FIG. 3C are views showing details of the battery unit.
Figure 3B:
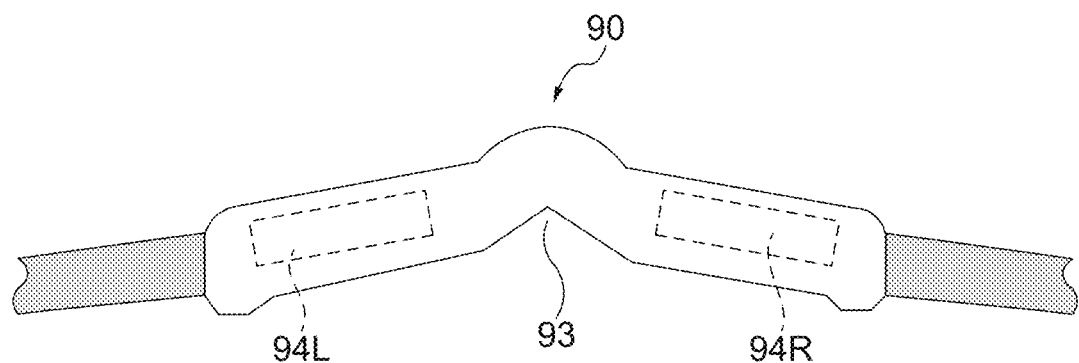
Figure 3C:
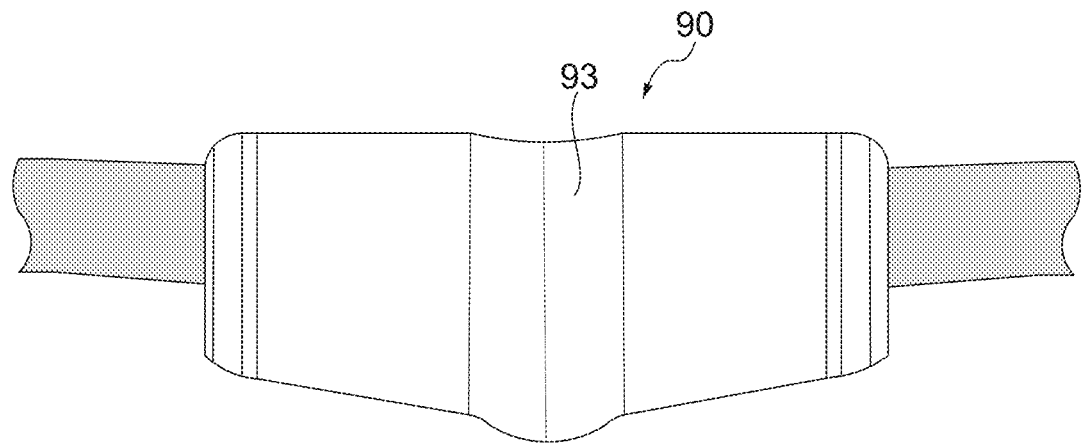

FIG. 3A, FIG. 3B, and FIG. 3C are views showing details of the battery unit 90. FIG. 3A is a partially transparent back view showing the battery unit 90.

As shown in FIG. 3A, the left battery 94L and right battery 94R are symmetrically mounted inside the battery unit 90 in order to keep weight balance. In this way, since the left and right batteries 94L and 94R are arranged symmetrically with the central part of the battery unit 90, the weight balance in the left-and-right direction is achieved and the position displacement of the camera body 1 is prevented. It should be noted that the battery unit 90 may mount a single battery.

FIG. 3B is a top view showing the battery unit 90. The batteries 94L and 94R are shown as the transparent members also in FIG. 3B. As shown in FIG. 3B, since the batteries 94L and 94R are symmetrically arranged at both the sides of the backbone escape cutout 93, the user can wear the battery unit 90 that is relatively heavy without any burden.

FIG. 3C is a rear view showing the battery unit 90. FIG. 3C is the view viewed from the side touched to the user's body, i.e., is the view viewed from the opposite side of FIG. 3A. As shown in FIG. 3C, the backbone escape cutout 93 is provided in the center along the backbone of the user.

FIG. 4 is a functional block diagram showing the camera body 1. Hereinafter, the process executed by the camera body 1 will be described roughly using FIG. 4. Details will be mentioned later.

As shown in FIG. 4, the camera body 1 is provided with the face direction detection unit 20, a recording-direction/field-angle determination unit 30, the image pickup unit 40, an image extraction/development unit 50, a primary recording unit 60, a transmission unit 70, and a second controller 111. These functional blocks are achieved by control of an overall control CPU 101 (FIG. 5) that controls the entire camera body 1.

The face direction detection unit 20 (a visual-line direction detection unit) is a functional block executed by the above-mentioned infrared LEDs 22, the infrared detection device 27, etc. The face direction detection unit 20 estimates an observation direction by detecting the face direction and passes the observation direction to the recording-direction/field-angle determination unit 30.

The recording-direction/field-angle determination unit 30 determines information about a position and an area that will be extracted from an image picked up by the image pickup unit 40 by performing various calculations on the basis of the observation direction estimated by the face direction detection unit 20. And then, the information is passed to the image extraction/development unit 50. The image pickup unit 40 converts light from an object to a wide-angle image and passes the image to the image extraction/development unit 50.

The image extraction/development unit 50 extracts an image that the user looks at from the image passed from the image pickup unit 40 by using the information passed from the recording-direction/field-angle determination unit 30. Then, the image extraction/development unit 50 develops the extracted image and passes the developed image to the primary recording unit 60.

The primary recording unit 60 is a functional block constituted by a primary memory 103 (FIG. 5) etc., records image information, and passes the image information to the transmission unit 70 at a required timing.

The transmission unit 70 is wirelessly connected with predetermined communication parties, such as the display apparatus 800 (FIG. 1D), a calibrator 850, and a simplified display apparatus 900, and communicates with these parties.

The display apparatus 800 is connectable to the transmission unit 70 through a high-speed wireless LAN (hereinafter referred to as a "high-speed wireless network"). In this embodiment, the high-speed wireless network employs wireless communication corresponding to the IEEE802.11ax (WiFi 6) standard. In the meantime, wireless communication corresponding to other standards, such as the WiFi 4 standard and the WiFi 5 standard, may be employed. Moreover, the display apparatus 800 may be a dedicated apparatus developed for the camera body 1 or may be a general smart phone, a tablet terminal, etc.

In addition, the display apparatus 800 may be connected to the transmission unit 70 through a small-power wireless network, may be connected through both the high-speed wireless network and small-power wireless network, or may be connected while switching the networks. In this embodiment, large amount data like an image file of a video image mentioned later is transmitted through the high-speed wireless network, and small amount data and data that does not need quick transmission are transmitted through the small-power wireless network. Although the Bluetooth is used for the small-power wireless network in this embodiment, other short-distance wireless communications, such as the NFC (Near Field Communication), may be employed.

The calibrator 850 performs initial setting and individual setting of the camera body 1, and is connectable to the transmission unit 70 through the high-speed wireless network in the same manner as the display apparatus 800. Details of the calibrator 850 are mentioned later. Moreover, the display apparatus 800 may have the function of the calibrator 850.

The simplified display apparatus 900 is connectable to the transmission unit 70 only through the small-power wireless network, for example. Although the simplified display apparatus 900 cannot perform communication of a video image with the transmission unit 70 due to time restriction, it can transmit an image pickup start/stop timing and can be used for an image check of a composition check level. Moreover, the simplified display apparatus 900 may be a dedicated apparatus developed for the camera body 1 as well as the display apparatus 800 or may be a smart watch etc.

Figure 5:
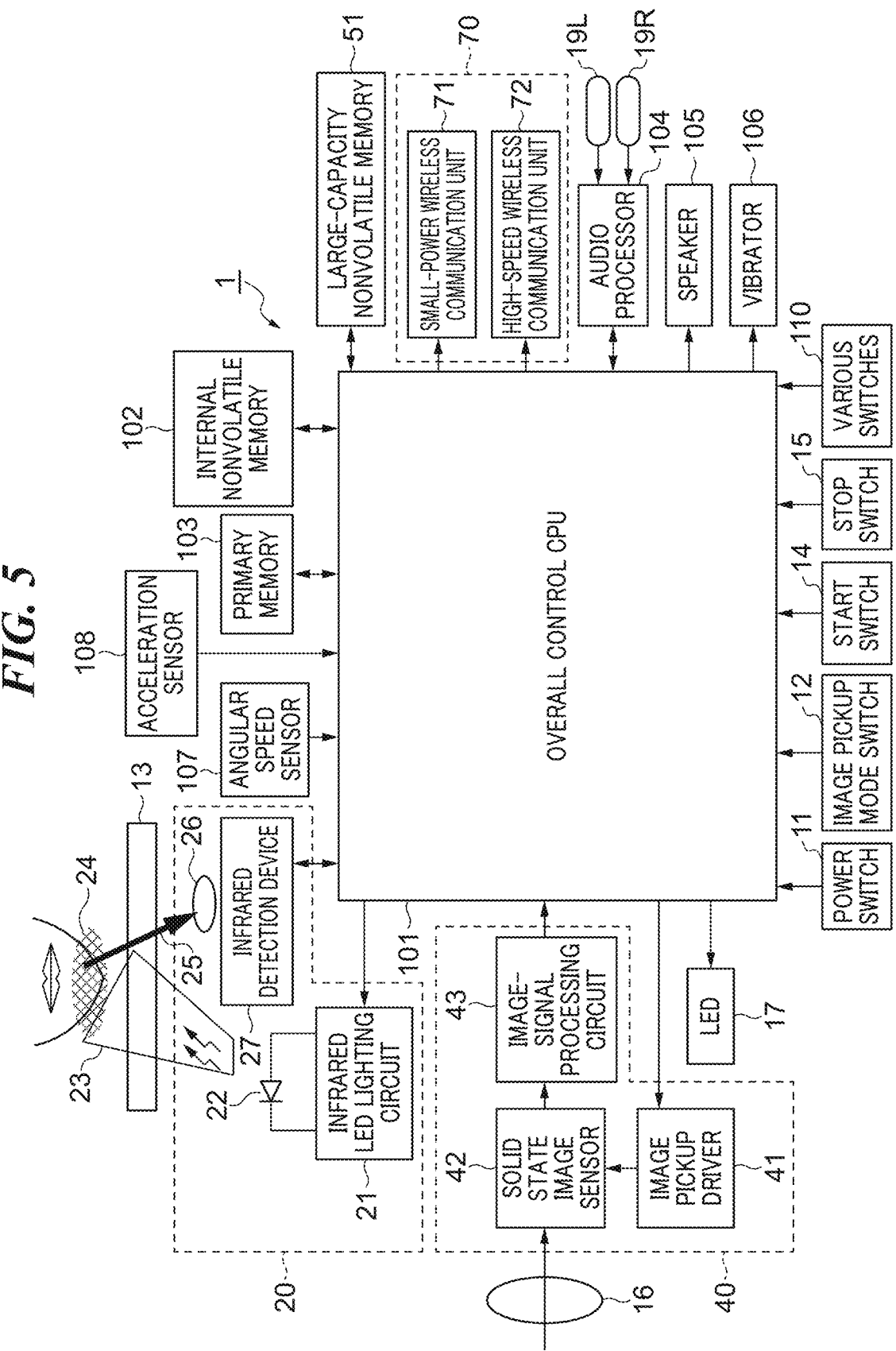
FIG. 5 is a block diagram showing a hardware configuration of the camera body.

FIG. 5 is a block diagram showing a hardware configuration of the camera body 1. Moreover, the configurations and functions described using FIG. 1A through FIG. 1C are indicated by the same reference numerals and their detailed descriptions will be omitted.

As shown in FIG. 5, the camera body 1 is provided with the overall control CPU 101, power switch 11, image pickup mode switch 12, face direction detection window 13, start switch 14, stop switch 15, image pickup lens 16, and LED 17.

The camera body 1 is further provided with the infrared LED lighting circuit 21, infrared LEDs 22, infrared condenser lens 26, and infrared detection device 27 that constitute the face direction detection unit 20 (FIG. 4).

Moreover, the camera body 1 is provided with the image pickup unit 40 (FIG. 4), which consists of an image pickup driver 41, a solid state image sensor 42, and an image-signal processing circuit 43, and the transmission unit 70 (FIG. 4), which consists of a small-power wireless communication unit 71 and high-speed wireless communication unit 72.

Although the camera body 1 has the single image pickup unit 40 in this embodiment, it may have two or more image pickup units in order to pick up a 3D image, to pick up an image of which a field angle is wider than that of an image obtained by the single image pickup unit 40, or to pick up images of different directions.

The camera body 1 is provided with various memories, such as a large-capacity nonvolatile memory 51, an internal nonvolatile memory 102, the primary memory 103, etc.

Furthermore, the camera body 1 is provided with an audio processor 104, a speaker 105, a vibrator 106, an angular speed sensor 107, an acceleration sensor 108, and various switches 110.

The switches like the power switch 11, which are described above using FIG. 2C, are connected to the overall control CPU 101. The overall control CPU 101 controls the entire camera body 1. The recording-direction/field-angle determination unit 30, image extraction/development unit 50, and second controller 111 in FIG. 4 are achieved by the overall control CPU 101.

The infrared LED lighting circuit 21 controls lighting of the infrared LEDs 22 described above using FIG. 2E to control projection of the infrared light 23 directed to the user from the infrared LEDs 22.

The face direction detection window 13 is constituted by a visible light cut filter that hardly permits transmission of visible light and sufficiently permits transmission of the infrared light 23 and its reflected light 25 that belong to infrared region. The infrared condenser lens 26 condenses the reflected light 25.

The infrared detection device 27 has a sensor that detects the reflected light 25 condensed by the infrared condenser lens 26. The sensor converts an image formed by the condensed reflected light 25 into sensor data and passes the sensor data to the overall control CPU 101.

As shown in FIG. 1B, when the user wears the camera body 1, the face direction detection window 13 is located under a user's jaw. Accordingly, as shown in FIG. 5, the infrared light 23 projected from the infrared LEDs 22 transmits the face direction detection window 13 and irradiates an infrared irradiation surface 24 near the user's jaw. Moreover, the infrared light 23 is reflected by the infrared irradiation surface 24 and the reflected light 25 transmits the face direction detection window 13 and is condensed by the infrared condenser lens 26 onto the sensor in the infrared detection device 27.

The various switches 110 are not shown in FIG. 1A through FIG. 1C. The various switches 110 are used to execute functions that are unrelated to this embodiment.

The image pickup driver 41 includes a timing generator etc., generates various timing signals, outputs the timing signals to sections related to the image pickup operation, and drives the solid state image sensor 42.

The solid state image sensor 42 outputs the signal obtained by photoelectric conversion of the object image formed through the image pickup lens 16 described using FIG. 1A to the image-signal processing circuit 43.

The image-signal processing circuit 43 outputs picked-up image data, which is generated by applying a clamp process and an A/D conversion process, etc. to the signal from the solid state image sensor 42, to the overall control CPU 101.

The internal nonvolatile memory 102 is constituted by a flash memory etc. and stores a boot program of the overall control CPU 101 and set values of various program modes. In this embodiment, a set value of an observation visual field (field angle) and a set value of an effect level of an image stabilization process are recorded.

The primary memory 103 is constituted by a RAM etc. and temporarily stores processing image data and a calculation result of the overall control CPU 101.

The large-capacity nonvolatile memory 51 stores image data. In this embodiment, the large-capacity nonvolatile memory 51 is a semiconductor memory that is not detachable. However, the large-capacity nonvolatile memory 51 may be a detachable storage medium like an SD card, and may be used together with the internal nonvolatile memory 102.

The small-power wireless communication unit 71 exchanges data with the display apparatus 800, the calibrator 850, and the simplified display apparatus 900 through the small-power wireless network. The high-speed wireless communication unit 72 exchanges data with the display apparatus 800 and the calibrator 850 through the high-speed wireless network.

The audio processor 104 processes outside sound (analog signals) collected by the microphones 19L and 19R and generates an audio signal.

In order to notify the user of a state of the camera body 1 and to warn the user, the LED 17 emits light, the speaker 105 outputs sound, and the vibrator 106 vibrates.

The angular speed sensor 107 uses a gyro etc. and detects movement of the camera body 1 itself as gyro data. The acceleration sensor 108 detects the posture of the image-pickup/detection unit 10.

Figure 6:
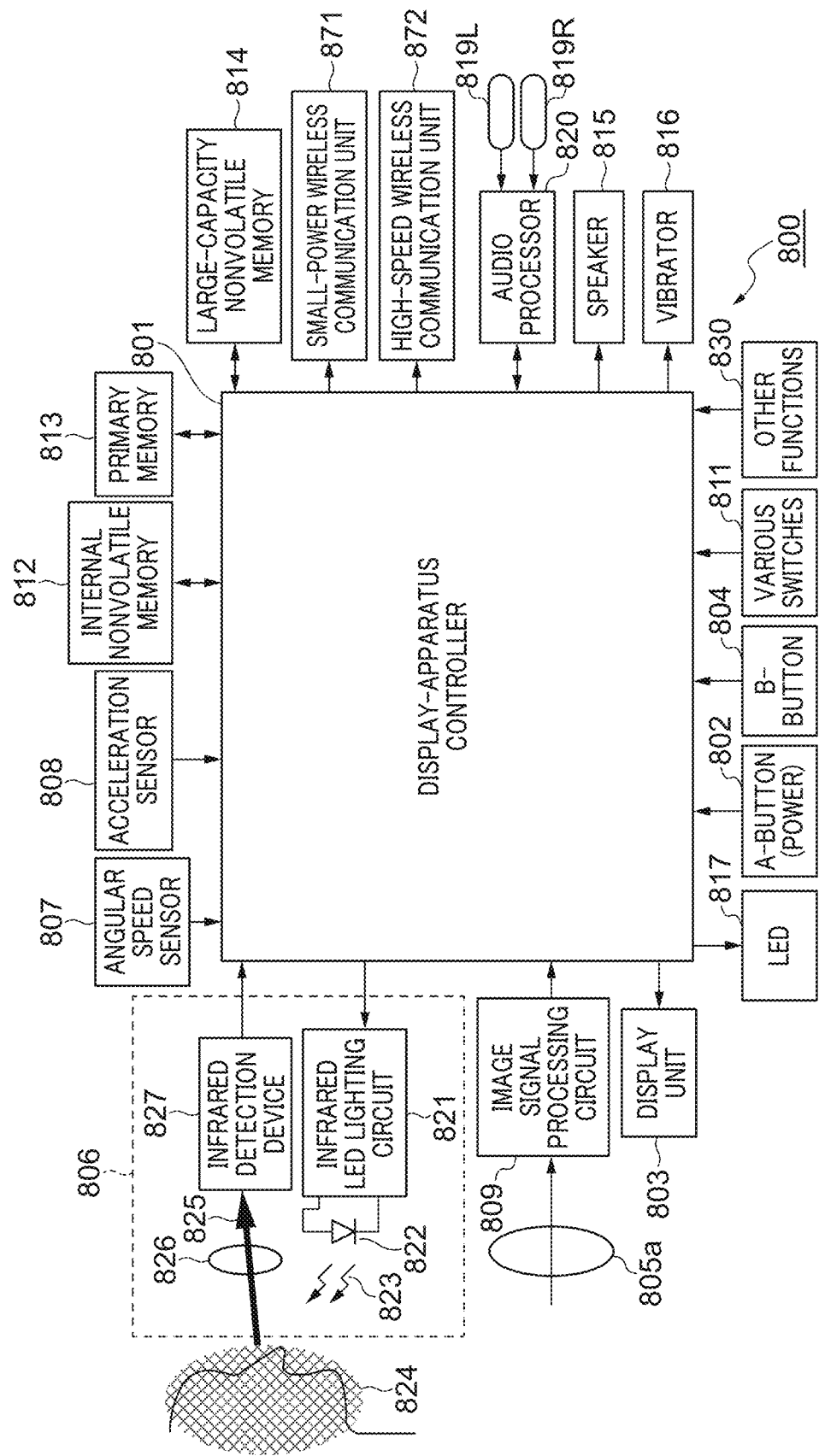
FIG. 6 is a block diagram showing a hardware configuration of the display apparatus.

FIG. 6 is a block diagram showing a hardware configuration of the display apparatus 800. The components that have been described using FIG. 1D are indicated by the same reference numerals and their descriptions will be omitted to simplify the description.

As shown in FIG. 6, the display apparatus 800 is provided with a display-apparatus controller 801, the A-button 802, the display unit 803, the B-button 804, the face sensor 806, the angular speed sensor 807, the acceleration sensor 808, an image signal processing circuit 809, and various switches 811.

Moreover, the display apparatus 800 is provided with an internal nonvolatile memory 812, a primary memory 813, a large-capacity nonvolatile memory 814, a speaker 815, a vibrator 816, an LED 817, an audio processor 820, a small-power wireless communication unit 871, and a high-speed wireless communication unit 872. The above-mentioned components are connected to the display-apparatus controller 801. The display-apparatus controller 801 is constituted by a CPU and controls the display apparatus 800.

The image signal processing circuit 809 bears equivalent functions with the image pickup driver 41, solid state image sensor 42, and image-signal processing circuit 43 inside the camera body 1. The image signal processing circuit 809 constitutes the in-camera 805 in FIG. 1D together with an in-camera lens 805a. The display-apparatus controller 801 processes the data output from the image signal processing circuit 809. The contents of the process of the data will be mentioned later.

The various switches 811 are used to execute functions that are unrelated to this embodiment. The angular speed sensor 807 uses a gyro etc. and detects movement of the display apparatus 800. The acceleration sensor 808 detects a posture of the display apparatus 800 itself.

The angular speed sensor 807 and the acceleration sensor 808 are built in the display apparatus 800, and respectively have the functions equivalent to that of the above-mentioned angular speed sensor 107 and acceleration sensor 108 of the camera body 1.

The internal nonvolatile memory 812 is constituted by a flash memory etc. and stores a boot program of the display-apparatus controller 801 and set values of various program modes.

The primary memory 813 is constituted by a RAM etc. and temporarily stores processing image data and a calculation result of the image signal processing circuit 809. In this embodiment, when a video image is recording, gyro data detected with the angular speed sensor 107 at pickup time of each frame is stored into the primary memory 813 in association with the frame.

The large-capacity nonvolatile memory 814 stores image data of the display apparatus 800. In this embodiment, the large-capacity nonvolatile memory 814 is constituted by a detachable memory like an SD card. It should be noted that the large-capacity nonvolatile memory 814 may be constituted by a fixed memory as with the large-capacity nonvolatile memory 51 in the camera body 1.

In order to notify the user of a state of the display apparatus 800 and to warn the user, the speaker 815 outputs sound, the vibrator 816 vibrates, and the LED 817 emits light.

The audio processor 820 processes outside sound (analog signals) collected by the left microphone 819L and right microphone 819R and generates an audio signal.

The small-power wireless communication unit 871 exchanges data with the camera body 1 through the small-power wireless network. The high-speed wireless communication unit 872 exchanges data with the camera body 1 through the high-speed wireless network.

The face sensor (a face detection unit) 806 is provided with an infrared LED lighting circuit 821 and infrared LEDs 822, an infrared condenser lens 826, and an infrared detection device 827.

The infrared LED lighting circuit 821 has the function equivalent to that of the infrared LED lighting circuit 21 in FIG. 5 and controls lighting of the infrared LEDs 822 to control projection of the infrared light 823 directed to the user from the infrared LEDs 822. The infrared condenser lens 826 condenses the reflected light 825 of the infrared light 823.

The infrared detection device 827 has a sensor that detects the reflected light 825 condensed by the infrared condenser lens 826. The sensor converts the condensed reflected light 825 into sensor data and passes the sensor data to the display-apparatus controller 801.

When the face sensor 806 shown in FIG. 1D is directed to the user, an infrared irradiation surface 824 that is the entire face of the user is irradiated with the infrared light 823 projected from the infrared LEDs 822 as shown in FIG. 6. Moreover, the reflected light 825 reflected from the infrared irradiation surface 824 is condensed by the infrared condenser lens 826 onto the sensor in the detection device 827.

Other functions 830 are functions of a smart phone, such as a telephone function, that are not related to the embodiment.

Hereinafter, how to use the camera body 1 and display apparatus 800 will be described. FIG. 7A is a flowchart schematically showing an image pickup/recording process according to the first embodiment executed by the camera body 1 and display apparatus 800.

In order to assist the description, a reference numeral shown in FIG. 4 and FIG. 5 of a unit that executes a process in each step is shown on a right side of each step in FIG. 7A. That is, steps S100 through S700 in FIG. 7A are executed by the camera body 1, and steps S800 through S1000 in FIG. 7A are executed by the display apparatus 800.

When the power switch 11 is set to ON and power of the camera body 1 turns ON, the overall control CPU 101 is activated and reads the boot program from the internal nonvolatile memory 102. After that, in the step S100, the overall control CPU 101 executes a preparation process that performs setting of the camera body 1 before an image pickup operation. Details of the preparation process will be mentioned later using FIG. 7B.

In a step S200, the face direction detection process that estimates an observation direction based on a face direction detected by the face direction detection unit 20 is executed. Details of the face direction detection process will be mentioned later using FIG. 7C. This process is executed at a predetermined frame rate. In a step S300, the recording-direction/field-angle determination unit 30 executes a recording-direction/area determination process. Details of the recording-direction/area determination process will be mentioned later using FIG. 7D.

In a step S400, the image pickup unit 40 picks up an image and generates pickup image data. In a step S500, the image extraction/development unit 50 extracts an image from the pickup image data generated in the step S400 according to recording-direction/field-angle information determined in the step S300 and performs a recording area development process that develops the extracted area. Details of the recording area development process will be mentioned later using FIG. 7E.

In a step S600, the primary recording unit (an image recording unit) 60 executes a primary recording process that stores the image developed in the step S500 into the primary memory 103 as image data. Details of the primary recording process will be mentioned later using FIG. 14.

In the step S700, the transmission unit (an image output unit) 70 executes a transmission process to the display apparatus 800 that wirelessly transmits (outputs) the image primarily recorded in the step S600 to the display apparatus 800 at a designated timing. Details of the transmission process to the display apparatus 800 will be mentioned later using FIG. 16.

The steps from the step S800 are executed by the display apparatus 800. In the step S800, the display-apparatus controller 801 executes an optical correction process that corrects optical aberration of the image transferred from the camera body 1 in the step S700. Details of the optical correction process will be mentioned later using FIG. 17.

In a step S900, the display-apparatus controller 801 applies the image stabilization process to the image of which the optical aberration has been corrected in the step S800. Details of the image stabilization process will be mentioned later using FIG. 19. It should be noted that the order of the step S800 and the step S900 may be inverted. That is, the image stabilization process may be executed in advance and the optical correction process may be executed after that.

In a step S1000, the display-apparatus controller (video recording unit) 801 executes a secondary recording process that records the image to which the optical correction process in the step S800 and the image stabilization process in the step S900 have been applied into the large-capacity nonvolatile memory 814. And then, the display-apparatus controller 801 finishes this process.

Figure 7B:
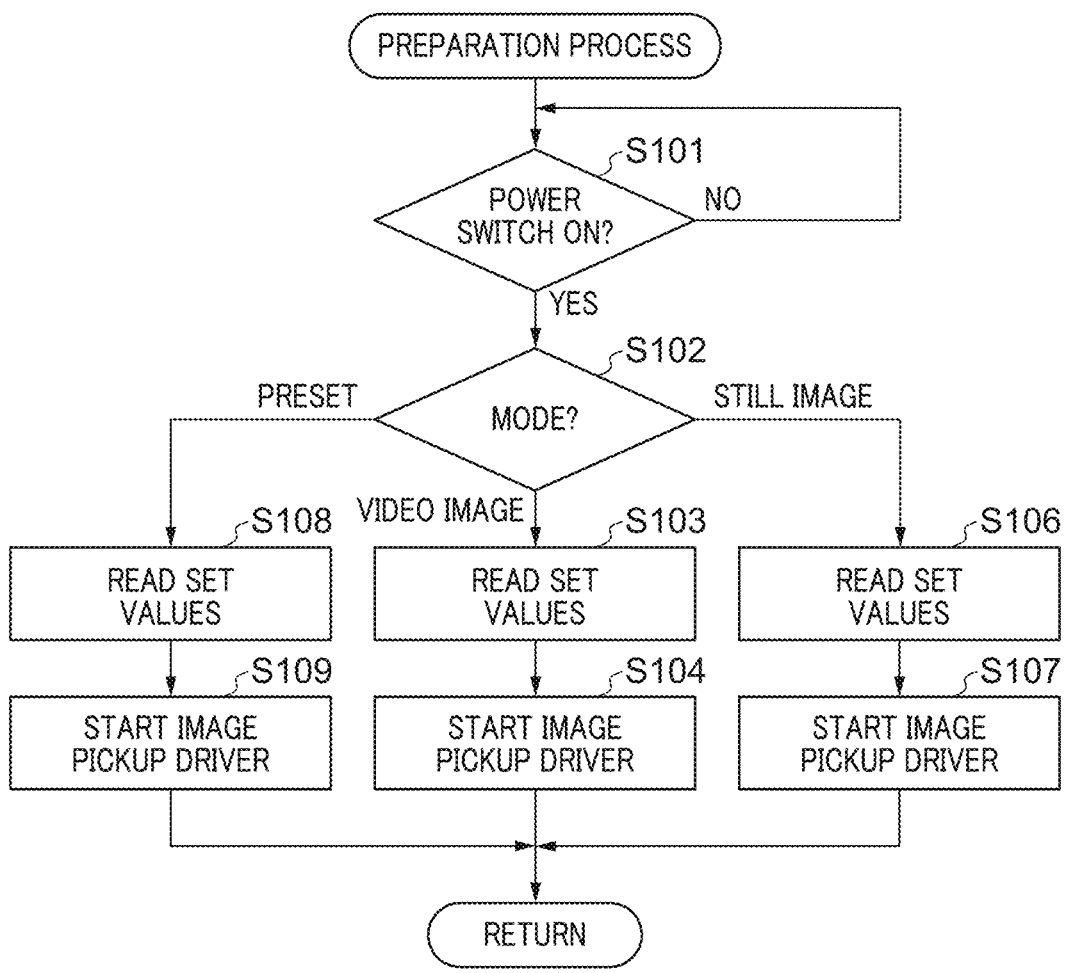
FIG. 7B is a flowchart showing a subroutine of a preparation process in a step S100 in FIG. 7A according to the first embodiment.

Next, the subroutines in the respective steps in FIG. 7A will be described in detail using FIG. 7B through FIG. 7F and other drawings in the order of the processes. FIG. 7B is a flowchart showing the subroutine of the preparation process in the step S100 in FIG. 7A. Hereinafter, this process is described using the components shown in FIG. 2A through FIG. 2F and FIG. 5.

It is determined whether the power switch 11 is ON in a step S101. The process waits when the power is OFF. When the power becomes ON, the process proceeds to a step S102.

In the step S102, the mode selected by the image pickup mode switch 12 is determined. As a result of the determination, when the mode selected by the image pickup mode switch 12 is the video image mode, the process proceeds to a step S103.

In the step S103, various set values of the video image mode are read from the internal nonvolatile memory 102 and are stored into the primary memory 103. Then, the process proceeds to a step S104. The various set values of the video image mode include a field-angle set value $V_{ang}$ and an image stabilization level. The field-angle set value $V_{ang}$ is preset to 90° in this embodiment. The image stabilization level is selected from among "Strong", "Middle", and "OFF". In the step S104, an operation of the image pickup driver 41 for the video image mode is started. And then, the process exits from this subroutine.

As a result of the determination in the step S102, when the mode selected by the image pickup mode switch 12 is the still image mode, the process proceeds to a step S106. In the step S106, various set values of the still image mode are read from the internal nonvolatile memory 102 and are stored into the primary memory 103. Then, the process proceeds to a step S107. The various set values of the still image mode include the field-angle set value $V_{ang}$ and the image stabilization level. The field-angle set value $V_{ang}$ is preset to 45° in this embodiment. The image stabilization level is selected from among "Strong", "Middle", and "OFF". In the step S107, an operation of the image pickup driver 41 for the still image mode is started. And then, the process exits from this subroutine.

As the result of the determination in the step S102, when the mode selected by the image pickup mode switch 12 is the preset mode, the process proceeds to a step S108. The preset mode is one of the three image pickup modes that can be changed by the image pickup mode switch 12. In the preset mode, the image pickup mode of the camera body 1 can be changed by an external device like the display apparatus 800. That is, the preset mode is a mode for a custom image pickup operation. Since the camera body 1 is a compact wearable device, operation switches, a setting screen, etc. for changing advanced set values are not mounted on the camera body 1. The advanced set values are changed by an external device like the display apparatus 800.

For example, a case where the user would like to pick up a video image at the field angle 90° and the field angle 110° continuously is considered. In such a case, the following operations are needed. Since the field angle is set to 90° in a regular video image mode, the user first performs the video image pickup operation in the regular video image mode, once finishes the video image pickup operation, displays the setting screen on the display apparatus 800, and changes the field angle to 110° on the setting screen. However, the operations to the display apparatus 800 during a certain event are troublesome.

In the meantime, when the preset mode is preset to a video image pickup operation at the field angle 110°, the user can change the field angle in the video image pickup operation to 110° immediately by only sliding the image pickup mode switch 12 to "Pre" after finishing the video image pickup operation at the field angle 90°. That is, the user is not required to suspend the current operation and to perform the above-mentioned troublesome operations.

It should be noted that contents of the preset mode may include the image stabilization level, which is selected from among "Strong", "Middle", and "OFF", and a set value of voice recognition that is not described in this embodiment in addition to the field angle.

In the step S108, various set values of the preset mode are read from the internal nonvolatile memory 102 and are stored into the primary memory 103. Then, the process proceeds to a step S109. The various set values of the preset mode include the field-angle set value $V_{ang}$ and the image stabilization level that is selected from among "Strong", "Middle", and "OFF".

In the step S109, an operation of the image pickup driver 41 for the preset mode is started. And then, the process exits from this subroutine.

Figure 13:
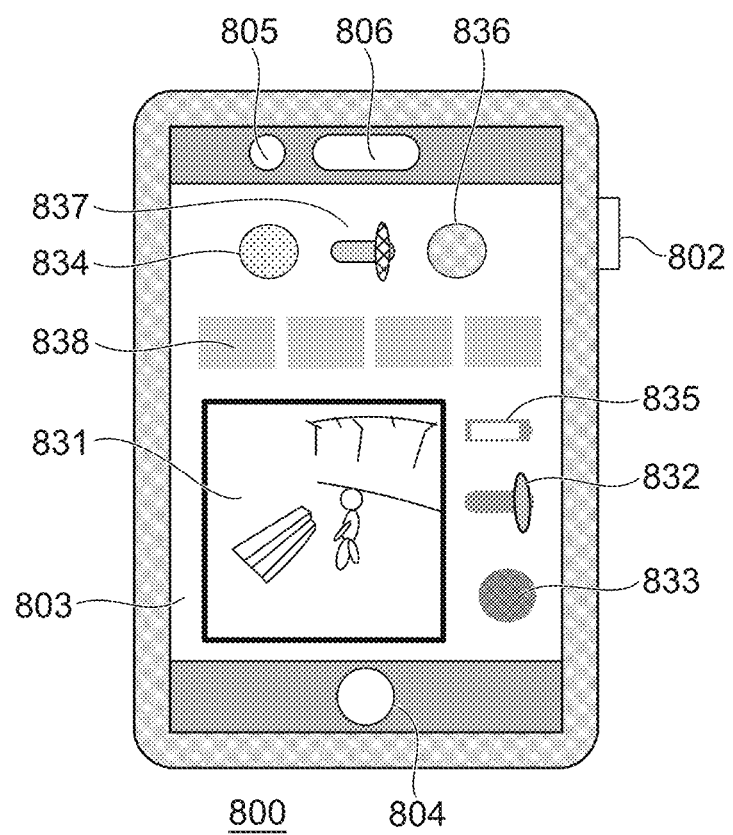
FIG. 13 is a view showing a menu screen for setting various set values of the video image mode that is displayed on a display unit of the display apparatus before an image pickup operation of the camera body.

Hereinafter, the various set values of the video image mode read in the step S103 will be described using FIG. 13. FIG. 13 is a view showing a menu screen for setting the various set values of the video image mode that is displayed on the display unit 803 of the display apparatus 800 before an image pickup operation of the camera body 1. The components that have been described using FIG. 1D are indicated by the same reference numerals and their descriptions will be omitted. The display unit 803 has a touch panel function and will be described under the presumption that it functions by touch operations, such as a swipe operation.

As shown in FIG. 13, the menu screen includes a preview screen 831, a zoom lever 832, a recording start/stop button 833, a switch 834, a battery level indicator 835, a button 836, a lever 837, and an icon display area 838. The user can check the image picked up by the camera body 1, a zoom amount, and a field angle on the preview screen 831.

The user can change a zoom setting (a field angle) by shifting the zoom lever 832 rightward or leftward. This embodiment describes a case where the field-angle set value $V_{ang}$ can be selected from among 45°, 90°, 110°, and 130°. In the meantime, the field-angle set value $V_{ang}$ may be set to a value other than the four values by operating the zoom lever 832.

The recording start/stop button 833 is a toggle switch that has both of the functions of the start switch 14 and the stop switch 15. The switch 834 is used to switch "OFF" and "ON" of the image stabilization process. The battery level indicator 835 displays battery level of the camera body 1. The button 836 is used to change a mode.

The lever 837 is used to set the image stabilization level. Although the image stabilization level can be set to "Strong" or "Middle" in this embodiment, another image stabilization level, for example "Weak", may be set. Moreover, the image stabilization level may be set steplessly.

A plurality of thumbnail icons for preview are displayed in the icon display area 838.

Figure 7C:
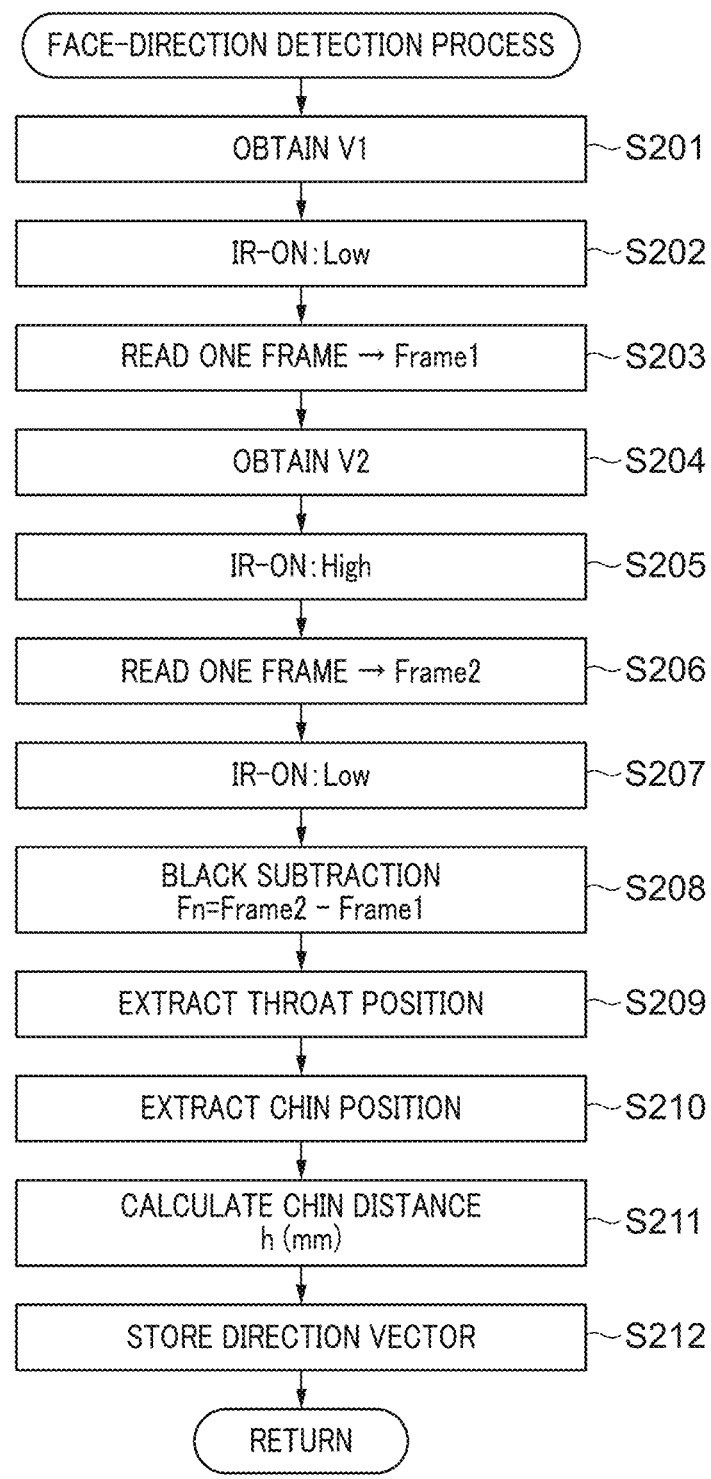
FIG. 7C is a flowchart showing a subroutine of a face direction detection process in a step S200 in FIG. 7A according to the first embodiment.

FIG. 7C is a flowchart showing a subroutine of the face direction detection process in the step S200 in FIG. 7A. Before describing the details of this process, a face direction detection method using infrared light will be described using FIG. 8A through FIG. 8K.

Figure 8A:
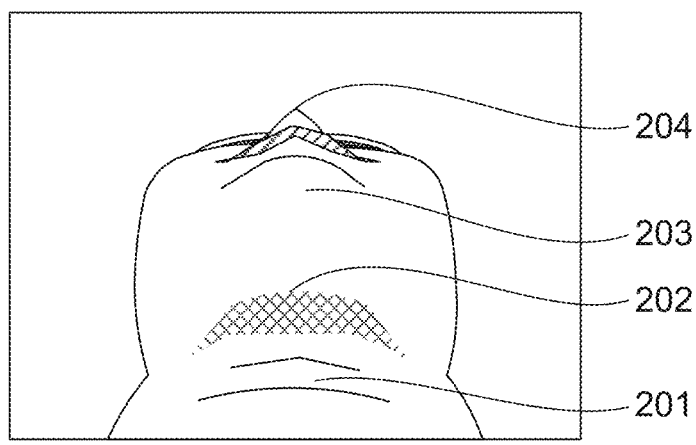
FIG. 8A is a view showing an image of a user viewed from the face direction detection window.

FIG. 8A is a view showing a visible light image of a user's face looked at from the position of the face direction detection window 13. The image in FIG. 8A is identical to an image picked up by a visible-light image sensor on the assumption that the face direction detection window 13 permits transmission of visible light and that the visible-light image sensor is mounted as a sensor of the infrared detection device 27.

Figure 8B:
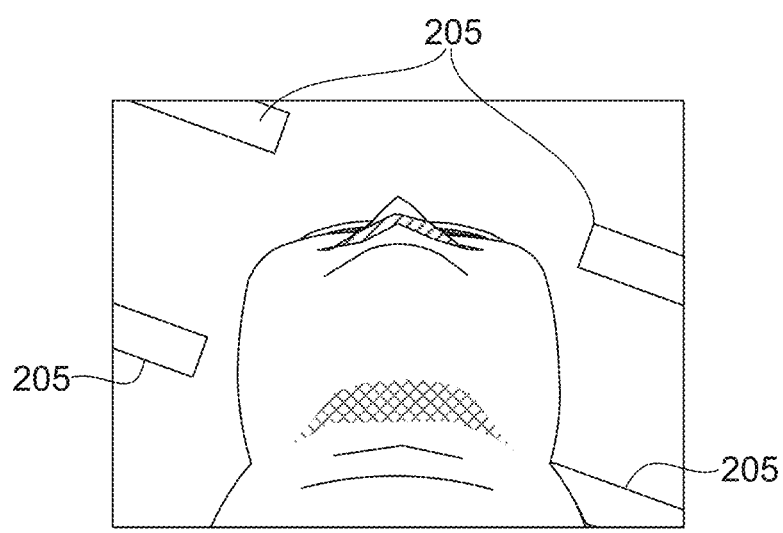
FIG. 8B is a view showing a case where fluorescent lamps in a room appear as background in the image of the user viewed from the face direction detection window.

The image in FIG. 8A includes a neck front part 201 above clavicles of the user, a root 202 of a jaw, a chin 203, and a face 204 including a nose. FIG. 8B is a view showing a case where fluorescent lamps 205 in a room appear as background in the visible-light image of the user shown in FIG. 8A.

The fluorescent lamps 205 around the user appear in the visible-light image in FIG. 8B. In this way, since various backgrounds appear in a user's image according to a use condition, it becomes difficult that the face direction detection unit 20 or the overall control CPU 101 cuts out a face image from a visible-light image. In the meantime, although there is a technique that cuts such an image by using an AI etc., the technique is not suitable for the camera body 1 as a portable device because the overall control CPU 101 is required to have high performance.

Accordingly, the camera body 1 of the first embodiment detects a user's face using an infrared image. Since the face direction detection window 13 is constituted by a visible light cut filter, visible light is not transmitted mostly. Accordingly, an image obtained by the infrared detection device 27 is different from the images in FIG. 8A and FIG. 8B.

Figure 8C:
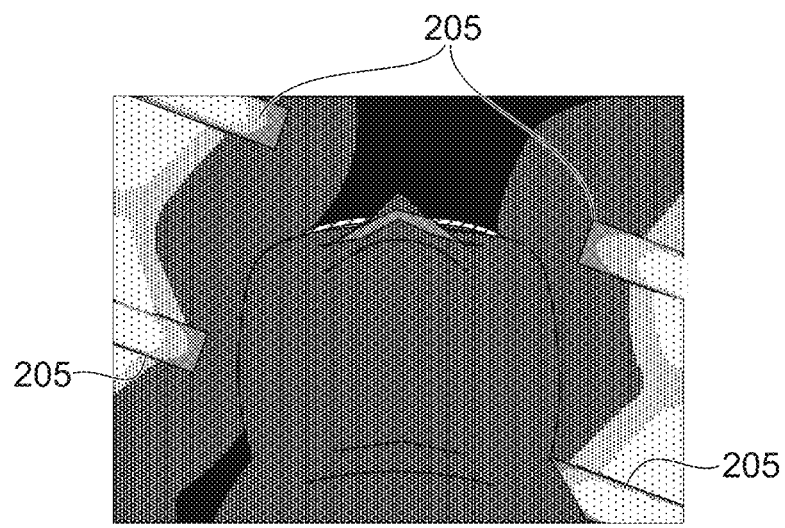
FIG. 8C is a view showing an image obtained by imaging the user and fluorescent lamps as background shown in FIG. 8B onto a sensor of the infrared detection device through the face direction detection window in a state where infrared LEDs of the infrared detection device are not lightened.

FIG. 8C is a view showing an infrared image obtained by imaging the user and the fluorescent lamps as the background shown in FIG. 8B onto the sensor of the infrared detection device 27 through the face direction detection window 13 in a state where the infrared LEDs 22 are not lightened.

In the infrared image in FIG. 8C, the user's neck and jaw are dark. In the meantime, since the fluorescent lamps 205 emit an infrared component in addition to the visible light, they are slightly bright.

Figure 8D:
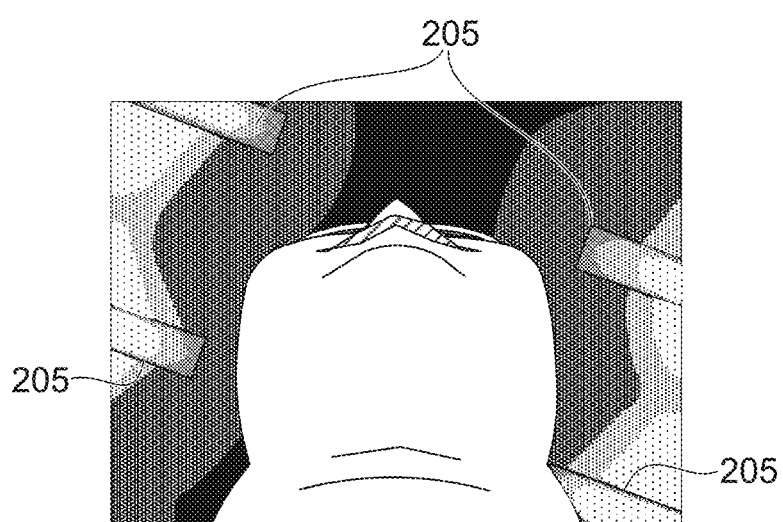
FIG. 8D is a view showing an image obtained by imaging the user and fluorescent lamps as background shown in FIG. 8B onto the sensor of the infrared detection device through the face direction detection window in a state where the infrared LEDs are lightened.

FIG. 8D is a view showing an image obtained by imaging the user and the fluorescent lamps as the background shown in FIG. 8B onto the sensor of the infrared detection device 27 through the face direction detection window 13 in a state where the infrared LEDs 22 are lightened.

In the image in FIG. 8D, the user's neck and jaw are bright. In the meantime, unlike FIG. 8C, the brightness around the fluorescent lamps 205 has not changed.

Figure 8E:
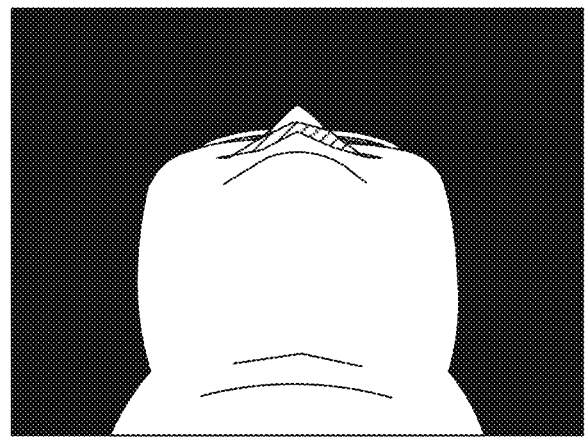
FIG. 8E is a view showing a difference image that is calculated by subtracting the image in FIG. 8C from the image in FIG. 8D.

FIG. 8E is a view showing a difference image that is calculated by subtracting the image in FIG. 8C from the image in FIG. 8D. The user's face emerges.

In this way, the overall control CPU 101 obtains the difference image (hereinafter referred to as a face image) by calculating the difference between the image formed on the sensor of the infrared detection device 27 in the state where the infrared LEDs 22 are lightened and the image formed on the sensor in the state where the infrared LEDs 22 are not lightened.

The face direction detection unit 20 of this embodiment employs a method that obtains a face image by extracting infrared reflection intensity as a two-dimensional image by the infrared detection device 27. The sensor of the infrared detection device 27 employs a configuration similar to a general image sensor and obtains a face image frame-by-frame. A vertical synchronization signal (hereinafter referred to as a V-signal) that obtains frame synchronization is generated by the infrared detection device 27 and is output to the overall control CPU 101.

Figure 9:
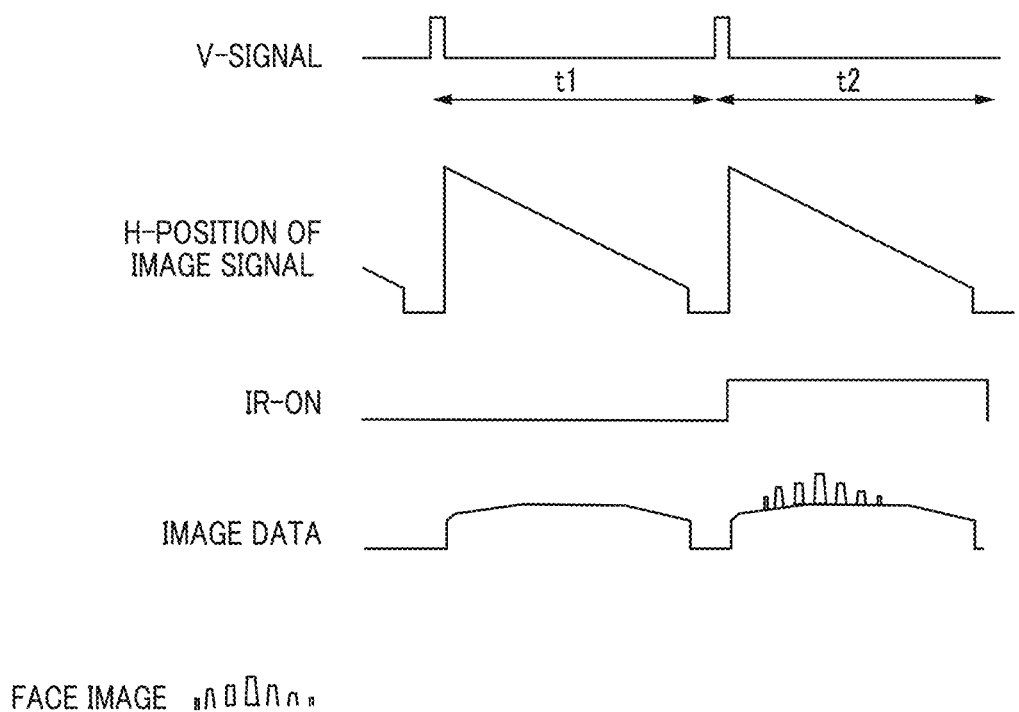
FIG. 9 is a timing chart showing a lighting timing of the infrared LEDs and related signals.

FIG. 9 is a timing chart showing timings of lighting and extinction of the infrared LEDs 22 and related signals.

A V-signal output from the infrared detection device 27, an H-position of the image signal output from the sensor of the infrared detection device 27, an IR-ON signal output to the infrared LED lighting circuit 21 from the overall control CPU 101, and pickup image data output to the overall control CPU 101 from the sensor of the infrared detection device 27 are shown in FIG. 9 in the order from the top. The horizontal time axes of these four signals are identical. When the V-signal becomes High, timings of the frame synchronization and timings of lighting and extinction of the infrared LEDs 22 are obtained.

FIG. 9 shows a first face image obtainment period t1 and a second face image obtainment period t2.

The infrared detection device 27 controls the operation of the sensor so that the H-position of the image signal will synchronize with the V-signal as shown in FIG. 9. Since the sensor of the infrared detection device 27 employs the configuration similar to a general image sensor as mentioned above and its operation is well-known, a detailed description of the control method is omitted.

The overall control CPU 101 controls switching of the IR-ON signal between High and Low in synchronization with the V-signal. Specifically, the overall control CPU 101 outputs the IR-ON signal of Low to the infrared LED lighting circuit 21 during the period t1 and outputs the IR-ON signal of High to the infrared LED lighting circuit 21 during the second period t2.

The infrared LED lighting circuit 21 lightens the infrared LEDs 22 to project the infrared light 23 to the user during the High period of the IR-ON signal. In the meantime, the infrared LED lighting circuit 21 extinguishes the infrared LEDs 22 during the Low period of the IR-ON signal.

A vertical axis of the pickup image data indicates a signal intensity that is a light receiving amount of the reflected light 25. Since the infrared LEDs 22 are extinguished during the first period t1, no reflected light comes from the user's face and pickup image data as shown in FIG. 8C is obtained. In the meantime, since the infrared LEDs 22 are lightened during the second period t2, the reflected light 25 comes from the user's face and pickup image data as shown in FIG. 8D is obtained. Accordingly, the signal intensity in the period t2 increases from the signal intensity in the period t1 by the reflected light 25 from the user's face.

A face image indicated in the bottom in FIG. 9 is obtained by subtracting the image data picked up during the first period t1 from the image data picked up during the second period t2. As a result of the subtraction, face image data in which only the component of the reflected light 25 from the user's face is extracted like FIG. 8E is obtained.

FIG. 7C shows the face direction detection process in the step S200 that includes the operations described using FIG. 8C through FIG. 8E and FIG. 9.

In a step S201, a timing V1 at which the first period t1 starts is obtained when the V-signal output from the infrared detection device 27 becomes High. When the timing V1 is obtained, the process proceeds to a step S202.

In a step S202, the IR-ON signal is set to Low and is output to the infrared LED lighting circuit 21. Thereby, the infrared LEDs 22 are extinguished.

In a step S203, one frame of pickup image data output from the infrared detection device 27 during the first period t1 is read. The image data is temporarily stored into the primary memory 103 as Frame1.

In a step S204, a timing V2 at which the second period t2 starts is obtained when the V-signal output from the infrared detection device 27 becomes High. When the timing V2 is obtained, the process proceeds to a step S205.

In the step S205, the IR-ON signal is set to High and is output to the infrared LED lighting circuit 21. Thereby, the infrared LEDs 22 are lightened.

In a step S206, one frame of pickup image data output from the infrared detection device 27 during the second period t2 is read. The image data is temporarily stored into the primary memory 103 as Frame2.

In a step S207, the IR-ON signal is set to Low and is output to the infrared LED lighting circuit 21. Thereby, the infrared LEDs 22 are extinguished.

In a step S208, Frame1 and Frame2 are read from the primary memory 103, and light intensity Fn of the reflected light 25 from the user corresponding to the face image shown in FIG. 9 is calculated by subtracting Frame1 from Frame2. This process is generally called black subtraction.

In a step S209, a throat position (a neck rotation center) is extracted from the light intensity Fn. First, the overall control CPU 101 divides the face image into a plurality of distance areas that will be described using FIG. 8F on the basis of the light intensity Fn.

Figure 8F:
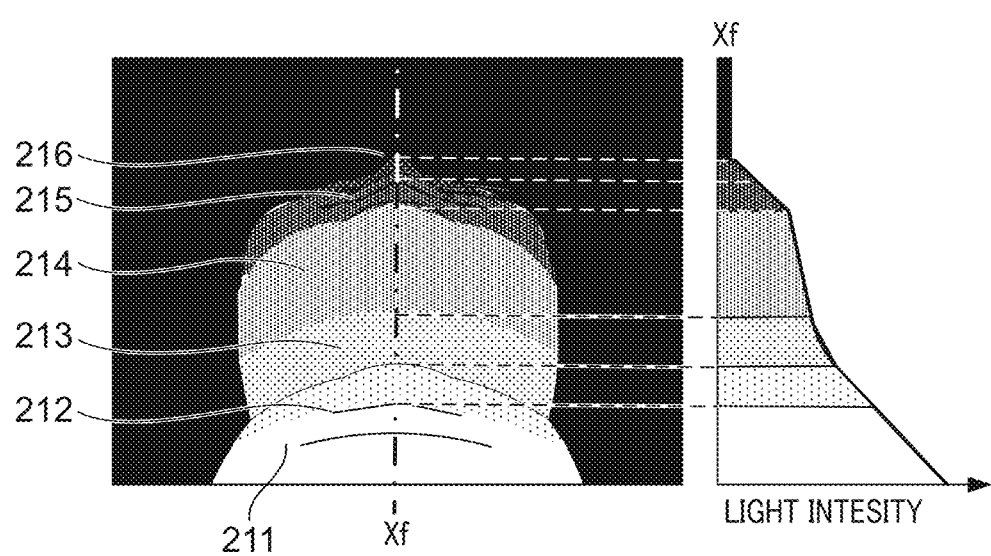
FIG. 8F is a view showing a result obtained by adjusting shades of the difference image in FIG. 8E so as to fit with a scale of light intensities of reflected components of infrared light projected to a face and neck of the user.

FIG. 8F is a view showing a result obtained by adjusting shades of the difference image shown in FIG. 8E so as to fit with a scale of light intensity of the reflected light 25 of the infrared light 23 projected to the face and neck of the user. FIG. 8F shows light intensity distribution about sections of the face and neck of the user.

The face image on the left side in FIG. 8F shows the light intensity distribution of the reflected light 25 in the face image shown in FIG. 8E by gray steps applied to the respective divided areas. An Xf axis is oriented in a direction from the central part of the user's neck toward the chin.

In a graph on the right side in FIG. 8F, a horizontal axis shows the light intensity on the Xf axis of the face image and a vertical axis shows the Xf axis. The light intensity shown by the horizontal axis increases as going rightward.

The face image in FIG. 8F is divided into six areas (distance areas) 211 through 216 according to the light intensity. The area 211 is an area where the light intensity is the strongest and is shown by white among the gray steps. The area 212 is an area where the light intensity falls slightly than the area 211 and is shown by quite bright gray among the gray steps. The area 213 is an area where the light intensity falls still more than the area 212 and is shown by bright gray among the gray steps. The area 214 is an area where the light intensity falls still more than the area 213 and is shown by middle gray among the gray steps. The area 215 is an area where the light intensity falls still more than the area 214 and is shown by slightly dark gray among the gray steps. The area 216 is an area where the light intensity is the weakest and is shown by the darkest gray among the gray steps. The area above the area 216 is shown by black showing no light intensity.

The light intensity will be described in detail using FIG. 10A through FIG. 10D. FIG. 10A through FIG. 10D are views describing movement of the user's face in the vertical direction and show states observed from the left side of the user.

Figure 10A:
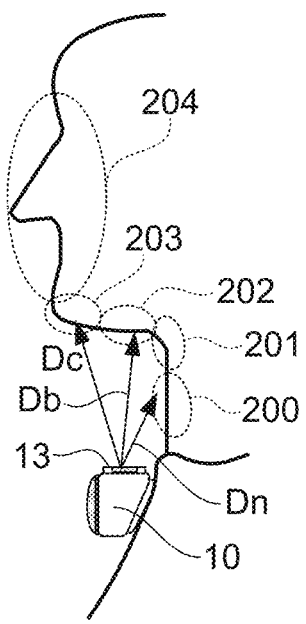
FIG. 10A through FIG. 10D are views describing movements of the user's face in a vertical direction.

FIG. 10A is a view showing a state where the user faces the front. There is the image-pickup/detection unit 10 in front of the clavicles of the user. Moreover, the infrared light 23 of the infrared LEDs 22 irradiates the lower part of the user's head from the face direction detection window 13 mounted in the upper portion of the image-pickup/detection unit 10. A distance Dn from the face direction detection window 13 to the throat 200 above the clavicles of the user, a distance Db from the face direction detection window 13 to the root 202 of the jaw, and a distance Dc from the face direction detection window 13 to the chin 203 satisfy a relation of Dn<Db<Dc. Since light intensity is in inverse proportion to the square of distance, the light intensity in the image formed by the reflected light 25 from the infrared irradiation surface 24 on the sensor becomes gradually weaker in the order of the throat 200, the root 202 of the jaw, and the chin 203. Moreover, since the distance from the face direction detection window 13 to the face 204 including the nose is still longer than the distance Dc, the light intensity in the image corresponding to the face 204 becomes still weaker. That is, in the case as shown in FIG. 10A, the image having the light intensity distribution shown in FIG. 8F is obtained.

It should be noted that the configuration of the face direction detection unit 20 is not limited to the configuration shown in this embodiment as long as the face direction of the user can be detected. For example, the infrared LEDs 22 may project an infrared pattern, and the sensor of the infrared detection device 27 may detect the infrared pattern reflected from an irradiation target. In this case, it is preferable that the sensor of the infrared detection device 27 is constituted by a structural optical sensor. Moreover, the sensor of the infrared detection device 27 may be a sensor, such as a ToF (Time of Flight) sensor, that compares the phase of the infrared light 23 and the phase of the reflected light 25.

Next, the extraction of the throat position in the step S209 in FIG. 7C will be described using FIG. 8G.

Figure 8G:
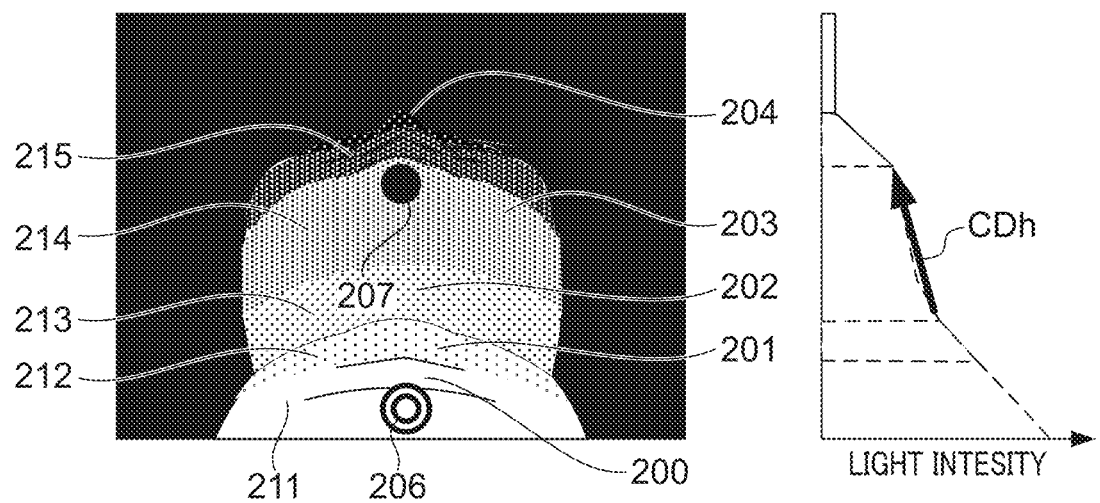
FIG. 8G is a view obtained by superimposing reference numerals denoting parts of a user's body, a double circle showing a throat position, and a black circle showing a chin position on FIG. 8F.

A left image in FIG. 8G is obtained by superimposing the reference numerals denoting the parts of the user's body shown in FIG. 10A, a double circle showing the throat position, and a black circle showing the chin position on FIG. 8F.

The white area 211 corresponds to the throat 200 (FIG. 10A), the quite bright gray area 212 corresponds to the neck front part 201 (FIG. 10A), and the bright gray area 213 corresponds to the root 202 of the jaw (FIG. 10A). Moreover, the middle gray area 214 corresponds to the chin 203 (FIG. 10A), and the slightly dark gray area 215 corresponds to a lip located in the lower part of the face 204 (FIG. 10A) and a face lower part around the lip. Furthermore, the darkest gray area 216 corresponds to the nose located in the center of the face 204 (FIG. 10A) and a face upper part around the nose.

Since the difference between the distances Db and Dc is relatively small as compared with the differences between the other distances from the face direction detection window 13 to other parts of the user as shown in FIG. 10A, the difference between the reflected light intensities in the bright gray area 213 and the middle gray area 214 is also small.

In the meantime, since the distance Dn is the shortest distance among the distances from the face direction detection window 13 to the parts of the user as shown in FIG. 10A, the reflection light intensity in the white area 211 corresponding to the throat 200 becomes the strongest.

Accordingly, the overall control CPU 101 determines that the area 211 corresponds to the throat 200 and its periphery, and then, sets the position 206 (indicated by the double circle in FIG. 8G), which is located at the center in the lateral direction and is the nearest to the image-pickup/detection unit 10, as the position of the head rotation center (hereinafter referred to as a throat position 206). The processes up to the moment are the contents performed in the step S209 in FIG. 7C.

Next, the extraction of the chin position in the step S210 in FIG. 7C will be described using FIG. 8G. In the image in FIG. 8G, the middle gray area 214 that is brighter than the area 215 corresponding to the face lower part including the lip of the face 204 includes the chin. A graph on the right side in FIG. 8G shows that the light intensity falls sharply in the area 215 adjacent to the area 214 because the change rate of the distance from the face direction detection window 13 becomes large.

The overall control CPU 101 determines that the brighter area 214 adjacent to the area 215 in which the light intensity falls sharply is a chin area. Furthermore, the overall control CPU 101 calculates (extracts) the position (indicated by the black circle shown in FIG. 8G), which is located at the center in the lateral direction in the area 214 and is the farthest from the throat position 206, as a chin position 207.

Figure 8H:
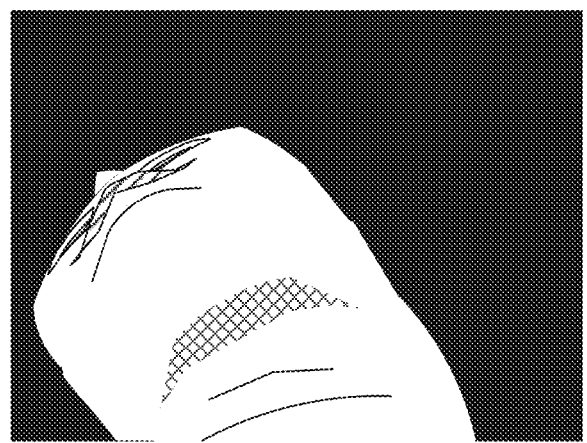
FIG. 8H is a view showing a difference image calculated by the similar method as FIG. 8E in directing the user's face to the right.
Figure 8I:
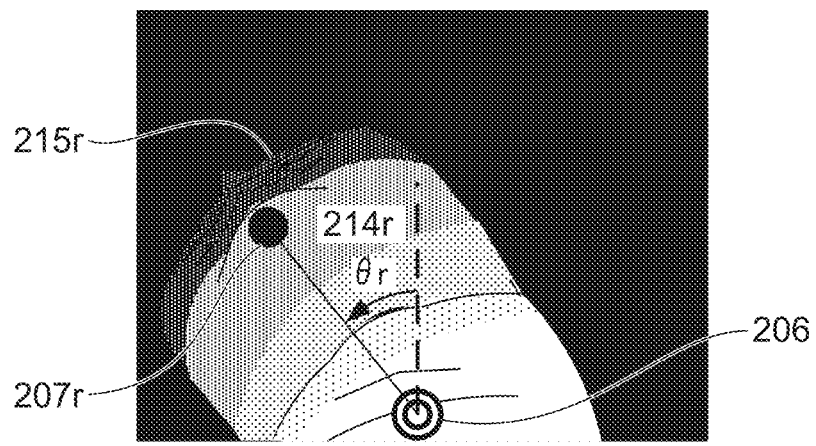
FIG. 8I is a view showing a result obtained by adjusting shades of the difference image in FIG. 8H so as to fit with a scale of light intensities of reflected components of infrared light projected to a face and neck of the user and by superimposing the double circle showing the throat position and the black circle showing the chin position.

For example, FIG. 8H and FIG. 8I show changes in directing the face to the right. FIG. 8H is a view showing a difference image calculated by the similar method as FIG. 8E in directing the user's face to the right. FIG. 8I is a view showing a result obtained by adjusting shades of the difference image in FIG. 8H so as to fit with a scale of light intensities of reflected components of the infrared light projected to the face and neck of the user and by superimposing the double circle showing the throat position 206 as the position of the neck rotation center and the black circle showing a chin position 207r.

Since the user's face is directed to the right, the area 214 moves to an area 214r shown in FIG. 8I that is located in the left side when it is looked up from the image-pickup/detection unit 10. The area 215 corresponding to the face lower part including the lip in the face 204 also moves to an area 215r that is located in the left side when it is looked up from the image-pickup/detection unit 10.

Accordingly, the overall control CPU 101 determines that the brighter area 214r adjacent to the area 215r in which the light intensity falls sharply is the chin area. Furthermore, the overall control CPU 101 calculates (extracts) the position (indicated by the black circle shown in FIG. 8I), which is located at the center in the lateral direction in the area 214r and is the farthest from the throat position 206, as the chin position 207r.

After that, the overall control CPU 101 finds a moving angle θr that shows the rotational movement to the right from the chin position 207 in the image in FIG. 8G to the chin position 207r in FIG. 8I around the throat position 206. As shown in FIG. 8I, the moving angle θr is an angle of movement of the user's face in the lateral direction.

According to the above-mentioned method, the angle of face (hereinafter, referred to as a face angle) of the user in the lateral direction is calculated in the step S210 from the chin position detected by the infrared detection device 27 of the face direction detection unit (a three-dimensional detection sensor) 20.

Figure 10B:
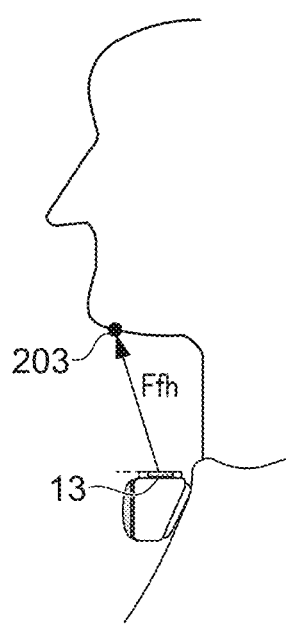
Figure 10C:
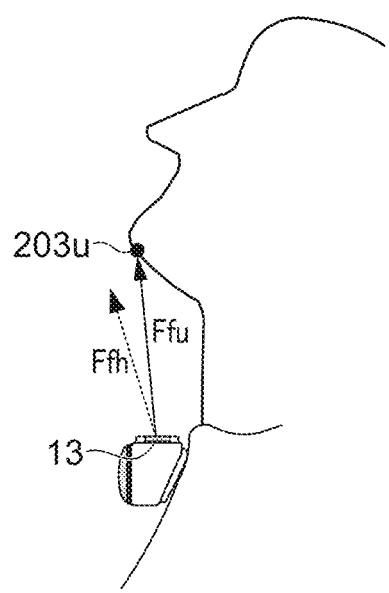

Next, detection of the face directed upward will be described. FIG. 10B is a view showing a state where the user directs the face horizontally. FIG. 10C is a view showing a state where the user directs the face upward by 33° from the horizontal direction.

The distance from the face direction detection window 13 to the chin 203 is Ffh in FIG. 10B, and the distance from the face direction detection window 13 to a chin 203u is Ffu in FIG. 10C. Since the chin 203u moves upwardly together with the face, the distance Ffu becomes longer than the distance Ffh as shown in FIG. 10C.

Figure 8J:
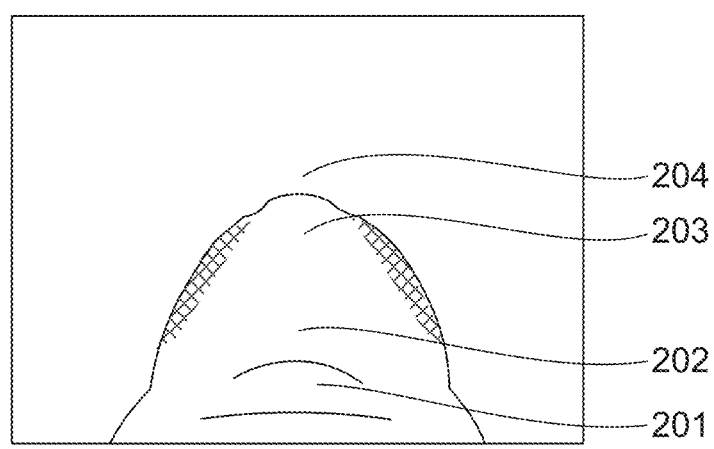
FIG. 8J is a view showing an image of the user who directs the face upward by 33° viewed from the face direction detection window.
Figure 8K:
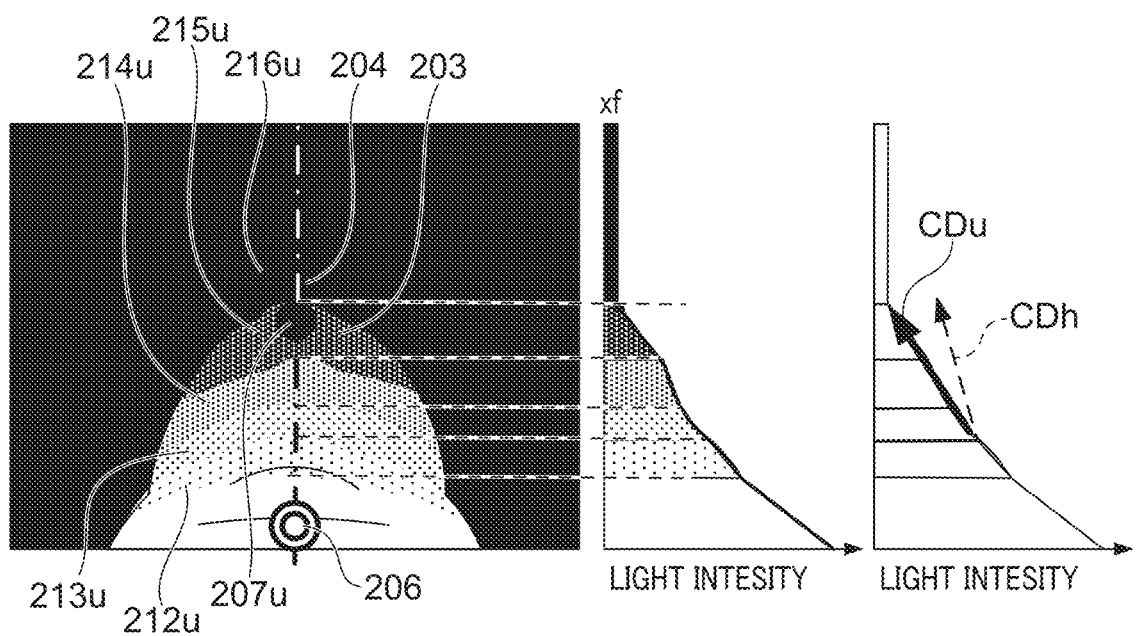
FIG. 8K is a view showing a result obtained by adjusting shades of a difference image, which is calculated by the similar method as FIG. 8E in a case that the user directs the face upward by 33°, so as to fit with a scale of light intensities of reflected components of infrared light projected to a face and neck of the user and by superimposing the double circle showing the throat position and the black circle showing the chin position.

FIG. 8J is a view showing an image of the user who directs the face upward by 33° from the horizontal direction viewed from the face direction detection window 13. Since the user directs the face upward as shown in FIG. 10C, the face 204 including the lip and nose cannot be seen from the face direction detection window 13 located under the user's jaw. The chin 203 and its neck side are seen. FIG. 8K shows distribution of the light intensity of the reflected light 25 in irradiating the user in the state shown in FIG. 10C with the infrared light 23. An image on the left side in FIG. 8K is a view showing a result obtained by adjusting shades of the difference image calculated by the same method as FIG. 8E so as to fit with a scale of light intensities of reflected components of the infrared light projected to the face and neck of the user and by superimposing the double circle showing the throat position 206 and the black circle showing a chin position 207u. Two graphs in FIG. 8K show density changes of the left image. The left graph is equivalent to the graph in FIG. 8F and the right graph is equivalent to the graph in FIG. 8G.

Six areas 211u, 212u, 213u, 214u, 215u, and 216u corresponding to the light intensities in FIG. 8K are indicated by adding "u" to the reference numerals of the same light intensity areas shown in FIG. 8F. Although the light intensity of the user's chin 203 is included in the middle gray area 214 in FIG. 8F, it shifts to the black side and is included in the slightly dark gray area 215u in FIG. 8K. In this way, since the distance Ffu is longer than the distance Ffh as shown in FIG. 10C, the infrared detection device 27 can detect that the light intensity of the reflected light 25 from the chin 203 is weakened in inverse proportion to the square of distance.

Figure 10D:
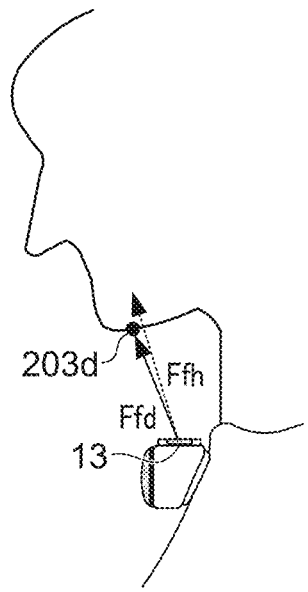

Next, detection of the face directed downward will be described. FIG. 10D is a view showing a state that the user directs the face downward by 22° from the horizontal direction. In FIG. 10D, a distance from the face direction detection window 13 to a chin 203d is Ffd.

Since the chin 203d moves downwardly together with the face, the distance Ffd becomes shorter than the distance Ffh as shown in FIG. 10D and the light intensity of the reflected light 25 from the chin 203 becomes stronger.

Referring back to FIG. 7C, in a step S211, the overall control CPU 101 calculates the distance from the chin position to the face direction detection window 13 on the basis of the light intensity of the chin position detected by the infrared detection device 27 of the face direction detection unit (a three-dimensional detection sensor) 20. A face angle in the vertical direction is also calculated on the basis of this.

In a step S212, the overall control CPU 101 stores the face angle in the lateral direction obtained in the step S210 and the face angle in the vertical direction obtained in the step S211 into the primary memory 103 as a three-dimensional observation direction vi ("i" is an arbitrary reference numeral) of the user. For example, when the user is observing the front center, the face angle θh in the lateral direction is 0° and the face angle θv in the vertical direction is 0°. Accordingly, an observation direction vo in this case is represented by vector information [0°, 0°]. Moreover, when the user is observing a right 45° direction, an observation direction vr is represented by vector information [45°, 0°].

Although the face angle in the vertical direction is calculated by detecting the distance from the face direction detection window 13 in the step S211, the face angle may be calculated by another method. For example, change of the face angle may be calculated by comparing change levels of the light intensity of the chin 203. That is, the change of the face angle may be calculated by comparing a gradient CDh of the reflected light intensity from the root 202 of the jaw to the chin 203 in the graph in FIG. 8G with a gradient CDu of the reflected light intensity from the root 202 of the jaw to the chin 203 in the graph in FIG. 8K.

Figure 7D:
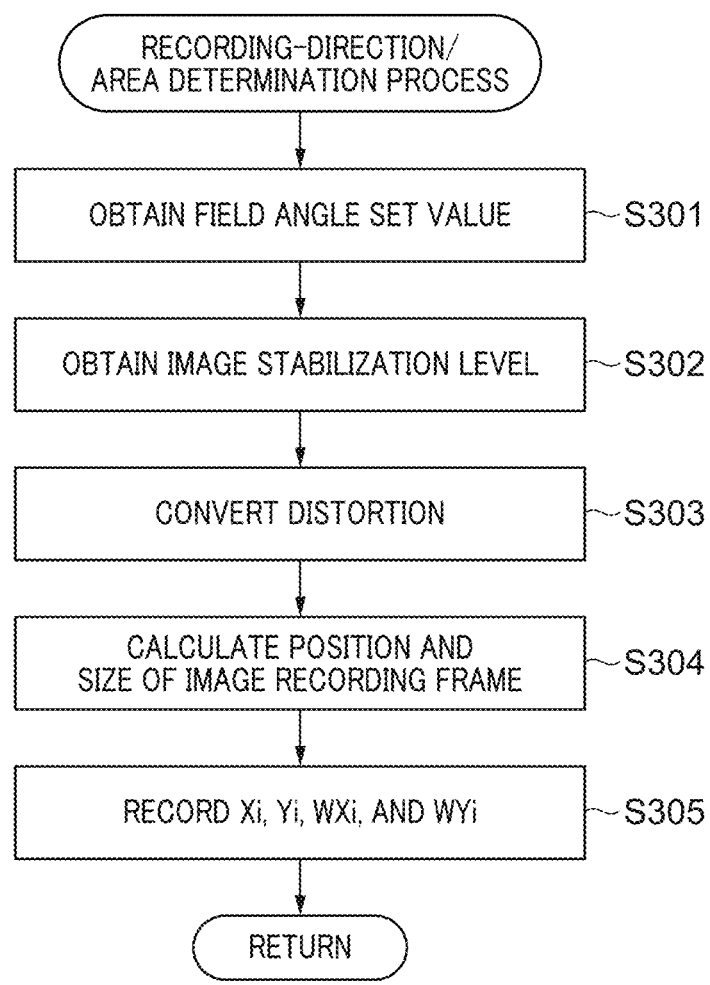
FIG. 7D is a flowchart showing a subroutine of a recording-direction/area determination process in a step S300 in FIG. 7A according to the first embodiment.

FIG. 7D is a flowchart showing a subroutine of the recording-direction/area determination process in the step S300 in FIG. 7A. Before describing details of this process, a superwide-angle image that is subjected to determine a recording direction and a recording area in this embodiment will be described first using FIG. 11A.

In the camera body 1 of this embodiment, the image pickup unit 40 picks up a superwide-angle image of the periphery of the image-pickup/detection unit 10 using the superwide-angle image pickup lens 16. An image of an observation direction can be obtained by extracting a part of the superwide-angle image.

Figure 11A:
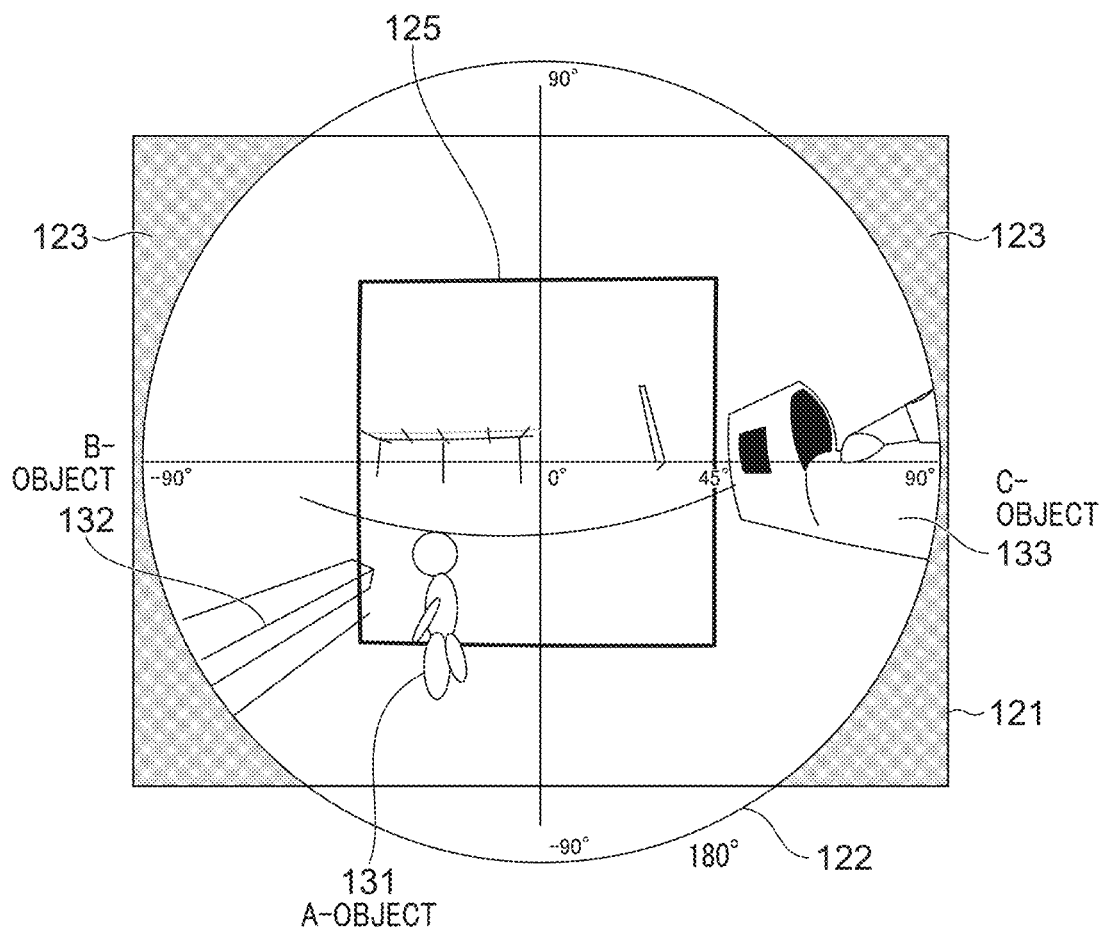
FIG. 11A is a view showing a target visual field set in a superwide-angle image picked up by an image pickup unit of the camera body in a case where the user faces the front.

FIG. 11A is a view showing a target visual field 125 set in a superwide-angle image picked up by the image pickup unit 40 in a case where the user faces the front.

As shown in FIG. 11A, a pixel area 121 that can be picked up by the solid state image sensor 42 is a rectangular area. Moreover, an effective projection area (a predetermined area) 122 is an area of a circular half-celestial sphere image that is a fish-eye image projected onto the solid state image sensor 42 by the image pickup lens 16. The image pickup lens 16 is adjusted so that the center of the pixel area 121 will match the center of the effective projection area 122.

The outermost periphery of the circular effective projection area 122 shows a position where an FOV (field of view) angle is 180°. When the user is looking at the center in both the vertical and horizontal directions, an angular range of the target visual field 125 that is picked up and recorded becomes 90° (a half of the FOV angle) centered on the center of the effective projection area 122. It should be noted that the image pickup lens 16 of this embodiment can also introduce light outside the effective projection area 122 and can project light within the maximal FOV angle 192° onto the solid state image sensor 42 as a fish-eye image. However, the optical performance falls greatly in the area outside the effective projection area 122. For example, resolution falls extremely, light amount falls, and distortion increases. Accordingly, in this embodiment, an image of an observation direction is extracted as a recording area only from the inside of the image (hereinafter referred to as a superwide-angle image, simply) projected in the pixel area 121 within the half-celestial sphere image displayed on the effective projection area 122.

Since the size of the effective projection area 122 in the vertical direction is larger than the size of the short side of the pixel area 121, the upper and lower ends of the image in the effective projection area 122 are out of the pixel area 121 in this embodiment. However, the relation between the areas is not limited to this. For example, the optical system may be designed so that the entire effective projection area 122 will be included in the pixel area 121 by changing the configuration of the image pickup lens 16. Invalid pixel areas 123 are parts of the pixel area 121 that are not included in the effective projection area 122.

The target visual field 125 shows an area of an image of a user's observation direction that will be extracted from the superwide-angle image. The target visual field 125 is prescribed by left, right, upper, and lower field angles (45° in this case, the FOV angle 90°) centering on the observation direction. In the example of FIG. 11A, since the user faces the front, the center of the target visual field 125 becomes the observation direction vo that matches the center of the effective projection area 122.

The superwide-angle image shown in FIG. 11A includes an A-object 131 that is a child, a B-object 132 that shows steps that the child who is the A-object is trying to climb, and a C-object 133 that is locomotive-type playground equipment.

Next, the recording-direction/area determination process in the step S300 in FIG. 7A that is executed to obtain an image of an observation direction from the superwide-angle image described using FIG. 11A is shown in FIG. 7D. Hereinafter, this process is described using FIG. 12A through FIG. 12G that show concrete examples of the target visual field 125.

In a step S301, a field-angle set value $V_{ang}$ that is set in advance is obtained by reading from the primary memory 103.

In this embodiment, the internal nonvolatile memory 102 stores all the available field angles (45°, 90°, 110°, and 130°) as field-angle set values $V_{ang}$. The image extraction/development unit 50 extracts an image of an observation direction in an area defined by the field-angle set value $V_{ang}$ from the superwide-angle image. Moreover, the field-angle set value $V_{ang}$ included in the various set values read from the internal nonvolatile memory 102 in one of the steps S103, S106, and S108 in FIG. 7B is established and is being stored in the primary memory 103.

Moreover, in the step S301, the observation direction vi determined in the step S212 is determined as the recording direction, an image in the target visual field 125 of which the center is designated by the observation direction vi and of which an area is defined by the obtained field-angle set value $V_{ang}$ is extracted from the superwide-angle image, and the extracted image is stored into the primary memory 103.

Figure 11B:
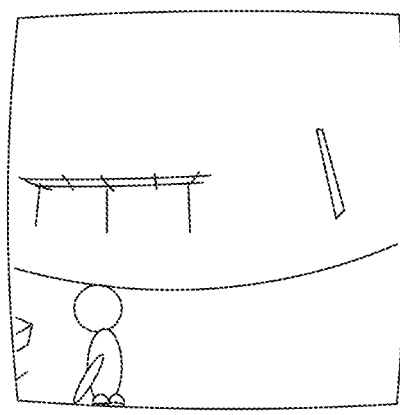
FIG. 11B is a view showing an image in the target visual field extracted from the superwide-angle image in FIG. 11A.

For example, when the field-angle set value $V_{ang}$ is 90° and the observation direction vo (vector information [0°, 0°]) is detected through the face direction detection process (FIG. 7C), the target visual field 125 of which the angular widths are 45° in left and right and are 45° in up and down (FIG. 11A) is established centering on the center O of the effective projection area 122. FIG. 11B is a view showing the image in the target visual field 125 extracted from the superwide-angle image in FIG. 11A. That is, the overall control CPU 101 sets the angle of the face direction detected by the face direction detection unit 20 to the observation direction vi that is the vector information showing the relative position of the target visual field 125 with respect to the superwide-angle image.

In the case of the observation direction vo, since the influence of the optical distortion caused by the image pickup lens 16 can be disregarded mostly, the shape of the established target visual field 125 is almost identical to the shape of a target visual field 125o (FIG. 12A) after converting the distortion in a step S303 mentions later. Hereinafter, a target visual field after converting the distortion in the case of the observation direction vi is called a target visual field 125i.

Next, an image stabilization level that is set in advance is obtained by reading from the primary memory 103 in a step S302.

In this embodiment, as mentioned above, the image stabilization level included in the various setting values read from the internal nonvolatile memory 102 in one of the steps S103, S106, and S108 is established and is being stored in the primary memory 103.

Moreover, in the step S302, an image-stabilization-margin pixel number Pis is set on the basis of the obtained image stabilization level.

In the image stabilization process, an image following in a direction opposite to a blur direction is obtained according to a blur amount of the image-pickup/detection unit 10. Accordingly, in this embodiment, an image stabilization margin required for the image stabilization is established around the target visual field 125i.

Moreover, in this embodiment, a table that keeps values of the image-stabilization-margin pixel number Pis in association with respective image stabilization levels is stored in the internal nonvolatile memory 102. For example, when the image stabilization level is "middle", an image stabilization margin of which width is "100 pixels" that is the image-stabilization-margin pixel number Pis read from the above-mentioned table is established around the target visual field.

Figure 12A:
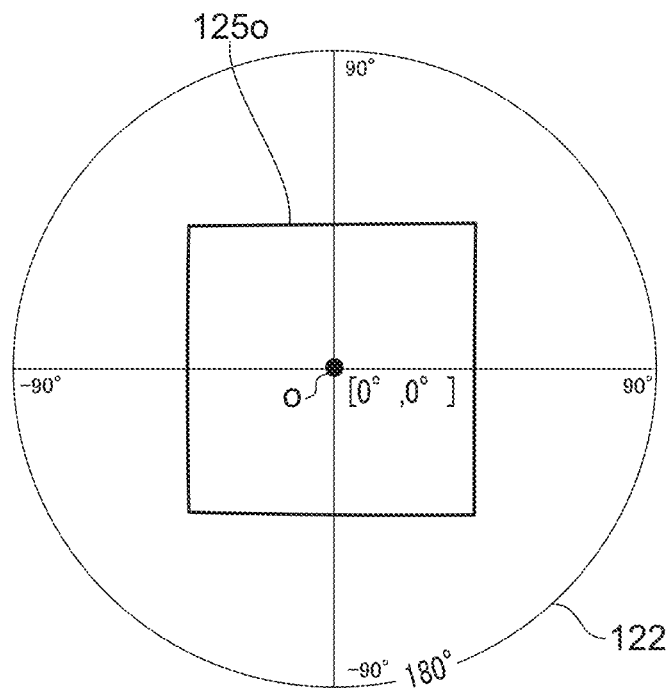
FIG. 12A is a view showing an example of the target visual field set in the superwide-angle image.
Figure 12B:
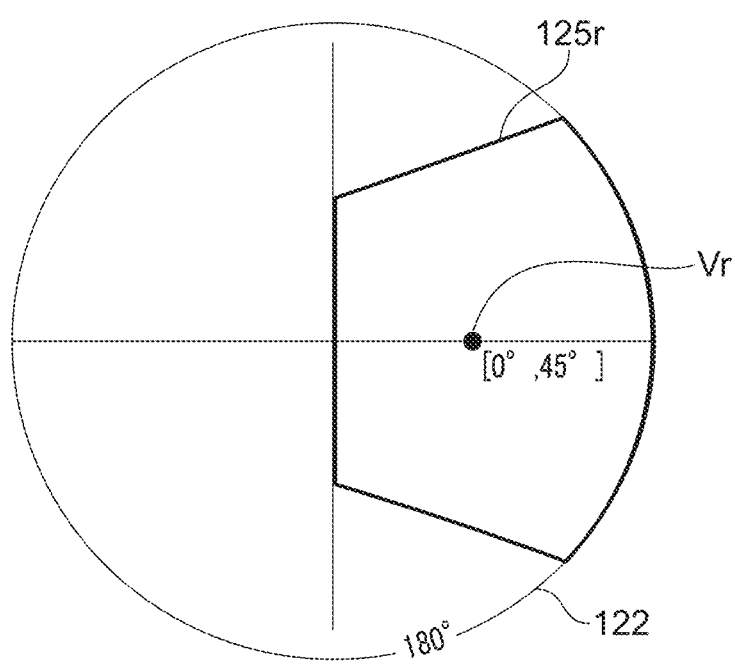
FIG. 12B is a view showing an example of the target visual field set in the superwide-angle image in a case where the field-angle set value is identical to that of the target visual field in FIG. 12A and where the observation direction differs.
Figure 12C:
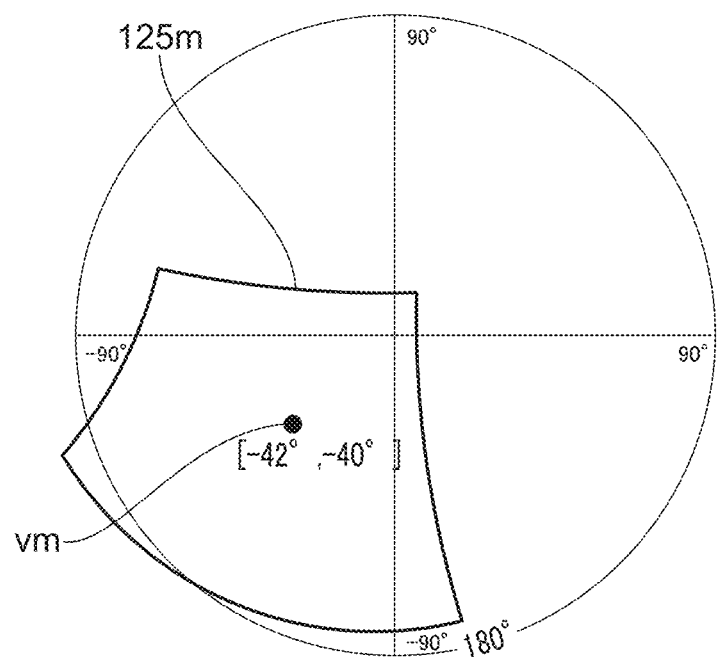
FIG. 12C is a view showing another example of the target visual field set in the superwide-angle image in a case where the field-angle set value is identical to that of the target visual field in FIG. 12A and where the observation direction differs.
Figure 12D:
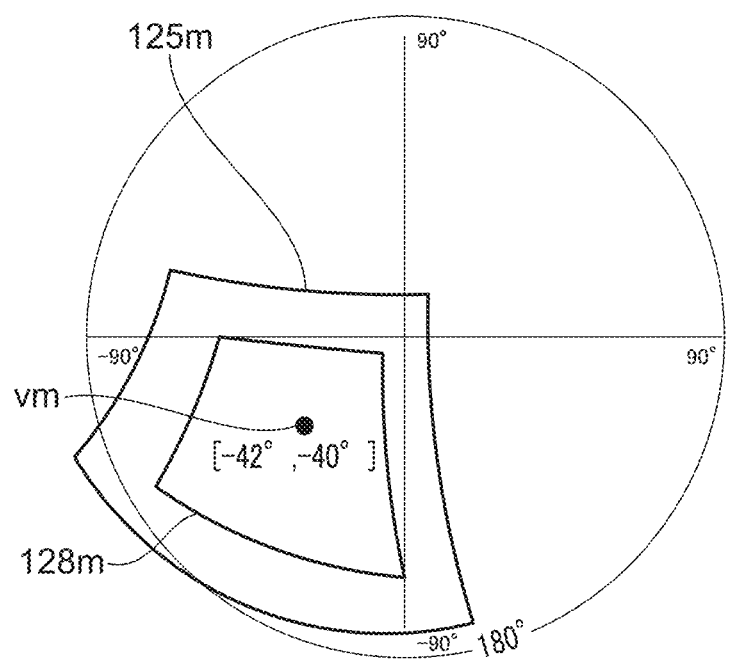
FIG. 12D is a view showing an example of the target visual field set in the superwide-angle image in a case where the observation direction is identical to that of the target visual field in FIG. 12C and where the field-angle set value is smaller.
Figure 12E:
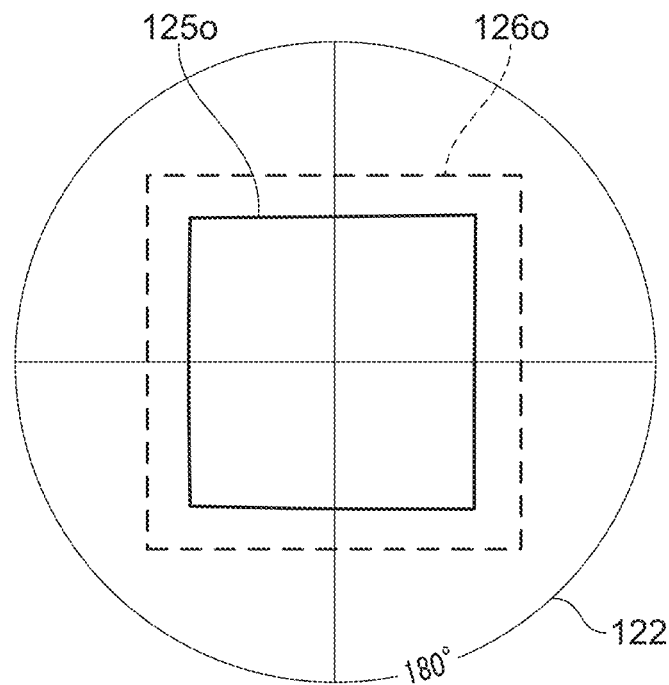
FIG. 12E is a view showing an example that gives an image stabilization margin corresponding to a predetermined image stabilization level around the target visual field shown in FIG. 12A.

FIG. 12E is a view showing an example that gives an image stabilization margin corresponding to a predetermined image stabilization level around the target visual field 125o shown in FIG. 12A. Hereinto, a case where the image stabilization level is "middle", i.e., where the image-stabilization-margin pixel number Pis is "100 pixels" will be described.

As shown by a dotted line in FIG. 12E, an image stabilization margin 126o of which the width is "100 pixels" that is the image-stabilization-margin pixel number Pis is established at the left, right, upper, and lower sides of the target visual field 125o.

FIG. 12A and FIG. 12E show the case where the observation direction vi matches the center O (the optical axis center of the image pickup lens 16) of the effective projection area 122 for simplification of the description. In the meantime, when the observation direction vi is directed to a periphery of the effective projection area 122, the conversion to reduce the influence of optical distortion is required.

In the step S303, the shape of the target visual field 125 established in the step S301 is corrected (converts distortion) in consideration of the observation direction vi and the optical property of the image pickup lens 16 to generate the target visual field 125i. Similarly, the image-stabilization-margin pixel number Pis set in the step S302 is also corrected in consideration of the observation direction vi and the optical property of the image pickup lens 16.

For example, the field-angle set value $V_{ang}$ shall be 90° and the user shall observe a right 45° direction from the center o. In this case, the observation direction vr (vector information [45°, 0°]) is determined in the step S212, and the area of 45° in left and right and 45° in up and down centering on the observation direction vr becomes the target visual field 125. Furthermore, the target visual field 125 is corrected to the target visual field 125r shown in FIG. 12B in consideration of the optical property of the image pickup lens 16.

As shown in FIG. 12B, the target visual field 125r becomes wider toward the periphery of the effective projection area 122. And the position of the observation direction vr approaches inside a little from the center of the target visual field 125r. This is because the optical design of the image pickup lens 16 in this embodiment is close to that of a stereographic projection fish-eye lens. It should be noted that contents of the correction depend on the optical design of the image pickup lens 16. If the image pickup lens 16 is designed as an equidistant projection fish-eye lens, an equal-solid-angle projection fish-eye lens, or an orthogonal projection fish-eye lens, the target visual field 125 is corrected according to its optical property.

Figure 12F:
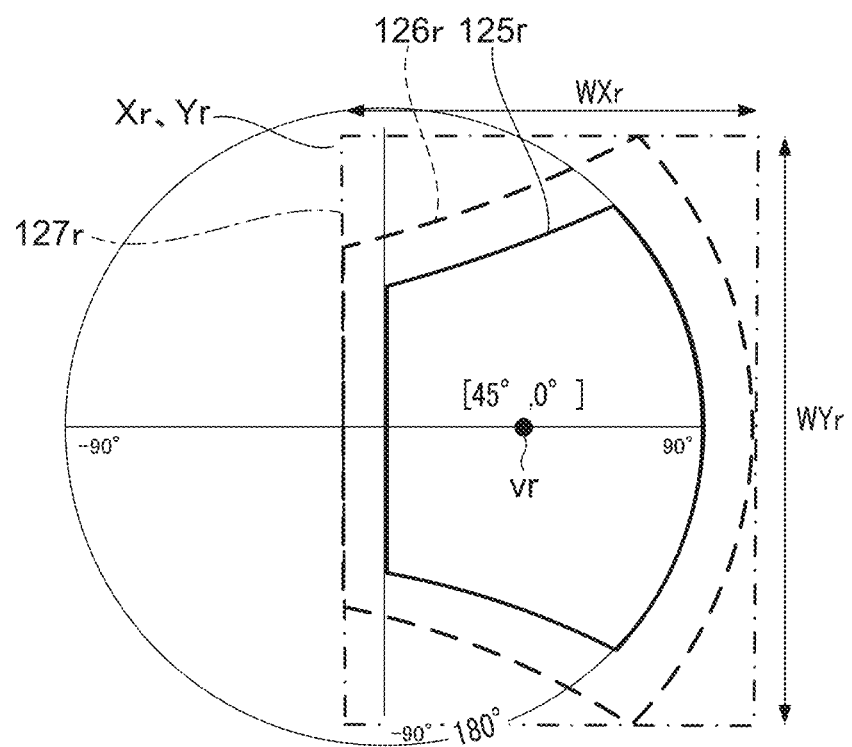
FIG. 12F is a view showing an example that gives an image stabilization margin corresponding to the same image stabilization level of the image stabilization margin in FIG. 12E around the target visual field shown in FIG. 12B.

FIG. 12F is a view showing an example that gives an image stabilization margin 126r corresponding to the same image stabilization level "middle" of the image stabilization margin in FIG. 12E around the target visual field 125r shown in FIG. 12B.

The image stabilization margin 126o (FIG. 12E) is established at the left, right, upper, and lower sides of the target visual field 125o with the width of "100 pixels" that is the image-stabilization-margin pixel number Pis. As compared with this, the image-stabilization-margin pixel number Pis of the image stabilization margin 126r (FIG. 12F) is corrected so as to increase toward the periphery of the effective projection area 122.

In this way, the shape of the image stabilization margin established around the target visual field 125r is also corrected as with the shape of the target visual field 125r so that the correction amount will increase toward the periphery of the effective projection area 122 as shown by the image stabilization margin 126r in FIG. 12F. This is also because the optical design of the image pickup lens 16 in this embodiment is close to that of a stereographic projection fish-eye lens. It should be noted that contents of the correction depend on the optical design of the image pickup lens 16. If the image pickup lens 16 is designed as an equidistant projection fish-eye lens, an equal-solid-angle projection fish-eye lens, or an orthogonal projection fish-eye lens, the image stabilization margin 126r is corrected according to its optical property.

The process executed in the step S303 that switches successively the shapes of the target visual field 125 and its image stabilization margin in consideration of the optical property of the image pickup lens 16 is a complicated process. Accordingly, in this embodiment, the process in the step S303 is executed using a table that keeps shapes of the target visual field 125i and its image stabilization margin for every observation direction vi stored in the internal nonvolatile memory 102. It should be noted that the overall control CPU 101 may have a computing equation corresponding to the optical design of the image pickup lens 16. In such a case, the overall control CPU 101 can calculate an optical distortion value using the computing equation.

In a step S304, a position and size of an image recording frame are calculated. As mentioned above, the image stabilization margin 126i is established around the target visual field 125i. However, when the position of the observation direction vi is close to the periphery of the effective projection area 122, the shape of the image stabilization margin becomes considerably special as shown by the image stabilization margin 126r, for example.

The overall control CPU 101 can extract an image only in such a special-shaped area and apply the development process to the extracted image. However, it is not general to use an image that is not rectangular in recording as image data in the step S600 or in transmitting image data to the display apparatus 800 in the step S700. Accordingly, in the step S304, the position and size of the image recording frame 127i of a rectangular shape that includes the entire image stabilization margin 126i are calculated.

FIG. 12F shows the image recording frame 127r that is calculated in the step S304 to the image stabilization margin 126r by an alternate long and short dash line.

In a step S305, the position and size of the image recording frame 127i that are calculated in the step S304 are recorded into the primary memory 103.

In this embodiment, an upper-left coordinate (Xi, Yi) of the image recording frame 127i in the superwide-angle image is recorded as the position of the image recording frame 127i, and a lateral width WXi and a vertical width WYi that start from the coordinate (Xi, Yi) are recorded as the size of the image recording frame 127i. For example, a coordinate (Xr, Yr), a lateral width WXr, and a vertical width WYr of the image recording frame 127r shown in FIG. 12F are recorded in the step S305. It should be noted that the coordinate (Xi, Yi) is a XY coordinate of which an origin is a predetermined reference point, specifically the optical center of the image pickup lens 16.

When the image stabilization margin 126i and the image recording frame 127i have been determined in this way, the process exits from this subroutine shown in FIG. 7D.

In the description so far, the observation directions of which the horizontal angle is 0°, such as the observation direction v0 (the vector information [0°, 0°]) and the observation direction vr (the vector information [45°, 0°]), have been described for simplifying the description of the complicated optical distortion conversion. In the meantime, an actual observation direction vi of the user is arbitrary. Accordingly, the recording area development process executed in a case where the horizontal angle is not 0° will be described hereinafter. For example, when the field-angle set value $V_{ang}$ is 90° and the observation direction vm is [−42°, −40°], the target visual field 125m appears as shown in FIG. 12C.

Figure 12G:
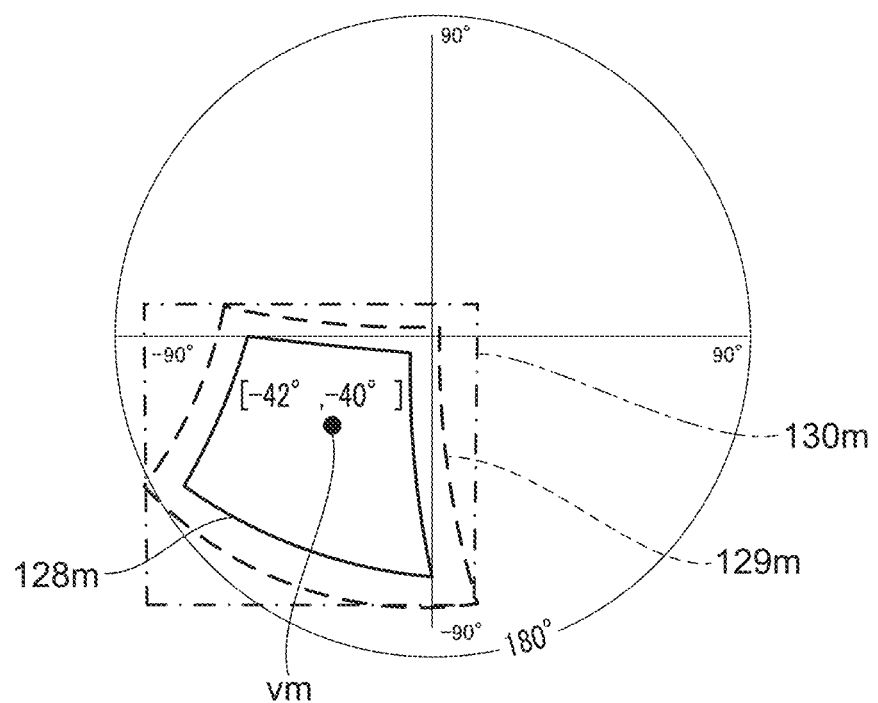
FIG. 12G is a view showing an example that gives an image stabilization margin corresponding to the same image stabilization level of the image stabilization margin in FIG. 12E around the target visual field shown in FIG. 12D.

Moreover, even when the observation direction vm (the vector information [−42°, −40°]) is the same as the target visual field 125m, when the field-angle set value $V_{ang}$ is 45°, a target visual field 128m, which is slightly smaller than the target visual field 125m, appears as shown in FIG. 12D. Furthermore, an image stabilization margin 129m and an image recording frame 130m are set for the target visual field 128m as shown in FIG. 12G.

Since the process in the step S400 is a fundamental image pickup operation and employs a general sequence of the image pickup unit 40, its detailed description is omitted. It should be noted that the image-signal processing circuit 43 in the image pickup unit 40 in this embodiment also performs a process that converts signals of an inherent output format (standard examples: MIPI, SLVS) output from the solid state image sensor 42 into pickup image data of a general sensor reading system.

When the video image mode is selected by the image pickup mode switch 12, the image pickup unit 40 starts recording in response to a press of the start switch 14. After that, the recording is finished when the stop switch 15 is pressed. In the meantime, when the still image mode is selected by the image pickup mode switch 12, the image pickup unit 40 picks up a static image every time when the start switch 14 is pressed.

Figure 7E:
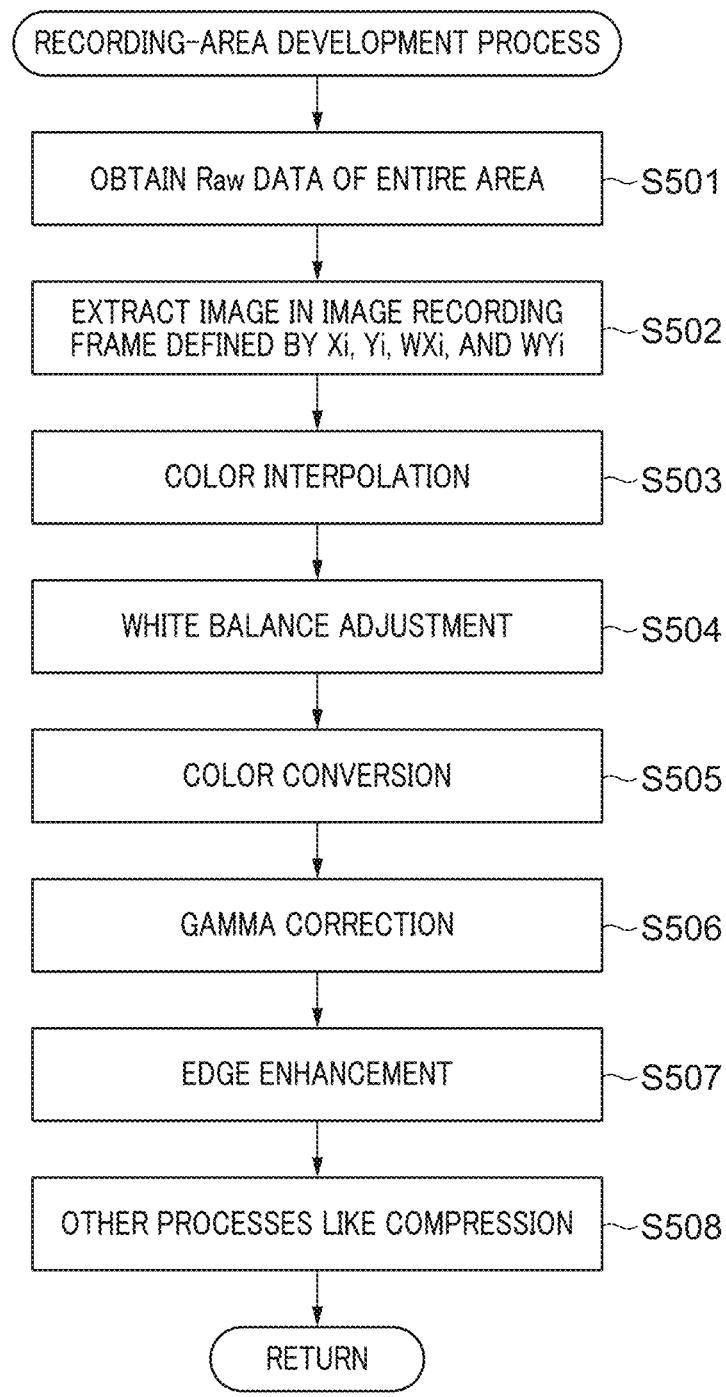
FIG. 7E is a flowchart showing a subroutine of a recording-area development process in a step S500 in FIG. 7A according to the first embodiment.

FIG. 7E is a flowchart showing a subroutine of the recording-area development process in the step S500 in FIG. 7A.

In a step S501, Raw data of the entire area of the pickup image data (superwide-angle image) generated by the image pickup unit 40 in the step S400 is obtained and is input into an image capturing unit called a head unit (not shown) of the overall control CPU 101.

Next, in a step S502, the image within the image recording frame 127i is extracted from the superwide-angle image obtained in the step S501 on the basis of the coordinate (Xi, Yi), lateral width WXi, and vertical width WYi that are recorded into the primary memory 103 in the step S305. After the extraction, a crop development process (FIG. 7F) consisting of steps S502 through S508 mentioned later is started only to the pixels within the image stabilization margin 126i. This can reduce a calculation amount significantly as compared with a case where the development process is executed to the entire area of the superwide-angle image read in the step S501. Accordingly, calculation time and electric power consumption can be reduced.

Figure 7F:
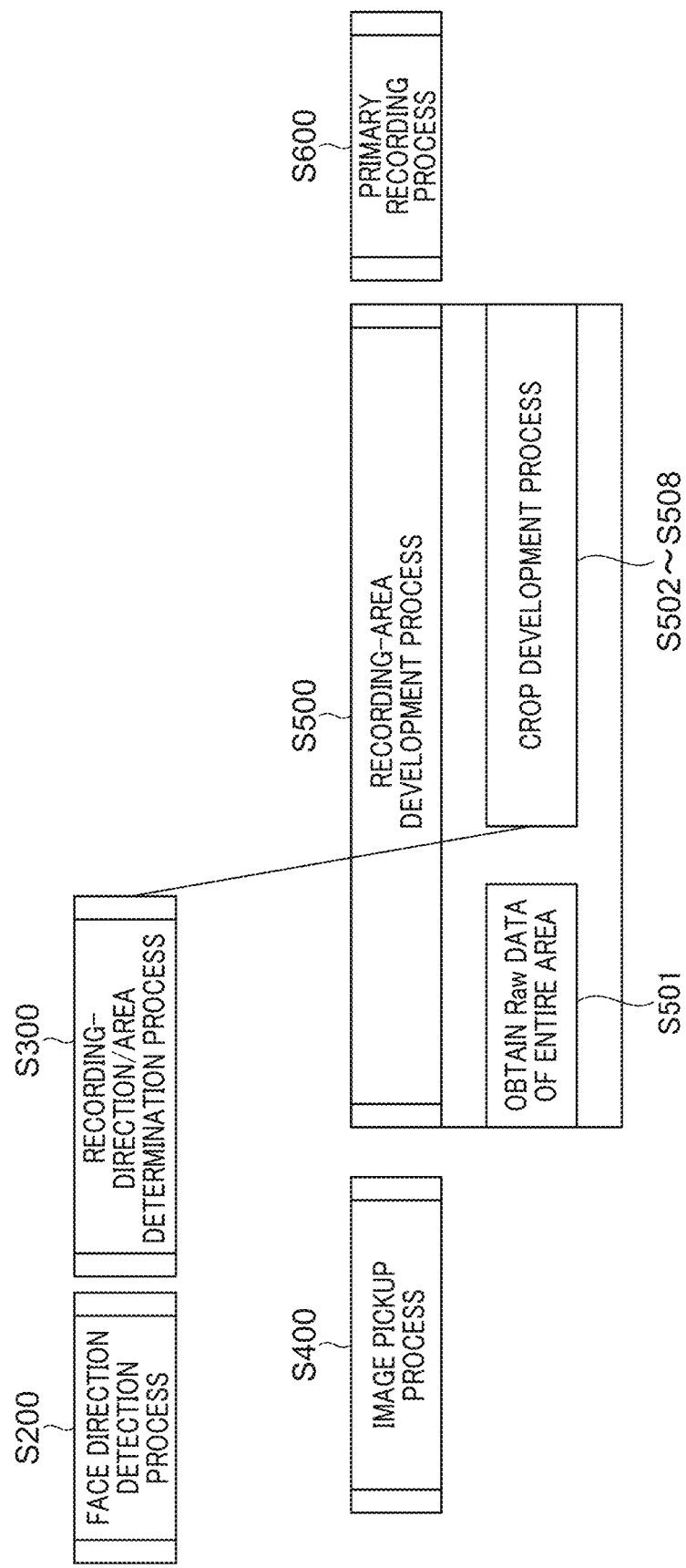
FIG. 7F is a view for describing a process in the steps S200 through S500 in FIG. 7A in a video image mode.

As shown in FIG. 7F, when the video image mode is selected by the image pickup mode switch 12, the processes of the steps S200 and S300 and the process of the step S400 are executed in parallel by the same frame rate or different frame rates. Whenever the Raw data of the entire area of one frame generated by the image pickup unit 40 is obtained, the crop development process is executed on the basis of the coordinate (Xi, Yi), lateral width WXi, and vertical width WYi that are recorded in the primary memory 103 at that time point.

When the crop development process is started to the pixels within the image stabilization margin 126i, color interpolation that interpolates data of color pixels arranged in the Bayer arrangement is executed in the step S503. After that, a white balance is adjusted in a step S504, and then, a color conversion is executed in a step S505. In a step S506, gamma correction that corrects gradation according to a gamma correction value set up beforehand is performed. In a step S507, edge enhancement is performed according to an image size.

In the step S508, the image data is converted into a data format that can be stored primarily by applying processes like compression. The converted image data is stored into the primary memory 103. After that, the process exits from the subroutine. Details of the data format that can be stored primarily will be mentioned later.

The order and presences of the processes in the crop development process executed in the steps S503 through S508 may be set up according to the property of the camera system and they do not restrict the present invention. Moreover, when the video image mode is selected, the processes of the steps S200 through S500 are repeatedly executed until the recording is finished.

According to this process, the calculation amount is significantly reduced as compared with a case where the development process is executed to the entire area read in the step S501. Accordingly, an inexpensive and low-power consumption microcomputer can be employed as the overall control CPU 101. Moreover, heat generation in the overall control CPU 101 is reduced and the life of the battery 94 becomes longer.

Moreover, in order to reduce a control load on the overall control CPU 101, the optical correction process (the step S800 in FIG. 7A) and the image stabilization process (the step S900 in FIG. 7A) to the image are not executed by the camera body 1 in this embodiment. These processes are executed by the display-apparatus controller 801 after transferring the image to the display apparatus 800. Accordingly, if only data of a partial image extracted from a projected superwide-angle image is transferred to the display apparatus 800, neither the optical correction process nor the image stabilization process can be executed. That is, since the data of the extracted image does not include position information that will be substituted to a formula of the optical correction process and will be used to refer the correction table of the image stabilization process, the display apparatus 800 cannot execute these processes correctly. Accordingly, in this embodiment, the camera body 1 transmits correction data including information about an extraction position of an image from a superwide-angle image together with data of the extracted image to the display apparatus 800.

When the extracted image is a still image, since the still image data corresponds to the correction data one-to-one, the display apparatus 800 can execute the optical correction process and image stabilization process correctly, even if these data are separately transmitted to the display apparatus 800. In the meantime, when the extracted image is a video image, if the video image data and the correction data are separately transmitted to the display apparatus 800, it becomes difficult to determine correspondence between each frame of the video image data and the correction data. Particularly, when a clock rate of the overall control CPU 101 in the camera body 1 slightly differs from a clock rate of the display-apparatus controller 801 in the display apparatus 800, the synchronization between the overall control CPU 101 and the display-apparatus controller 801 will be lost during the video image pickup operation for several minutes. This may cause a defect that the display-apparatus controller 801 corrects a frame with correction data different from the corresponding correction data.

Accordingly, in this embodiment, when transmitting data of an extracted video image to the display apparatus 800, the camera body 1 gives its correction data appropriately to the data of the video image. Hereinafter, the method is described.

Figure 14:
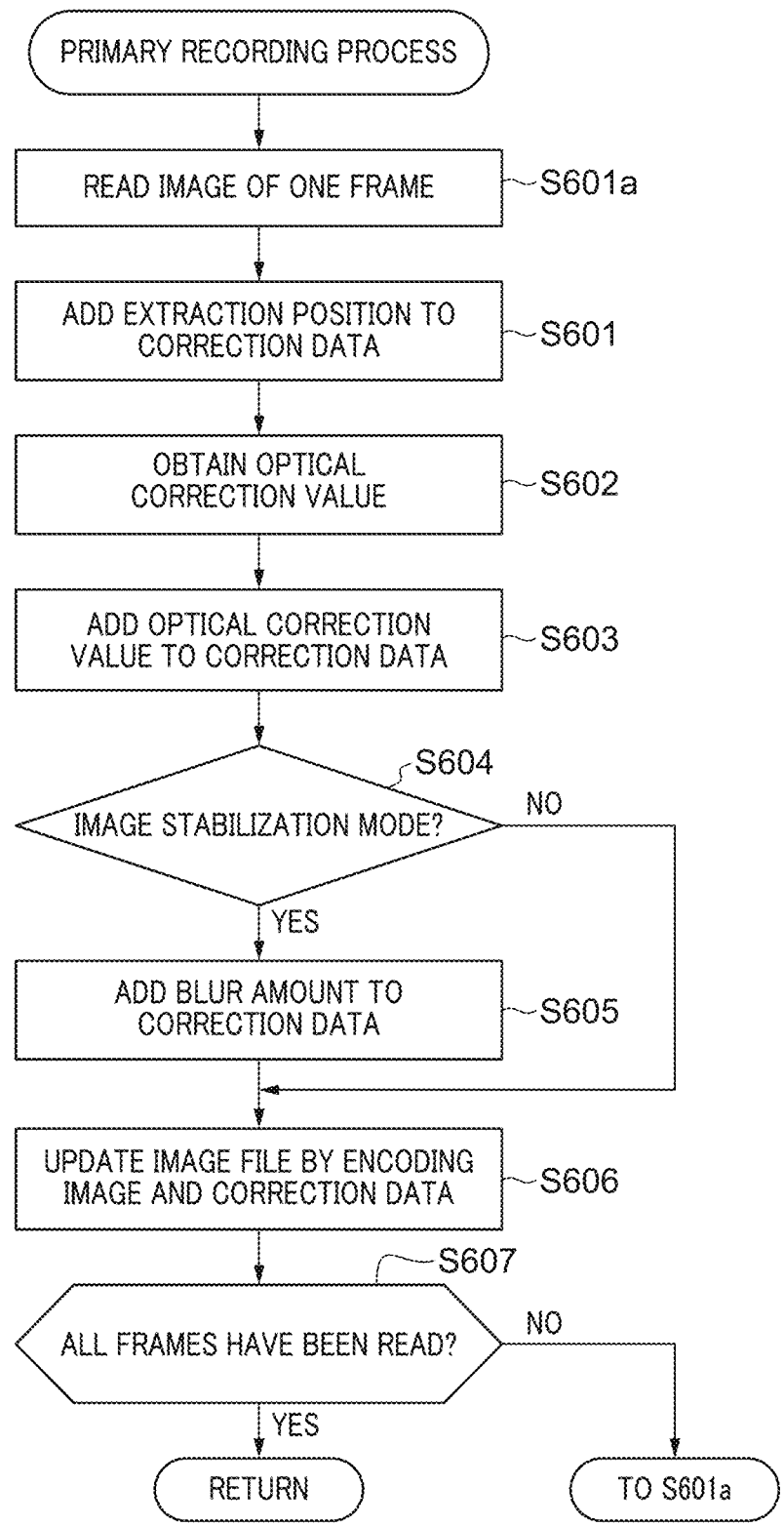
FIG. 14 is a flowchart showing a subroutine of a primary recording process in a step S600 in FIG. 7A.

FIG. 14 is a flowchart showing the subroutine of the primary recording process in the step S600 in FIG. 7A. Hereinafter, this process will be described by also referring to FIG. 15. FIG. 14 shows the process of a case where the video image mode is selected by the image pickup mode switch 12. When the still image mode is selected, this process starts from a step S601 and is finished after a process of a step S606.

In a step S601a, the overall control CPU 101 reads an image of one frame to which the processes in steps S601 through S606 have not been applied from among the video image developed in the recording area development process (FIG. 7E). Moreover, the overall control CPU 101 generates correction data that is metadata of the read frame.

In the step S601, the overall control CPU 101 attaches the information about the extraction position of the image of the frame read in the step S601a to the correction data. The information attached in this step is the coordinate (Xi, Yi) of the image recording frame 127i obtained in the step S305. It should be noted that the information attached in this step may be the vector information that shows the observation direction vi.

In a step S602, the overall control CPU 101 obtains an optical correction value. The optical correction value is the optical distortion value set up in the step S303. Alternatively, the optical correction value may be a correction value corresponding to the lens optical property, such as a marginal-light-amount correction value or a diffraction correction value.

In a step S603, the overall control CPU 101 attaches the optical correction value used for the distortion conversion in the step S602 to the correction data.

In a step S604, the overall control CPU 101 determines whether the image stabilization mode is effective. Specifically, when the image stabilization mode set up in advance is "Middle" or "Strong", it is determined that the image stabilization mode is effective and the process proceeds to a step S605. In the meantime, when the image stabilization mode set up in advance is "OFF", it is determined that the image stabilization mode is not effective and the process proceeds to the step S606. The reason why the step S605 is skipped when the image stabilization mode is "OFF" is because the calculation data amount of the overall control CPU 101 and the data amount of the wireless communication are reduced and the power consumption and heat generation of the camera body 1 can be reduced by skipping the step S605. Although the reduction of the data used for the image stabilization process is described, the data about the marginal-light-amount value or the data about the diffraction correction value obtained as the optical correction value in the step S602 may be reduced.

Although the image stabilization mode is set up by the user's operation to the display apparatus 800 in advance in this embodiment, it may be set up as a default setting of the camera body 1. Moreover, when the camera system is configured to switch the effectiveness of the image stabilization process after transferring image data to the display apparatus 800, the process may directly proceed to the step S605 from the step S603 by omitting the step S604.

In the step S605, the overall control CPU 101 attaches the image stabilization mode, which is obtained in the step S302, and the gyro data, which associates with the frame read in the step S601a and stored in the primary memory 813, to the correction data.

In the step S606, the overall control CPU 101 updates a video file 1000 (FIG. 15) by data obtained by encoding the image data of the frame read in the step S601a and the correction data to which the various data are attached in the steps S601 through S605. It should be noted that when a first frame of the video image is read in the step S601a, the video file 1000 is generated in the step S606.

In a step S607, the overall control CPU 101 determines whether all the frames of the video image developed by the recording area development process (FIG. 7E) have been read. When not all the frames have been read, the process returns to the step S601a. In the meantime, when all the frames have been read, the process exits from this subroutine. The generated video file 1000 is stored into the internal nonvolatile memory 102. The video file may be stored into the large-capacity nonvolatile memory 51 too in addition to the primary memory 813 and the internal nonvolatile memory 102. Moreover, the transmission process (the step S700 in FIG. 7A) that transfers the generated image file 1000 to the display apparatus 800 immediately is executed. The image file 1000 may be stored into the primary memory 813 after transferring it to the display apparatus 800.

In this embodiment, the encoding means combines the image data and the correction data into one file. At that time, the image data may be compressed or the data file that is combined by the image data and correction data may be compressed.

Figure 15:
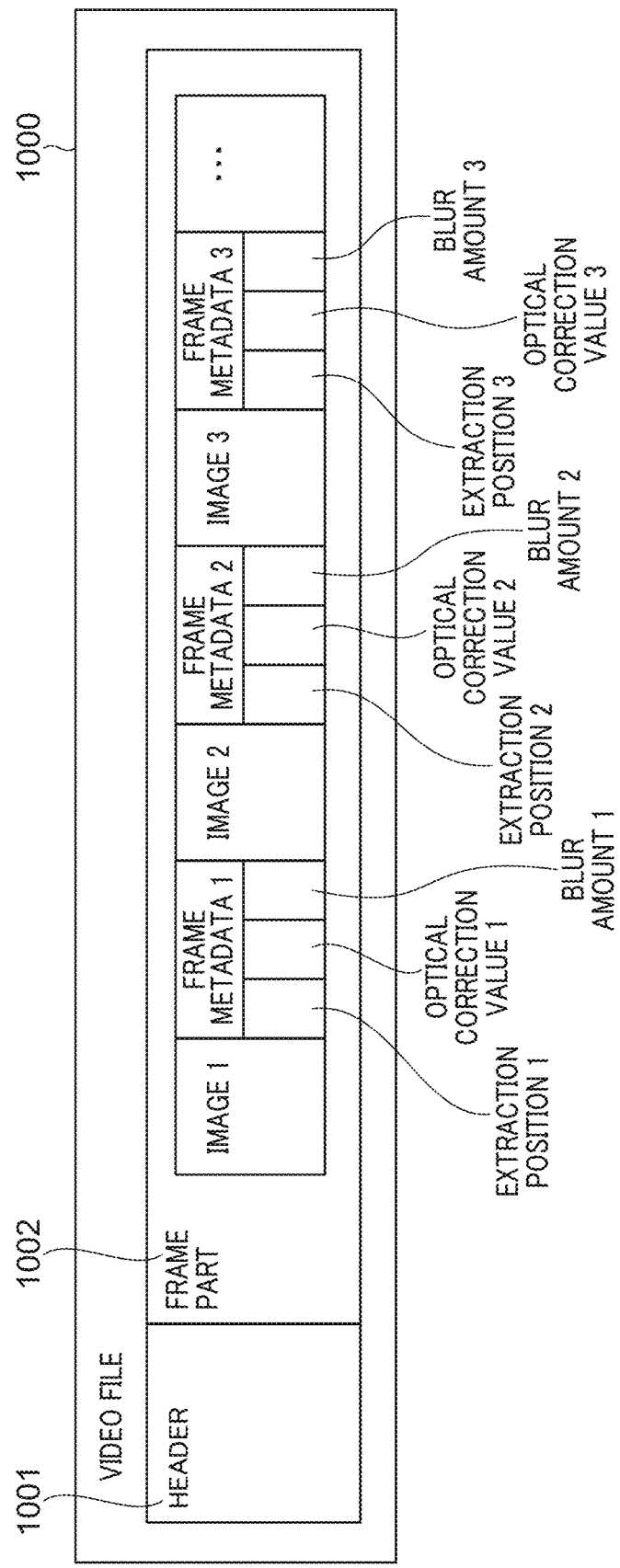
FIG. 15 is a view showing a data structure of an image file generated by the primary recording process.

FIG. 15 is a view showing a data structure of the video file 1000. The video file 1000 consists of a header part 1001 and a frame part 1002. The frame part 1002 consists of frame data sets each of which consists of an image of each frame and corresponding frame metadata. That is, the frame part 1002 includes frame data sets of the number of the total frames of the video image.

In this embodiment, the frame metadata is information obtained by encoding correction data to which an extraction position (in-image position information), an optical correction value, and gyro data are attached if needed. However, the frame metadata is not limited to this. An information amount of the frame metadata may be changed. For example, other information may be added to the frame metadata according to the image pickup mode selected by the image pickup mode switch 12. Alternatively, a part of the information in the frame metadata may be deleted.

An offset value to the frame data sets of each frame or a head addresses of each frame is recorded in the header part 1001. Alternatively, metadata like the time and size corresponding to the video file 1000 may be stored in the header part 1001.

In the primary recording process (FIG. 14), the video file 1000 is transferred to the display apparatus 800 in this way. The video file 100 includes data sets each of which consists of a frame of the video image developed by the recording area development process (FIG. 7E) and its metadata. Accordingly, even when the clock rate of the overall control CPU 101 in the camera body 1 slightly differs from the clock rate of the display-apparatus controller 801 in the display apparatus 800, the display-apparatus controller 801 appropriately applies the correction process to the video image developed in the camera body 1.

Although the optical correction value is included in the frame metadata in this embodiment, the optical correction value may be given to the entire video image.

Figure 16:
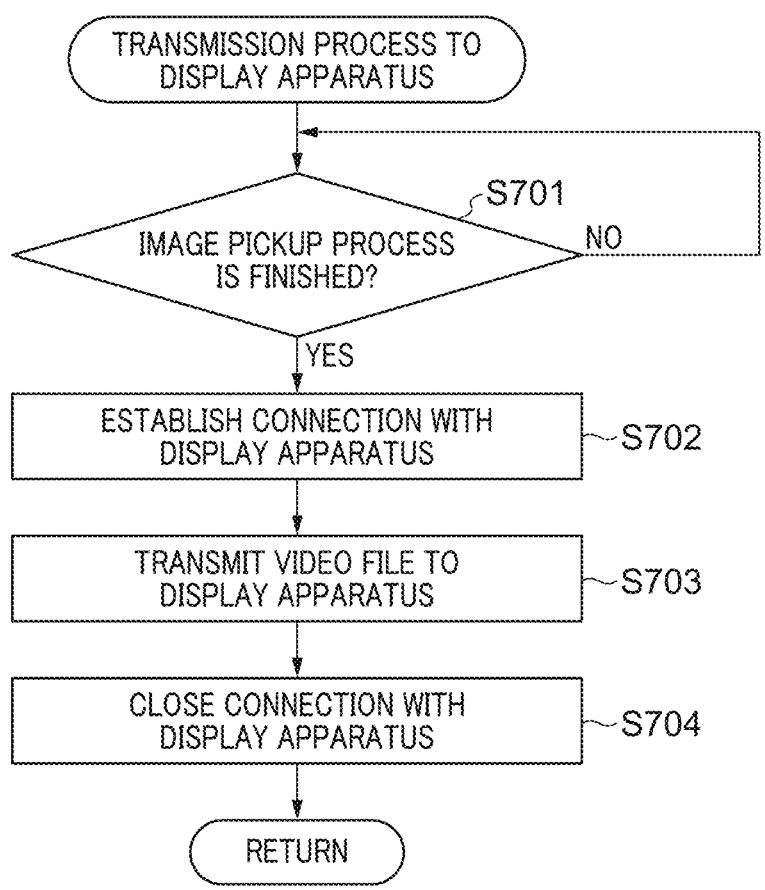
FIG. 16 is a flowchart of the subroutine of a transmission process to the display apparatus in a step S700 in FIG. 7A.

FIG. 16 is a flowchart showing the subroutine of the transmission process to the display apparatus 800 in the step S700 in FIG. 7A. FIG. 16 shows the process of a case where the video image mode is selected by the image pickup mode switch 12. It should be noted that when the still image mode is selected, this process starts from a process in a step S702.

In a step S701, it is determined whether the image pickup process (the step S400) of the video image by the image pickup unit 40 is finished or is under recording. When the video image is recording, the recording area development process (the step S500) for each frame and the update of the image file 1000 (the step S606) in the primary recording process (the step S600) are executed sequentially. Since a power load of wireless transmission is large, if the wireless transmission is performed during the video image pickup operation in parallel, the battery 94 is needed to have large battery capacity or a new measure against heat generation is needed. Moreover, from a viewpoint of arithmetic capacity, if the wireless transmission is performed during the video image pickup operation in parallel, an arithmetic load will become large, which needs to prepare a high-specification CPU as the overall control CPU 101, increasing the cost.

In view of these points, in this embodiment, the overall control CPU 101 proceeds with the process to a step S702 after the video image pickup operation is finished (YES in the step S701), and establishes the wireless connection with the display apparatus 800. In the meantime, if the camera system of the embodiment has a margin in the electric power supplied from the battery 94 and a new measure against heat generation is unnecessary, the overall control CPU 101 may beforehand establish the wireless connection with the display apparatus 800 when the camera body 1 is started or before starting the recording.

In the step S702, the overall control CPU 101 establishes the connection with the display apparatus 800 through the high-speed wireless communication unit 72 in order to transfer the video file 1000 having much data volume to the display apparatus 800. It should be noted that the small-power wireless communication unit 71 is used for transmission of a low-resolution image for checking a field angle to the display apparatus 800 and is used for exchange of various set values with the display apparatus 800. In the meantime, the small-power wireless communication unit 71 is not used for transfer of the video file 1000 because a transmission period becomes long.

In a step S703, the overall control CPU 101 transfers the video file 1000 to the display apparatus 800 through the high-speed wireless communication unit 72. When the transmission is finished, the overall control CPU 101 proceeds with the process to a step S704. In the step S704, the overall control CPU 101 closes the connection with the display apparatus 800 and exits from this subroutine.

The case where one image file includes the images of all the frames of one video image has been described so far. In the meantime, if the recording period of the video image is longer than several minutes, the video image may be divided by a unit time into a plurality of image files. When the video file has the data structure shown in FIG. 15, even if one video image is transferred to the display apparatus 800 as a plurality of image files, the display apparatus 800 can correct the video image without the timing gap with the correction data.

Figure 17:
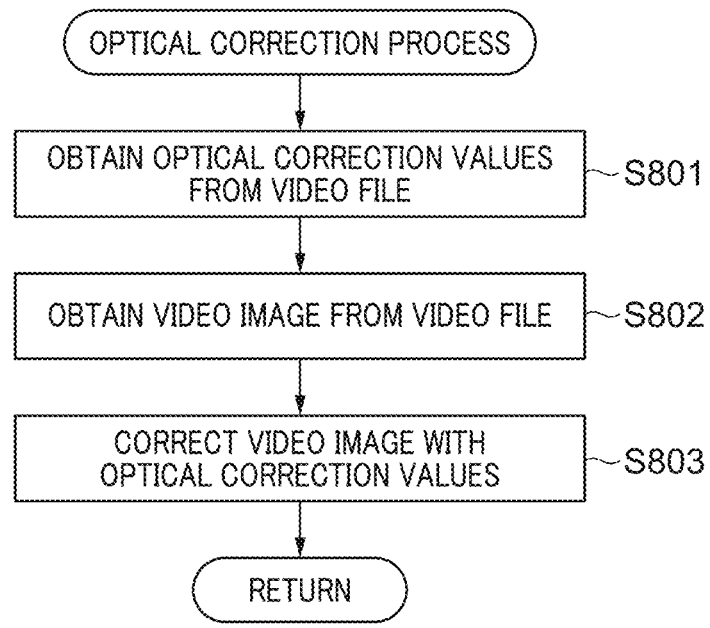
FIG. 17 is a flowchart showing a subroutine of an optical correction process in a step S800 in FIG. 7A.

FIG. 17 is a flowchart showing a subroutine of the optical correction process in the step S800 in FIG. 7A. Hereinafter, this process will be described by also referring to FIG. 18A through FIG. 18E. As mentioned above, this process is executed by the display-apparatus controller 801 of the display apparatus 800.

In a step S801, the display-apparatus controller 801 first receives the video file 1000 from the camera body 1 transferred in the transmission process (the step S700) to the display apparatus 800. After that, the display-apparatus controller 801 obtains the optical correction values extracted from the received video file 1000.

In the next step S802, the display-apparatus controller 801 obtains an image (an image of one frame of the video image) from the video file 1000.

In a step S803, the display-apparatus controller 801 corrects optical aberrations of the image obtained in the step S802 with the optical correction value obtained in the step S801, and stores the corrected image into the primary memory 813. When the extraction from the image obtained in the step S802 is performed in the optical correction, an image area (extraction-development area) that is narrower than the development area (target visual field 125i) determined in the step S303 is extracted and is subjected to the process.

FIG. 18A through FIG. 18F are views for describing a process of applying distortion correction in the step S803 in FIG. 17.

FIG. 18A is a view showing a position of an object 1401 at which the user looks with a naked eye in picking up an image. FIG. 18B is a view showing an image of the object 1401 formed on the solid state image sensor 42.

FIG. 18C is a view showing a development area 1402 in the image in FIG. 18B. The development area 1402 is the extraction-development area mentioned above.

FIG. 18D is a view showing an extraction-development image obtained by extracting the image of the development area 1402. FIG. 18E is a view showing an image obtained by correcting distortion in the extraction-development image shown in FIG. 18D. Since an extraction process is performed in correcting distortion of the extraction-development image, a field angle of the image shown in FIG. 18E becomes still smaller than that of the extraction-development image shown in FIG. 18D.

Figure 19:
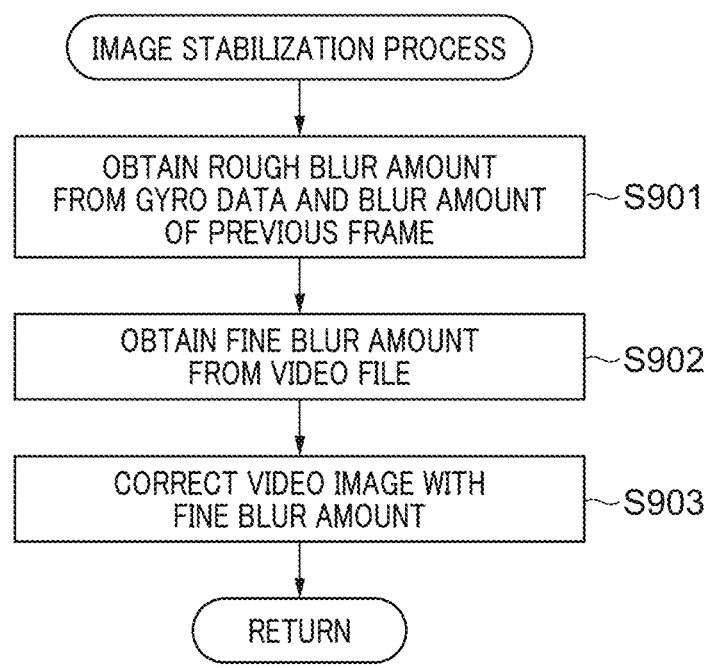
FIG. 19 is a flowchart showing a subroutine of an image stabilization process in a step S900 in FIG. 7A.

FIG. 19 is a flowchart showing a subroutine of the image stabilization process in the step S900 in FIG. 7A. Hereinafter, this process will be described with reference to FIG. 15. As mentioned above, this process is executed by the display-apparatus controller 801 of the display apparatus 800.

In a step S901, the display-apparatus controller 801 obtains gyro data of a frame (current frame) that is currently processed, gyro data of a frame (previous frame) that is an immediately preceding frame, and a blur amount $V_{n-1}^{Det}$ of the previous frame calculated in a step S902 mentioned later from the frame metadata of the video file 1000. After that, a rough blur amount $V_n^{Pre}$ is calculated from these pieces of information.

In the step S902, the display-apparatus controller 801 finds a fine blur amount $V_n^{Det}$ from the video file. A blur amount is found by calculating a moving amount of a feature point in the image from a previous frame to a current frame.

A feature point can be extracted by a known method. For example, a method using a luminance information image that is generated by extracting only luminance information of an image of a frame may be employed. This method subtracts an image that shifts the original luminance information image by one or several pixels from the original luminance information image. A pixel of which an absolute value of difference exceeds a threshold is extracted as a feature point. Moreover, an edge extracted by subtracting an image generated by applying a high-pass filter to the above-mentioned luminance information image from the original luminance information image may be extracted as a feature point.

Differences are calculated multiple times while shifting the luminance information images of the current frame and previous frame by one or several pixels. The moving amount is obtained by calculating a position at which the difference at the pixel of the feature point diminishes.

Since a plurality of feature points are needed as mentioned later, it is preferable to divide each of the images of the present frame and previous frame into a plurality of blocks and to extract a feature point for each block. A block division depends on the number of pixels and aspect ratio of the image. In general, 12 blocks of 4*3 or 54 blocks of 9*6 are preferable. When the number of blocks is too small, trapezoidal distortion due to a tilt of the image pickup unit 40 of the camera body 1 and rotational blur around the optical axis, etc. cannot be corrected correctly. In the meantime, when the number of blocks is too large, a size of one block becomes small, which shortens a distance between adjacent feature points, causing an error. In this way, the optimal number of blocks is selected depending on the pixel number, ease of detection of feature points, a field angle of an object, etc.

Since the calculation of the moving amount needs a plurality of difference calculations while shifting the luminance information images of the current frame and previous frame by one or several pixels, the calculation amount increases. Since the moving amount is actually calculated on the basis of the rough blur amount $V_n^{Pre}$ and deviation (the number of pixels) therefrom, the difference calculations are performed only near the rough blur amount, which can significantly reduce the calculation amount.

Next, in a step S903, the display-apparatus controller 801 performs the image stabilization process using the fine blur amount $V_n^{Det}$ obtained in the step S902. And then, the process exits form this subroutine.

It should be noted that Euclidean transformation and affine transformation that enable rotation and parallel translation, and projective transformation that enables keystone correction are known as the method of the image stabilization process.

Although the Euclidean transformation can correct movement in an X-axis direction and a Y-axis direction and rotation, it cannot correct blur caused by camera shake of the image pickup unit 40 of the camera body 1 in a front-back direction or directions of pan and tilt. Accordingly, in this embodiment, the image stabilization process is executed using the affine transformation that enables correction of skew. The affine transformation from a coordinate (x, y) of the feature point used as criteria to a coordinate (x', y') is expressed by the following formula 1.

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad \text{Formula 1}$$

Affine coefficients of a 3*3 matrix of the formula 1 are computable if deviations of at least three feature points are detected. However, when the detected feature points are mutually near or are aligned on a straight line, the image stabilization process becomes inaccurate in areas distant from the feature points or distant from the straight line. Accordingly, it is preferable to select the feature points to be detected that are mutually distant and do not lie on a straight line. Accordingly, when a plurality of feature points are detected, mutually near feature points are excluded and remaining feature points are normalized by a least square method.

FIG. 18F is a view showing an image obtained by applying the image stabilization process in the step S903 to the distortion-corrected image shown in FIG. 18E. Since the extraction process is performed in executing the image stabilization process, a field angle of the image shown in FIG. 18F becomes smaller than that of the image shown in FIG. 18E.

It is available to obtain a high quality image of which blur is corrected by performing such an image stabilization process.

In the above, the series of operations executed by the camera body 1 and display apparatus 800 that are included in the camera system of this embodiment have been described.

When the user selects the video image mode by the image pickup mode switch 12 after turning the power switch 11 ON and observes the front without turning the face in the vertical and horizontal directions, the face direction defection unit 20 detects the observation direction vo (vector information [0°, 0°]) as shown in FIG. 12A. After that, the recording-direction/field-angle determination unit 30 extracts the image (FIG. 11B) in the target visual field 1250 shown in FIG. 12A from the superwide-angle image projected onto the solid state image sensor 42.

Figure 11C:
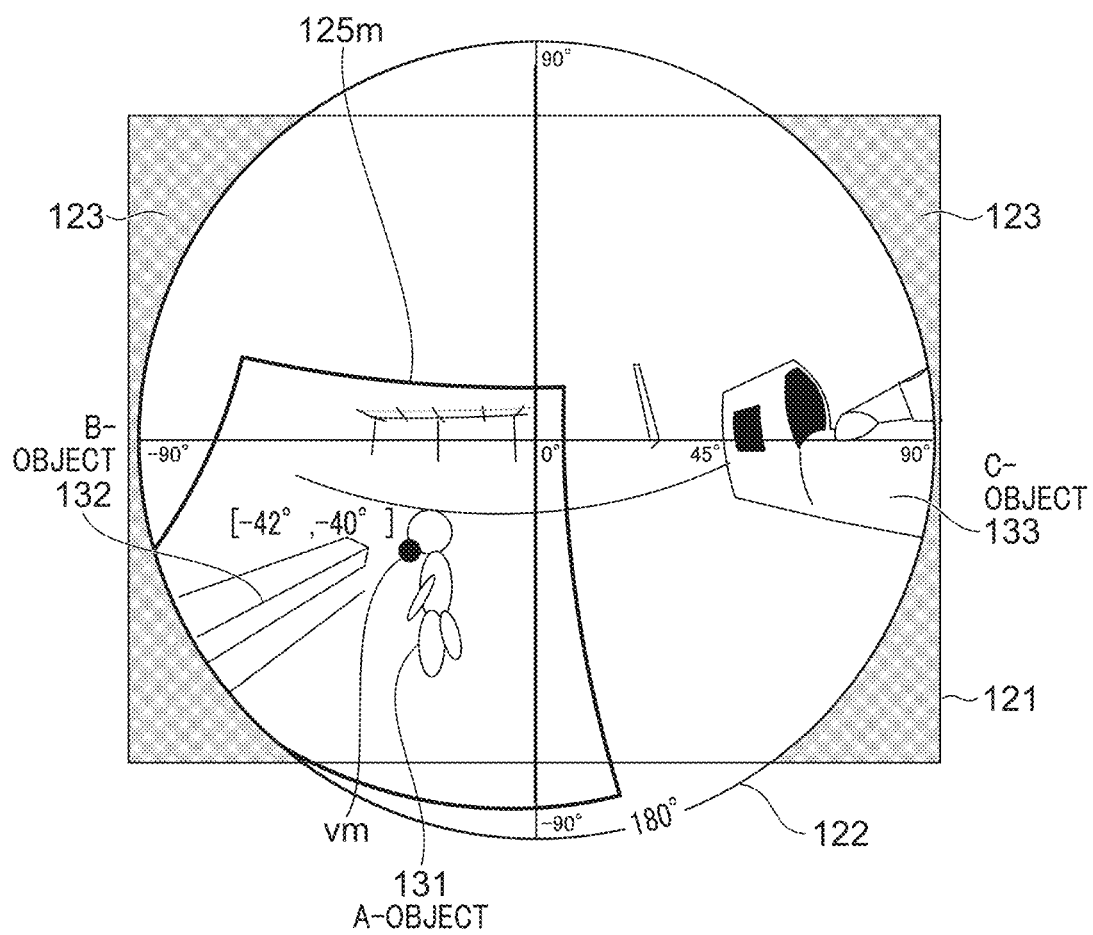
FIG. 11C is a view showing the target visual field set in the superwide-angle image in a case where the user is observing an A-object.

After that, when the user starts observing the child (A-object) 131 in FIG. 11A, for example, without operating the camera body 1, the face direction detection unit 20 detects the observation direction vm (vector information [−42°, −40°]) as shown in FIG. 11C. After that, the recording-direction/field-angle determination unit 30 extracts the image (FIG. 11C) in the target visual field 125m from the superwide-angle image picked up by the image pickup unit 40.

Figure 11D:
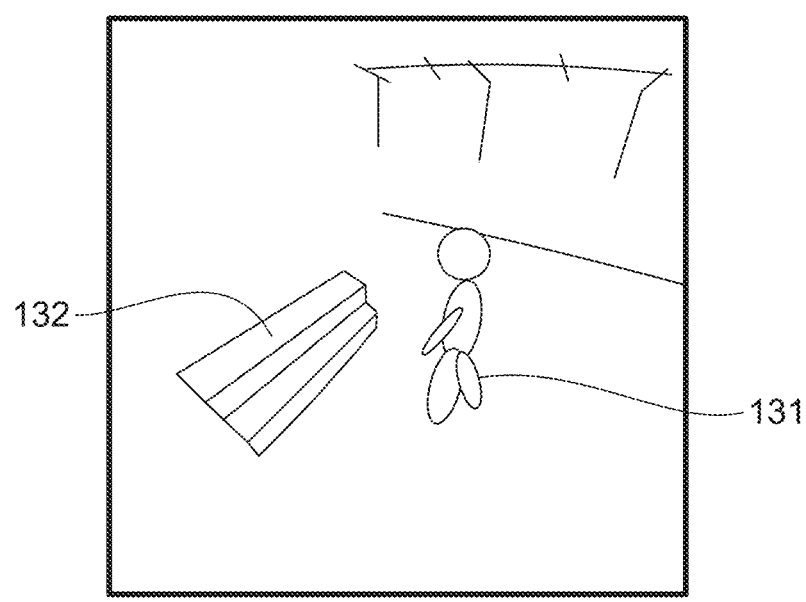
FIG. 11D is a view showing an image that is obtained by correcting distortion and blur of an image in the target visual field in FIG. 11C extracted from the superwide-angle image.

In this way, the display apparatus 800 applies the optical correction process and image stabilization process to the extracted image of the shape depending on the observation direction in the steps S800 and S900. Thereby, even if the specification of the overall control CPU 101 of the camera body 1 is low, the significantly distorted image in the target visual field 125m (FIG. 11C) is converted into the image around the child (A-object) 131 of which the blur and distortion are corrected as shown in FIG. 11D. That is, the user is able to obtain an image picked up in the own observation direction, even if the user does not touch the camera body 1 except to turn the power switch 11 ON and to select the mode with the image pickup mode switch 12.

Figure 11E:
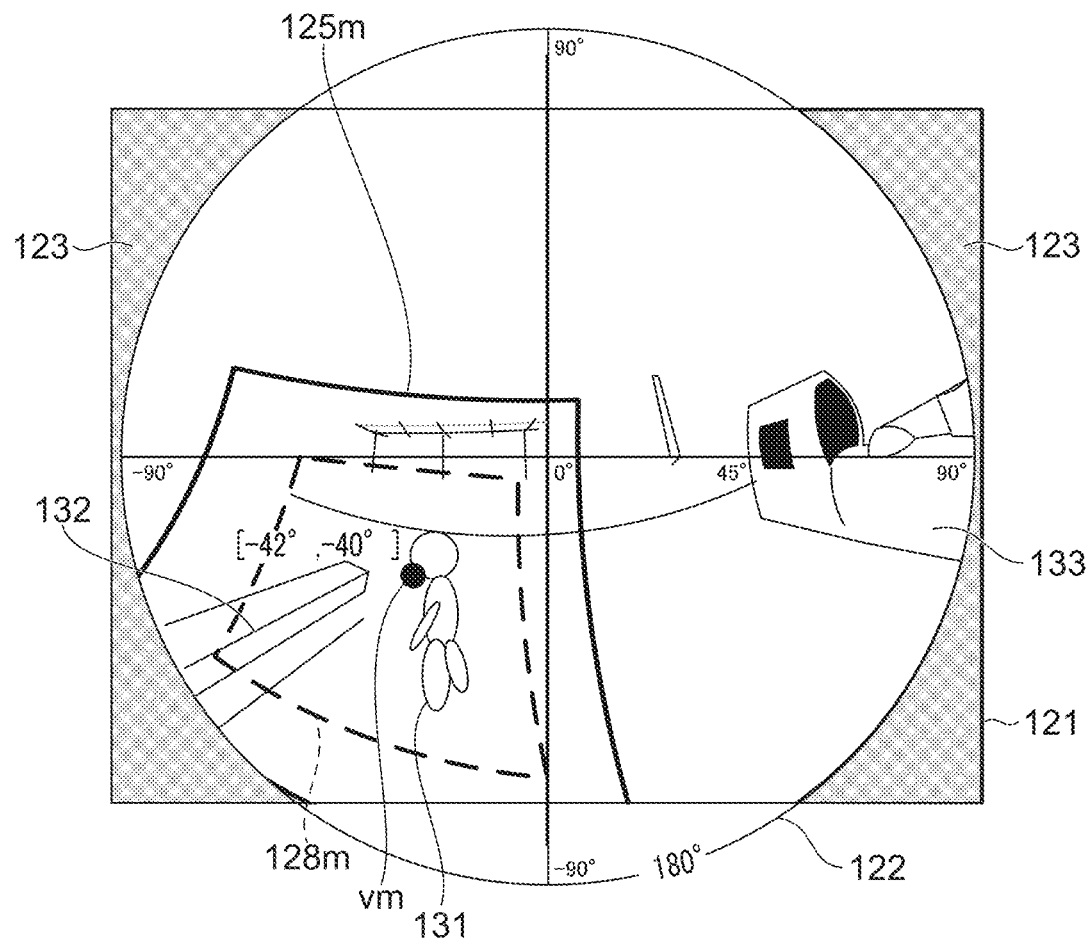
FIG. 11E is a view showing a target visual field set in the superwide-angle image in a case where the user is observing the A-object at a field-angle set value smaller than that in FIG. 11C.

For example, when the user switches the image pickup mode switch 12 from the video image mode to the preset mode while continuously observing the child (A-object) 131 in the previous image pickup situation, the field-angle set value $V_{ang}$ is changed from 90° to 45°. In this case, the recording-direction/field-angle determination unit 30 extracts the image in the target visual field 128m shown by a dotted line frame in FIG. 11E from the superwide-angle image picked up by the image pickup unit 40.

Figure 11F:
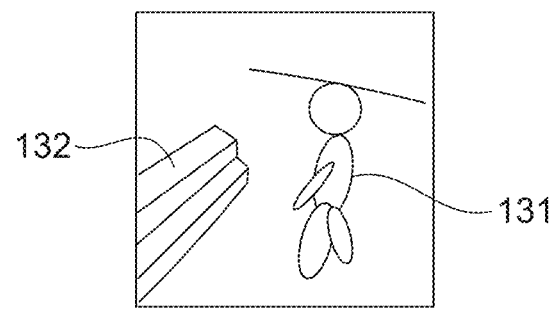
FIG. 11F is a view showing an image that is obtained by correcting distortion and blur of an image in the target visual field in FIG. 11E extracted from the superwide-angle image.

Also in the preset mode, the optical correction process and image stabilization process are performed in the display apparatus 800 in the steps S800 and S900. Thereby, even if the specification of the overall control CPU 101 of the camera body 1 is low, the zoom-up image around the child (A-object) 131 of which the blur and distortion are corrected as shown in FIG. 11F is obtained. Although the case where the field-angle set value $V_{ang}$ is changed from 90° to 45° in the video image mode has been described, the process in the still image mode is similar. Moreover, a case where the field-angle set value $V_{ang}$ of a video image is 90° and the field-angle set value $V_{ang}$ of a static image is 45° is also similar.

In this way, the user is able to obtain the zoom-up image that picks up the own observation direction by just switching the mode with the image pickup mode switch 12 of the camera body 1.

Although the case where the face direction detection unit 20 and the image pickup unit 40 are integrally constituted in the camera body 1 is described in this embodiment, the configuration is not limited to this as long as the face direction detection unit 20 is worn on the user's body part other than the head and the image pickup unit 40 is worn on the user's body. For example, the image pickup unit 40 of this embodiment can be worn on a shoulder or an abdomen. However, when the image pickup unit 40 is worn on a right shoulder, an object of the left side is obstructed by the head. In such a case, it is preferable that a plurality of image pickup units are worn on places including a right shoulder. Moreover, when the image pickup unit 40 is worn on an abdomen, spatial parallax occurs between the image pickup unit 40 and the head. In such a case, it is preferable to perform a correction calculation of the observation direction that compensate such parallax.

Hereinafter, a method to calibrate individual difference and adjustment difference of a user who wears the camera body 1 will be described in detail using FIG. 20A through FIG. 23E.

A user who wears the camera body 1 has individual size differences and adjustment differences, such as a physique, a tilt angle of periphery of a neck to which the camera body 1 is worn, a state of worn clothes (e.g., presence or absence of a collar), and adjustment states of the band parts 82L and 82R. Accordingly, the optical axis center of the image pickup lens 16 of the camera body 1 and the visual field center in a state (hereinafter, referred to as a natural state of a user) where the user faces the front do not coincide usually. It is preferable for a user to match a center of an extraction recording area (target visual field 125) to a visual field center of the user in a current posture or operation rather than to match the center of the recording area to the optical axis center of the image pickup lens 16 of the camera body 1.

Moreover, there is individual difference not only in a visual field center of a user in the natural state but also in a visual field center depending on a head direction (up, down, right, left, or slants) and in a motion space of a head. Accordingly, individual difference also factors into the relation between the face direction (observation direction) detected by the face direction detection unit 20 and the center position (hereinafter referred to as a visual field center position) of the target visual field 125 established according to the observation direction. Accordingly, a calibration operation that associates a face direction to a visual field center position is needed.

Usually, the calibration operation is preferably performed as a part of the preparation process (the step S100) in FIG. 7A. Although it is estimated of performing the calibration operation at the first start-up of the camera body 1 usually, the calibration operation may be performed when a predetermined time elapses after the previous calibration or when the position of the camera body 1 to the user is changed from the position at the previous calibration. The calibration operation may be performed when the face direction detection unit 20 becomes impossible to detect a user's face. Moreover, when it is detected that the user detaches the camera body 1, the calibration operation may be performed at the time when the user again wears the camera body 1. In this way, it is preferable to perform the calibration operation suitably at a timing when it is determined that the calibration is needed to use the camera body 1 appropriately.

Figure 20A:
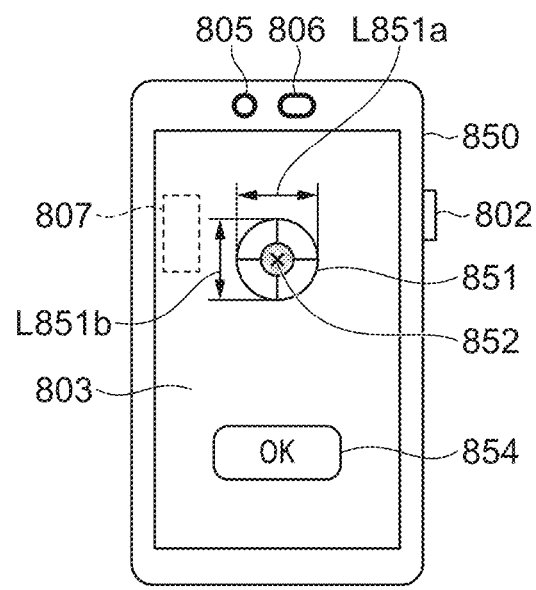
FIG. 20A and FIG. 20B are the views showing details of a calibrator used for a calibration process according to the first embodiment.
Figure 20B:
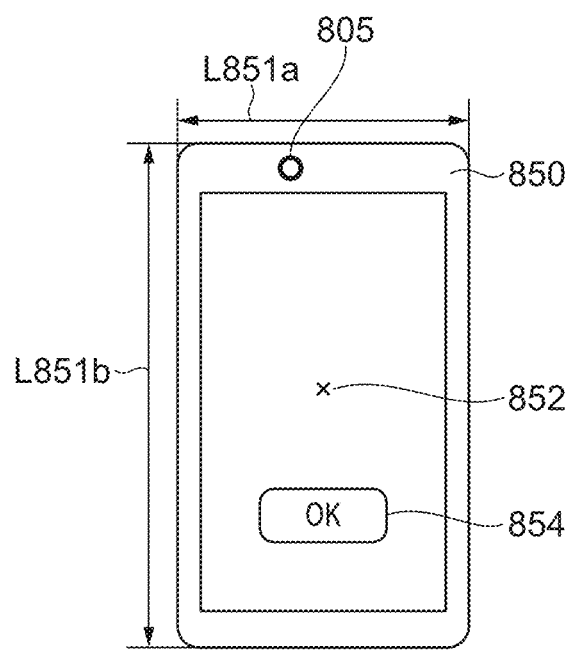

FIG. 20A and FIG. 20B are the views showing details of the calibrator 850 used for the calibration process according to this embodiment. In this embodiment, the calibrator 850 shall combine the function of the display apparatus 800.

The calibrator 850 includes a positioning index 851 and calibration button 854 in addition to the A-button 802, display unit 803, in-camera 805, face sensor 806, and angular speed sensor 807 that are the components of the display apparatus 800 shown in FIG. 1D. The B-button 804 is not illustrated in FIG. 20A because it is replaceable with the calibration button 854 as mentioned later.

FIG. 20A shows a case where the positioning index 851 is a specific pattern displayed on the display unit 803. FIG. 20B shows a case where the external appearance of the calibrator 850 is used as the positioning index. In the case of FIG. 20B, a positioning index center 852 mentioned later is calculated from the information about the contour of the calibrator 850.

It should be noted that the positioning index is not limited to the examples of FIG. 20A and FIG. 20B. For example, the positioning index may be separated from the calibrator 850. The positioning index may be anything as long as its size is easily measured and its shape is suitable to be looked at by the user. For example, the positioning index may be a lens cap of the image pickup lens 16 or a charge unit for the camera body 1. Anyway, since a fundamental way of thinking in the calibration operation is common, the calibrator 850 shown in FIG. 20A is exemplified and is mainly described hereinafter.

It should be noted that the calibrator 850 shall combine the function of the display apparatus 800 as mentioned above. Moreover, the calibrator 850 may be a dedicated device, a general smart phone, or a tablet terminal, for example.

The positioning index 851 is displayed on the display unit 803 of the calibrator 850 and is a diagram of which a lateral width L851a, vertical width L851b, and positioning index center 852 can be calculated. Since the user directs the face toward the vicinity of the central part of the positioning index 851 in the calibration process mentioned later, the positioning index 851 is preferably shaped so as to be caught at the visual field center. In FIG. 20A, the positioning index 851 is shown by a circle in which a cross and a small black circle at the center of the cross are arranged. However, the shape of the positioning index 851 is not limited to this shape. Otherwise, the positioning index may be a rectangle, a triangle, a star-shaped figure, or an illustration of a character.

The positioning index 851 is picked up by the image pickup unit 40 of the camera body 1. The display-apparatus controller 801 calculates a distance between the image-pickup/detection unit 10 and the calibrator 850 and calculates a positional coordinate of the positioning index 851 appeared in an image area on the basis of the pickup image. The calibrator 850 equipped with the function of the display apparatus 800 performs these calculations in this embodiment. If the calibrator 850 does not combine the function of the display apparatus 800, these calculations are performed by the overall control CPU 101 of the camera body 1.

The angular speed sensor 807 can measure movement of the calibrator 850. On the basis of the measurement value of the angular speed sensor 807, the display-apparatus controller 801 calculates later-mentioned movement information that shows the position and posture of the calibrator 850.

The calibration button 854 is pressed when the user directs the face toward the vicinity of the central part of the positioning index 851 in the calibration process mentioned later. Although the calibration button 854 is a touch button displayed on the touch-sensitive display unit 803 in FIG. 20A, the A-button 802 may function as the calibration button.

Next, the calibration process executed in extracting an image from a superwide-angle image picked up by the image pickup unit 40 (the first image pickup unit) according to a user's face direction and in applying the image process to the extracted image will be described in detail using a flowchart in FIG. 21.

Figure 21:
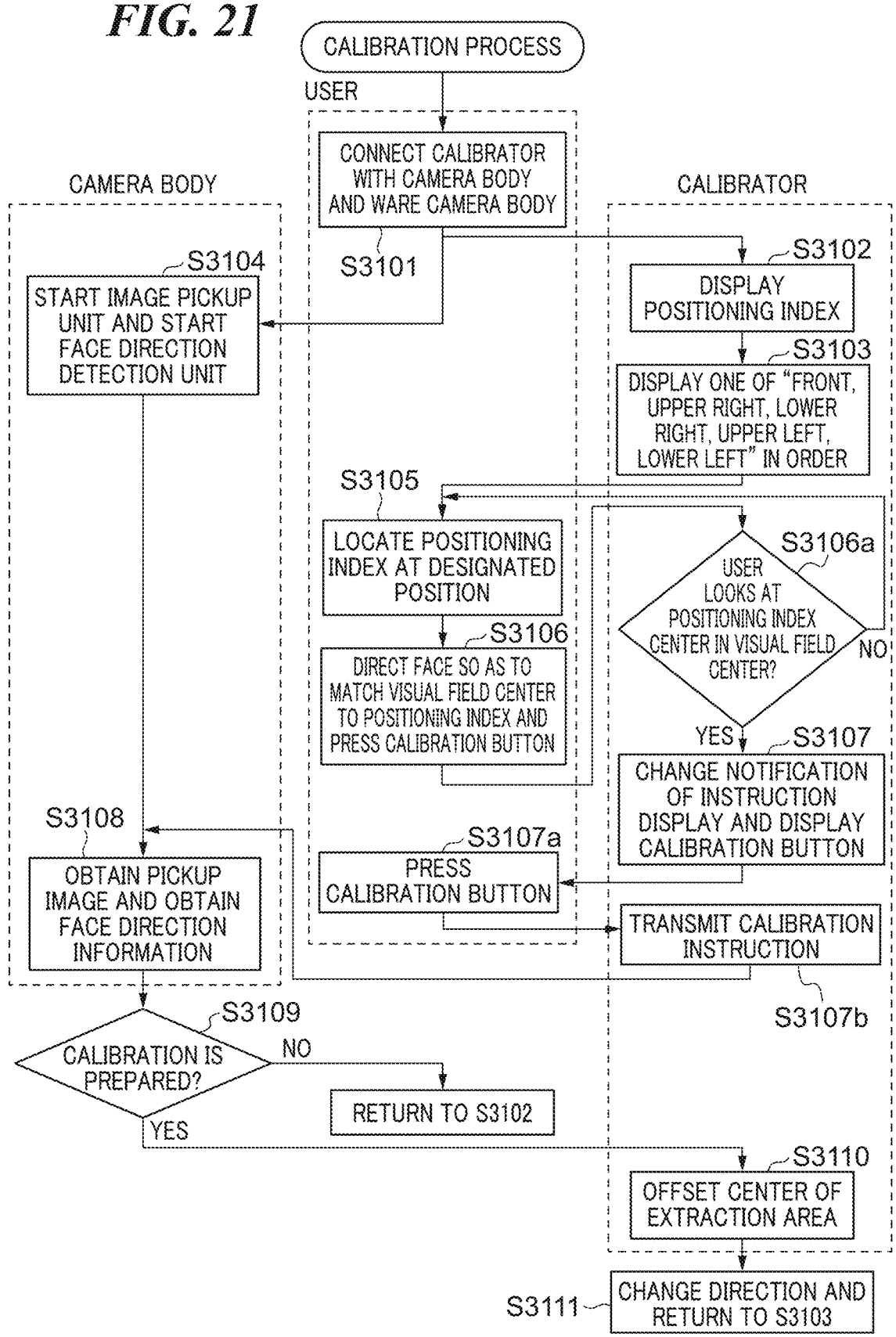
FIG. 21 is a flowchart showing the calibration process according to the first embodiment executed by the camera body and the calibrator.

FIG. 21 is the flowchart showing the calibration process according to this embodiment executed by the camera body 1 and calibrator 850.

In order to assist the description, a step in which the camera body 1 or the calibrator 850 receives a user's instruction is included in a frame of which an operation subject is the user. Moreover, in FIG. 21, a step executed by the display-apparatus controller 801 of the calibrator 850 in response to the user's instruction is included in a frame of which an operation subject is the calibrator 850. Similarly, in FIG. 21, a step executed by the overall control CPU 101 of the camera body 1 in response to the user's instruction is included in a frame of which an operation subject is the camera body 1.

Specifically, the operation subject of steps S3104 and S3108 in FIG. 21 is the camera body 1. And the operation subject of steps S3101, S3105, and S3106 is the user. Moreover, the calibrator 850 is the operation subject of steps S3102, S3103, S3106a, S3107, S3107b, and S3110.

In this process, when the power of the calibrator 850 is not ON, the user turns the power of the calibrator 850 ON by operating the A-button 802 in the step S3101. Similarly, when the power of the camera body 1 is not ON, the user turns the power of the camera body 1 ON by switching the power switch 11 to ON. After that, the user establishes a connection between the calibrator 850 and the camera body 1. When this connection is established, the display-apparatus controller 801 and the overall control CPU 101 enter a calibration mode, respectively.

Moreover, in the step S3101, the user wears the camera body 1, and adjusts the lengths of the band parts 82L and 82R and the angle of the camera body 1 so that the camera body 1 will be arranged in a suitable position and the image-pickup/detection unit 10 can pick up an image.

In the step S3102, the display-apparatus controller 801 displays the positioning index 851 on the display unit 803.

Figure 22A:
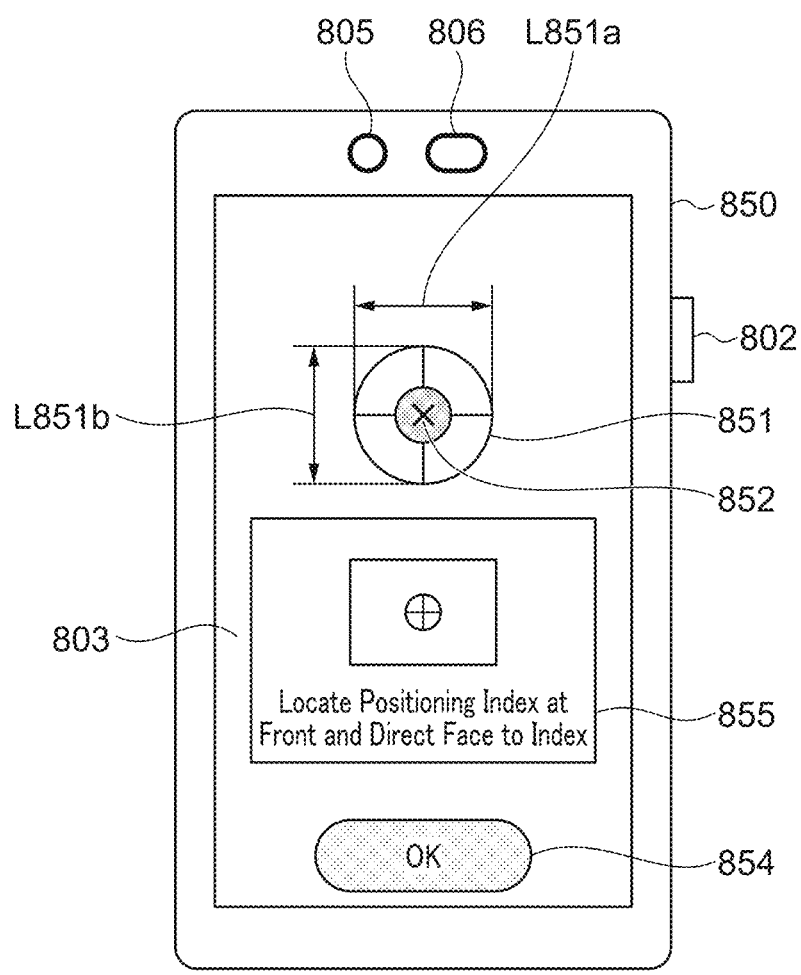
FIG. 22A is a view showing a screen displayed on a display unit of the calibrator in a step S3103 in FIG. 21 during a calibration operation for a front direction of the user.

In the next step S3103, the display-apparatus controller 801 designates a designation position at which the user should hold the calibrator 850 as an instruction display 855 (FIG. 22A). In this embodiment, five positions including front, upper right, lower right, upper left, and lower left are designated as the designation positions in order. The designation positions may be set to other positions as long as the calibration is available.

In the step S3104, the overall control CPU 101 activates the image pickup unit 40 so as to enable an image pickup operation and activates the face direction detection unit 20 so as to enable detection of a user's face direction. In the step S3105, the user holds the calibrator 850 at the designation position designated in the step S3103.

In the next step S3106, the user directs the face in the direction of the positioning index 851 to match a user's visual field center with the positioning index 851 and presses the calibration button 854 while maintaining the position of the calibrator 850 at the designation position.

In the step S3106a, the display-apparatus controller 801 determines whether the user looks at the positioning index center 852 of the positioning index 851, i.e., determines whether the user's visual field center matches the positioning index center 852. When it is determined that the user looks at the positioning index center 852 (YES in the S3106a), the display-apparatus controller 801 notifies the user of start of the calibration for the designation position by the instruction display 855 in a step S3107 and redisplays the calibration button 854. When the determination result in the step S3106a is NO, the user repeats the process from the step S3105.

When the user presses the calibration button 854 in the step S3107a, the display-apparatus controller 801 transmits a calibration instruction to the camera body 1 in the step S3107b.

In the step S3108, the overall control CPU 101 obtains a superwide-angle image including the positioning index 851 picked up by the image pickup unit 40 and detects a face direction by the face direction detection unit 20 in response to the calibration instruction from the calibrator 850. After that, the overall control CPU 101 calculates positional coordinate information about the positioning index center 852 in the obtained superwide-angle image and generates the information showing the relation between the calculated positional coordinate information and the detected face direction.

Hereinafter, the details of the process in the steps S3103 through S3108 will be described using FIG. 22A through FIG. 22F. FIG. 22A through FIG. 22F are views for describing the calibration operation for the front direction of the user. The calibration operation is performed so that the center position of the target visual field 125 in the image picked up by the image pickup unit 40 of the camera body 1 will match the visual field center position of the user in the natural state.

FIG. 22A is a view showing a screen displayed on the display unit 803 of the calibrator 850 in the step S3103 in FIG. 21 during the calibration operation for the front direction of the user.

As shown in FIG. 22A, the positioning index 851 and the instruction display 855 that indicates a position at which the user should locate the positioning index 851 are displayed on the display unit 803 of the calibrator 850.

The instruction display 855 is a character string that instructs the user to locate the positioning index 851 at the visual field center of the user in directing the face to the front. It should be noted that the instruction displayed as the instruction display 855 is not restricted to the character string. For example, the instruction may be displayed by another method using an illustration, a picture, a moving image, or the like. Moreover, the instruction display 855 like a general tutorial may be displayed first and the positioning index 851 may be displayed after that.

Figure 22B:
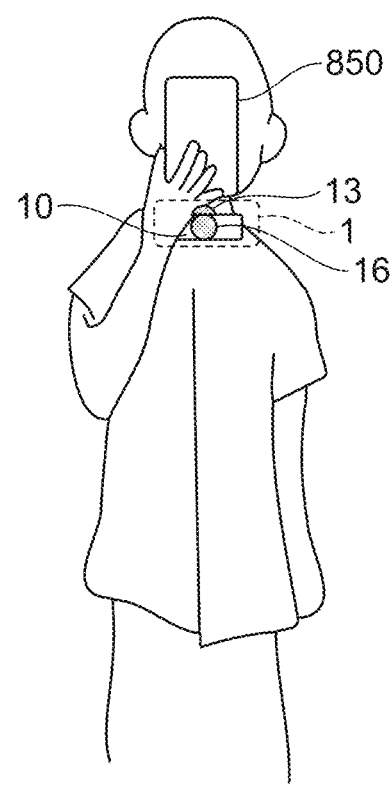
FIG. 22B is a view showing a state where the user holds the calibrator in the front according to an instruction shown as the instruction display in FIG. 22A.

FIG. 22B is a view showing a state where the user holds the calibrator 850 in the front according to the instruction displayed as the instruction display 855 in FIG. 22A.

In the step S3105, the user holds the calibrator 850 in the front according to the instructions displayed as the instruction display 855 in FIG. 22A. Then, in the step S3106, the user holds the calibrator 850 so that the positioning index 851 will match the visual field center of the user in directing the face to the front, and the user presses the calibration button 854 (FIG. 22A). In response to the press of the calibration button 854, the determination in the step S3106a is performed. The concrete procedure of this determination method will be mentioned later. When the determination result in the step S3106a is YES, the display-apparatus controller 801 changes the instruction display 855 shown in FIG. 22A to a notification of "Calibration for Front Direction is Started" and displays the calibration button 854.

Then, the user presses the calibration button 854 after confirming the change of the instruction display 855 shown in FIG. 22A to the notification of "Calibration for Front Direction is Started" (the step S3107a). In response to the press of the calibration button 854, a calibration instruction is transmitted to the camera body 1 in the step S3107b. And the image pickup unit 40 obtains a pickup image in the step S3108.

Figure 22C:
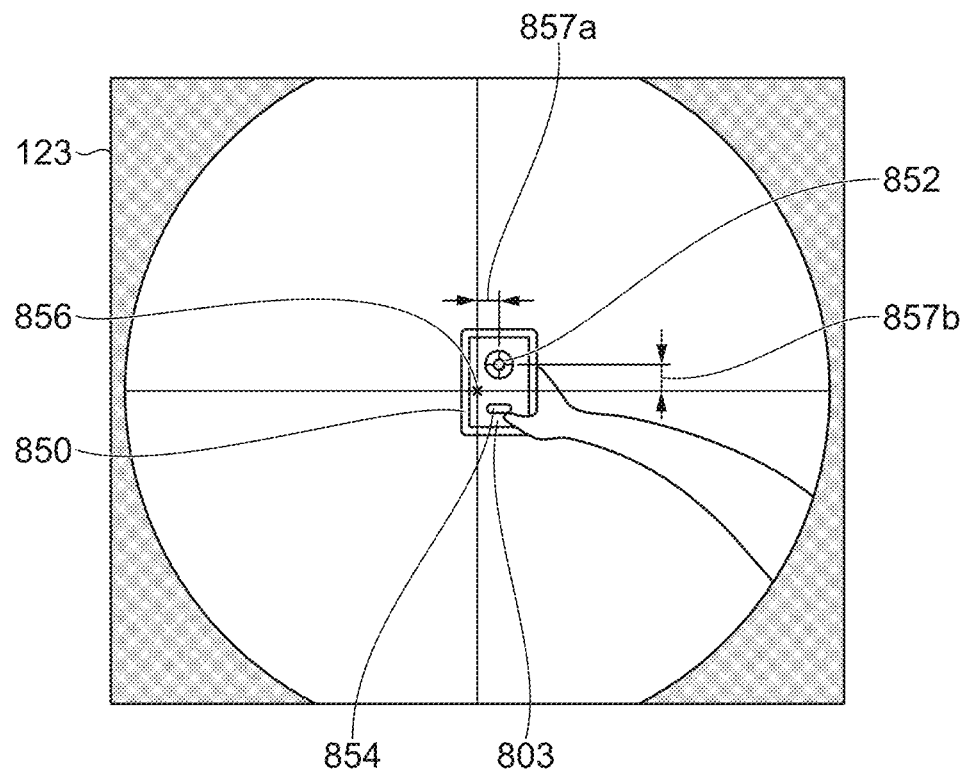
FIG. 22C is a schematic view showing an entire superwide-angle image that is caught by an image pickup lens in the state in FIG. 22B.
Figure 22D:
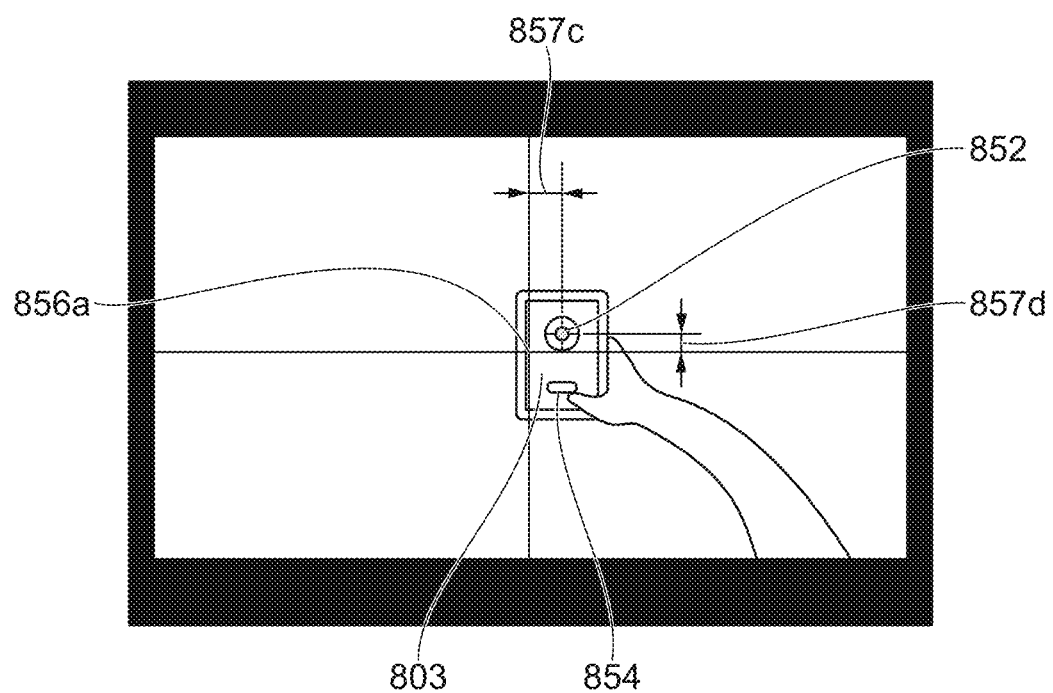
FIG. 22D is a schematic view showing an image that is obtained by correcting aberrations of the superwide-angle image shown in FIG. 22C.

FIG. 22C is a schematic view showing the entire superwide-angle image that is caught by the image pickup lens 16 in the state of FIG. 22B. FIG. 22D is a schematic view showing an image obtained by correcting aberrations of the superwide-angle image shown in FIG. 22C.

Moreover, in response to the press of the calibration button 854 by the user in the state of FIG. 22B, the face direction detection unit 20 obtains a face direction in the step S3108.

Figure 22E:
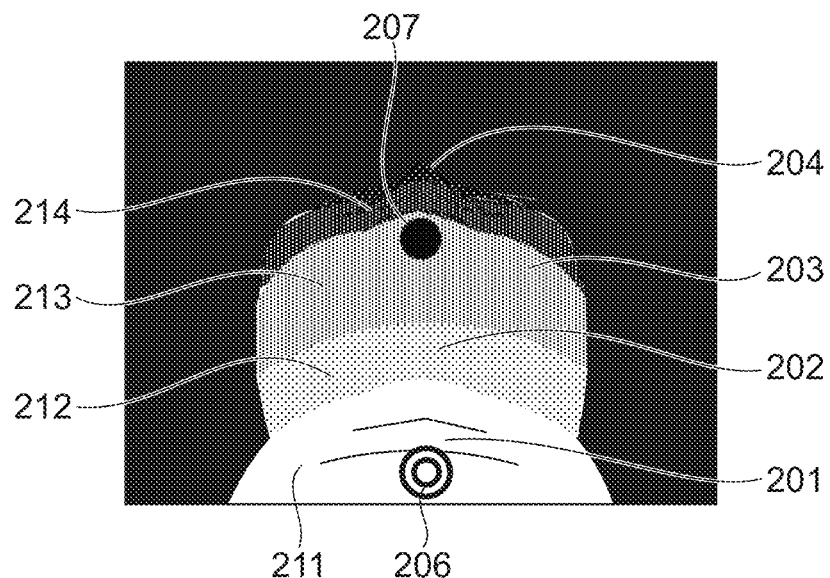
FIG. 22E is a schematic view showing a face direction image that is obtained by a face direction detection unit in a step S3108 in FIG. 21 during the calibration operation for the front direction of the user.

FIG. 22E is a schematic view showing a face direction image that is recorded by the face direction detection unit 20 in the step S3108 in FIG. 21 during the calibration operation for the front direction of the user.

As described in this embodiment using FIG. 8G through FIG. 8K, the face direction detection unit 20 calculates the angles in the lateral and vertical directions of the face using the distances and angles of the chin positions 207, 207r, and 207u with respect to the throat position 206. However, since the distances and angles of the chin positions 207, 207r, and 207u with respect to the throat position 206 also have the individual difference and adjustment difference due to the user's physique etc. mentioned above as with the image center, they are not fixed. Accordingly, the relation between the chin position and the throat position 206 at the time of pressing the calibration button 854 is defined as a value of a case where the user puts the visual field center in the front. This enables correct calculation of the user's face direction irrespective of the individual difference and adjustment difference.

Referring back to FIG. 21, in a step S3109, the overall control CPU 101 determines whether the calibration for the front direction is prepared. That is, it is determined whether the information required to calculate the chin position 207, throat position 206, and positioning index center 852 has been obtained.

At this time, when the obtainment of the required information is not completed, it is determined that the calibration is not prepared (NO in the step S3109), and the operations from the step S3102 are repeated so as to obtain correct information corresponding to information deemed to be deficient among the required information. When the obtainment of the required information is not completed, not all the operations from the step S3102 are necessary. Only the operations to obtain correct information corresponding to the information deemed to be deficient information may be performed again.

The determination in the step S3106a is performed using the face sensor 806 or in-camera 805 mounted in the calibrator 850. Hereinafter, the concrete procedure of this determination method will be described using a case where the calibration operation for the front direction is performed using the in-camera 805. Although a case using the face sensor 806 is different from the case using the in-camera 805 in the dimension of information (two-dimensional information or three-dimensional information), a fundamental way of thinking is common. Accordingly, detailed description of the case using the face sensor 806 is omitted. When the face sensor 806 is used in the determination in the step S3106a, the face direction detection unit 20 of the camera body 1 does not perform the face detection that irradiates the user with the infrared light 23 during a period when the user is irradiated with the infrared light 823 from the face sensor 806. This aims to prevent interference of the infrared lights 23 and 823.

First, when the user presses the calibration button 854 in FIG. 22A in the step S3106, the display-apparatus controller 801 obtains an in-camera image 858 (FIG. 22F) in which the user appears by picking up an image with the in-camera 805. Furthermore, the display-apparatus controller 801 detects the position information about the neck front part 201, chin 203, face 204 including a nose, and image-pickup/detection unit 10 (the image pickup unit 40) from the obtained in-camera image 858.

The display-apparatus controller 101 determines whether the user is looking at the positioning index center 852 of the positioning index 851 at the visual field center in the step S3106a using the position information detected from the in-camera image 858.

As a result of the determination, when it is determined that the user is looking in a different direction, the display-apparatus controller 801 displays a message indicating that the correct information cannot be obtained as the instruction display 855. This can instruct the user to perform the calibration operation again.

The display-apparatus controller 801 can determine that the correct calibration operation cannot be performed using the in-camera image 858 when the image-pickup/detection unit 10 tilts beyond a certain angle or when the face direction detection window 13 is blocked or is dirty. In such a case, the display-apparatus controller 801 may display the message indicating that the correct information cannot be obtained as the instruction display 855.

Furthermore, it is also possible to obtain information necessary for parallax correction described later using the obtained in-camera image 858 and the pickup image obtained in the step S3108.

Specifically, information about the size (the lateral width L851a and the vertical width L851b) of the positioning index 851 is transmitted in advance from the calibrator 805 to the camera body 1 before the positioning index 851 is picked up by the image pickup unit 40 in the step S3108. Accordingly, the overall control CPU 101 can calculate the distance between the image-pickup/detection unit 10 and the positioning index 851 using the information about the size of the positioning index 851 and the image of the positioning index 851 included in the pickup image obtained in the step S3108. Since the positioning index 851 and the in-camera 805 is provided on the same housing of the calibrator 850 and the calibrator 850 is substantially opposed to the user in the case in FIG. 22B, the distance between the in-camera 805 and the imaging/detecting unit 10 is equal to the distance between the image-pickup/detection unit 10 and the positioning index 851.

Figure 22F:
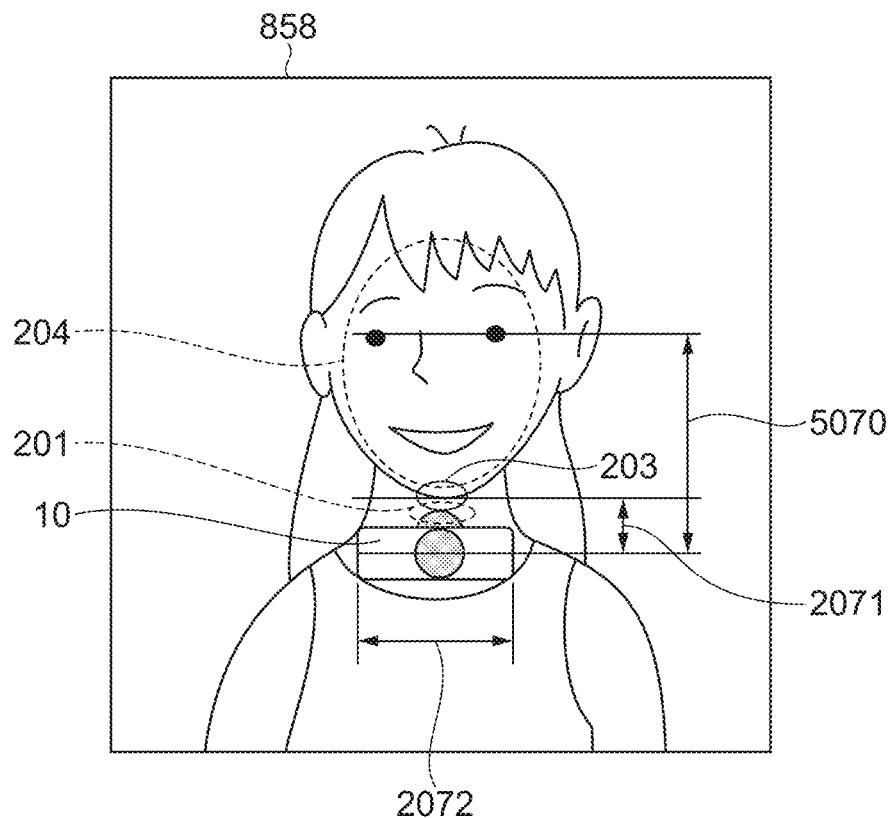
FIG. 22F is a schematic view showing an in-camera image used in determination in a step S3106a in FIG. 21.

Similarly, information about the size of the image-pickup/detection unit 10 is transmitted in advance from the camera body 1 to the calibrator 805 before the in-camera image shown in FIG. 22F is picked up by the in-camera 805. Accordingly, the display-apparatus controller 801 can estimate a vertical distance 5070 between the optical axis center of the image pickup lens 16 and the view position of the user using the information about the size of the image-pickup/detection unit 10 and the image of the image-pickup/detection unit 10 included in the in-camera image 858 shown in FIG. 22F. In addition, the display-apparatus controller 801 can estimate a distance 2071 between the image pickup lens 16 and the chin 203 of the user. The distance 2071 may be a distance between the face direction detection window 13 and the chin 203.

When the face direction detection unit 20 calculates the throat position 206 and the chin position of the user, the user's face needs to be separated from the face direction detection window 13 by a certain distance or more based on a design concept of the face direction detection unit 20. Therefore, the estimation result can be used as one of determination conditions when the face direction detection unit 20 determines whether the face direction can be correctly detected.

Referring back to FIG. 21, when the overall control CPU 101 determines that the required information is obtained and that the preparation of the calibration for the front direction is completed in the step S3109 according to the above-mentioned method, the process proceeds to the step S3110.

In the step S3110, the display-apparatus controller 801 calculates information required to offset the extraction center position so as to absorb the individual difference and adjustment difference and offsets the extraction center position on the basis of the information.

Details of the calculation in the step S3110 will be described as follows. If the user is in an ideal state according to design values and the camera body 1 is worn ideally, a center 856 of the superwide-angle image obtained in the step S3108 shown in FIG. 22C should be almost coincident with the positioning index center 852 appeared in the superwide-angle image. However, since there are individual difference and adjustment difference due to the user's physique etc. actually, the center 856 of the superwide-angle image does not match the positioning index center 852 usually.

It is preferable for a user to match the extraction center position to a visual field center of the user in a current posture or operation (i.e., the positioning index center 852 in the superwide-angle image) rather than to match to the center 856 of the superwide-angle image shown by the camera body 1.

Accordingly, a deviation amount of the positioning index center 852 from the center 856 of the superwide-angle image is measured, and the extraction center position is offset to a position based on the positioning index center 852 that differs from the center 856 of the superwide-angle image. Moreover, the face direction that is detected by the face direction detection unit 20 in that time is also offset in a similar way.

Concrete offset methods will be described by referring to FIG. 22C and FIG. 22D. The deviation amount of the positioning index center 852 to the center 856 of the superwide-angle image is measured, and the measured deviation amount is divided into a lateral deviation amount 857a and a vertical deviation amount 857b as shown in FIG. 22C. An offset amount is determined on the basis of the deviation amounts 857a and 857b after performing a suitable conversion process according to the projection method of the entire field angle.

Moreover, as shown in FIG. 22D, the offset amount may be determined after applying the suitable conversion process to the superwide-angle image according to the projection method. That is, the deviation amount of the center 856a from the positioning index center 852 in the pickup image after conversion is measured. And the deviation amount is divided into a lateral deviation amount 857c and a vertical deviation amount 857d. Then, the offset amount may be determined on the basis of the deviation amounts 857c and 857d.

The offset method can be arbitrarily selected from among the methods shown in FIG. 22C and FIG. 22D in consideration of a processing load and a purpose of the camera system.

By performing the above-mentioned calibration operation for the front direction, a face direction of a user who wears the camera body 1, a visual field center in the face direction within a superwide-angle image, and a face direction detected by the face direction detection unit 20 are appropriately associated irrespective of individual difference and adjustment difference.

The calibration operation for the front direction is described up to here among the five directions (front, upper right, lower right, upper left, and lower left). It is necessary to execute similar calibration operations for the remaining four directions.

Accordingly, when the process in the step S3110 in FIG. 21 is completed, the process proceeds to a step S3111. In the step S3111, when there is a direction for which the calibration operation is not performed among the five directions, a target direction of the calibration operation is changed, and the process returns to the step S3103. Thereby, the calibration operation is similarly repeated for the remaining four directions other than the already finished front direction.

Although it is not shown in FIG. 21, when it is determined that there is no direction for which the calibration operation is not performed in the step S3111, this process is finished as-is.

FIG. 23A through FIG. 23E are views for describing the calibration operation for an upper right direction of the user (the upper right direction in the superwide-angle image). FIG. 23A through FIG. 23E respectively correspond to FIG. 22A through FIG. 22E and the fundamental operation is also identical. Accordingly, the common description is omitted.

Figure 23A:
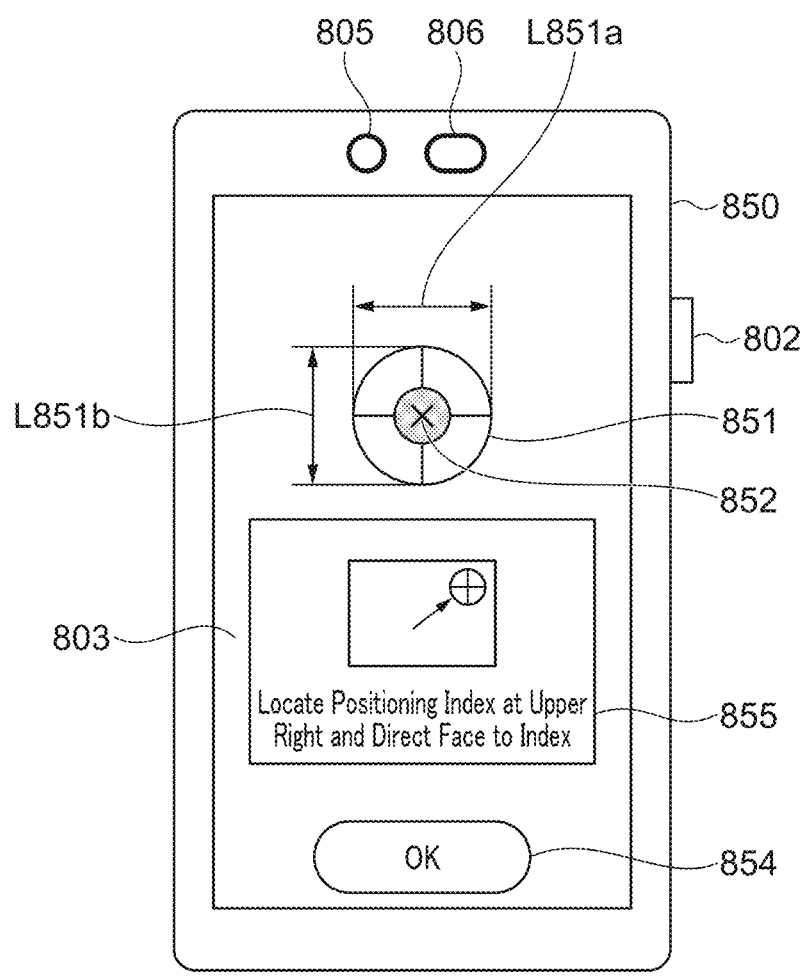
FIG. 23A is a view showing a screen displayed on the display unit of the calibrator in the step S3103 in FIG. 21 during the calibration operation in an upper right direction of the user.

As shown in FIG. 23A, the instruction display 855 displays a character string that instructs the user to locate the positioning index 851 at the visual field center of the user in directing the face to the upper right.

Figure 23B:
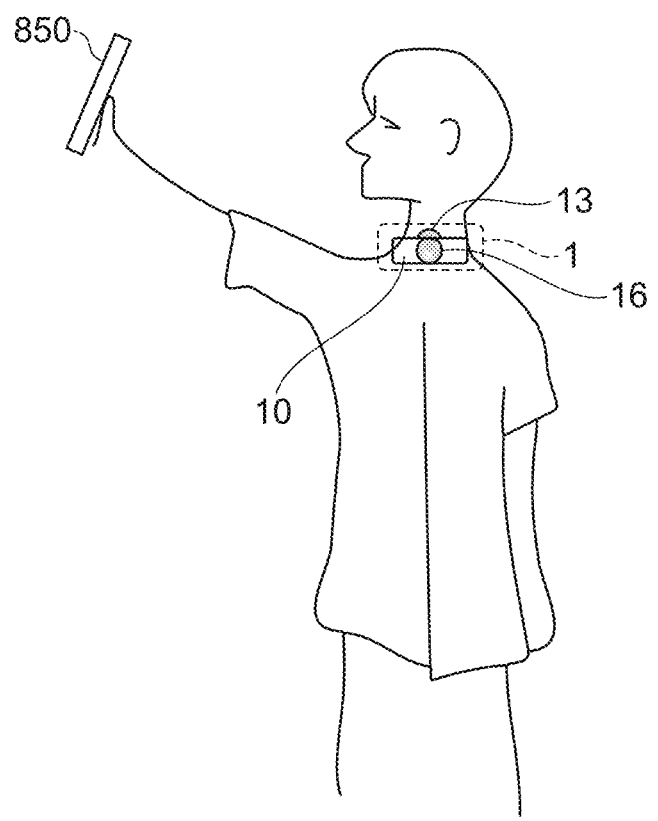
FIG. 23B is a view showing a state where the user holds the calibrator to upper right according to an instruction shown as the instruction display in FIG. 23A.
Figure 23C:
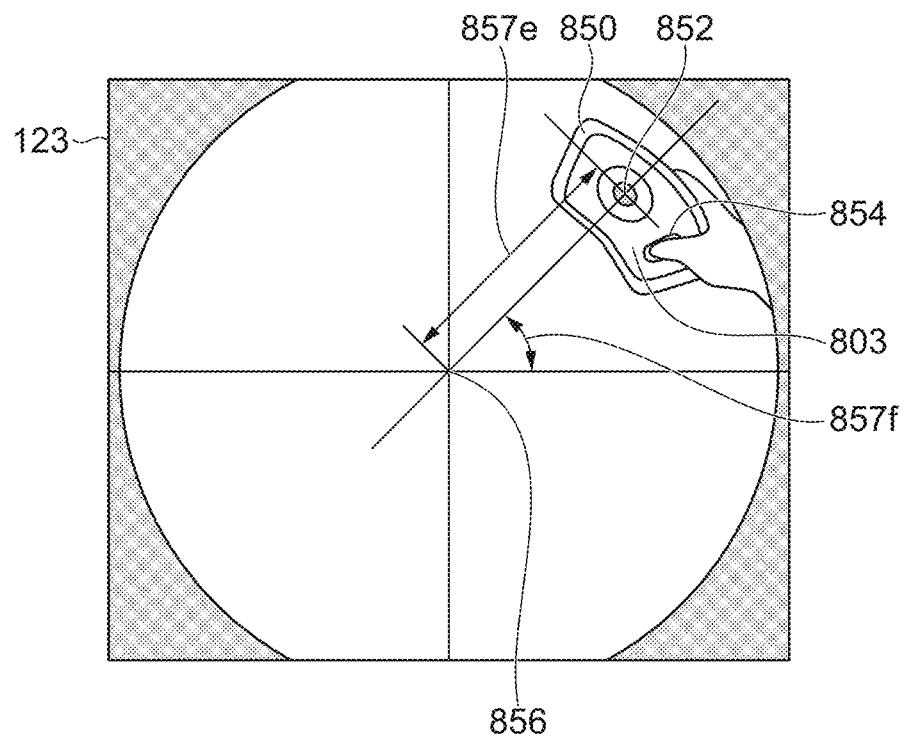
FIG. 23C is a schematic view showing the entire superwide-angle image that is caught by the image pickup lens in the state in FIG. 23B.

FIG. 23B is a view showing a state where the user holds the calibrator 850 to upper right according to the instruction shown by the instruction display 855 in FIG. 23A. FIG. 23C is a schematic view showing the entire superwide-angle image that is caught by the image pickup lens 16 in the state in FIG. 23B.

As shown in FIG. 23C, a deviation amount between the center 856 of the superwide-angle image and the positioning index center 852 is measured first according to a concrete offset method. After that, the measured deviation amount is divided into a radial deviation amount 857e and an angular deviation amount 857f. An offset amount is determined on the basis of the deviation amounts 857e and 857f after performing a suitable conversion process according to the projection method of the entire field angle.

Figure 23D:
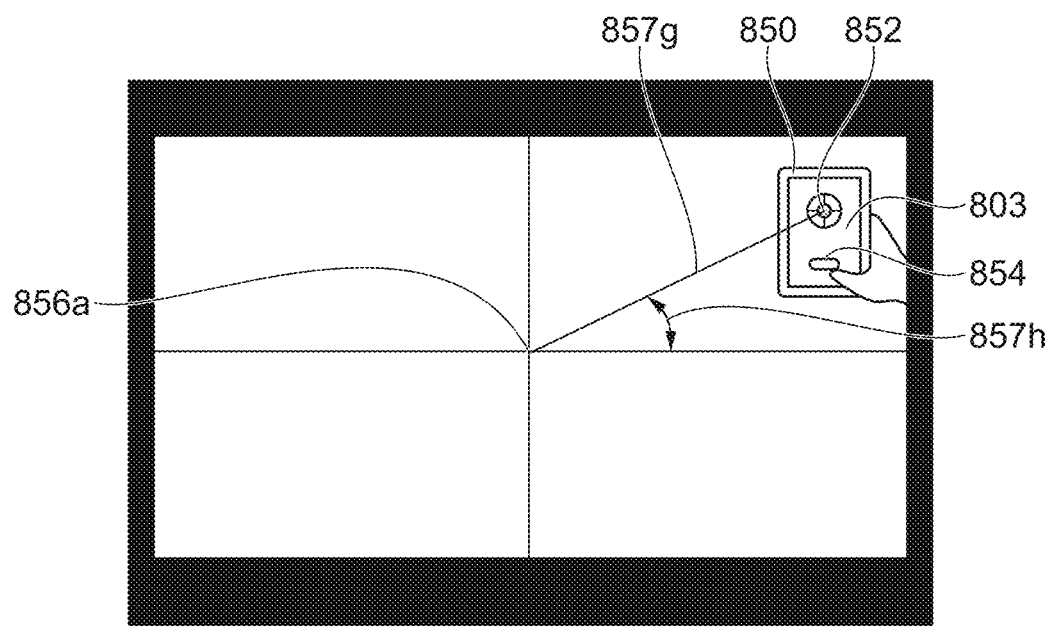
FIG. 23D is a schematic view showing an image that is obtained by correcting aberrations of the superwide-angle image shown in FIG. 23C.

Moreover, as shown in FIG. 23D, the offset amount may be determined after applying the suitable conversion process to the superwide-angle image according to the projection method. That is, the deviation amount of the center 856a from the positioning index center 852 in the pickup image after conversion is measured. And the deviation amount is divided into a radial deviation amount 857g and an angular deviation amount 857h. Then, the offset amount may be determined on the basis of the deviation amounts 857g and 857h.

The determination of the offset amount described using FIG. 22A through FIG. 22E employs the method of dividing the deviation amount into the lateral deviation amount and vertical deviation amount. As compared with this, the determination of the offset amount described using FIG. 23A through FIG. 23E employs the method of dividing the deviation amount into the radial deviation amount and angular deviation amount. The difference in method is only for convenience of description, and either method can be employed.

Figure 23E:
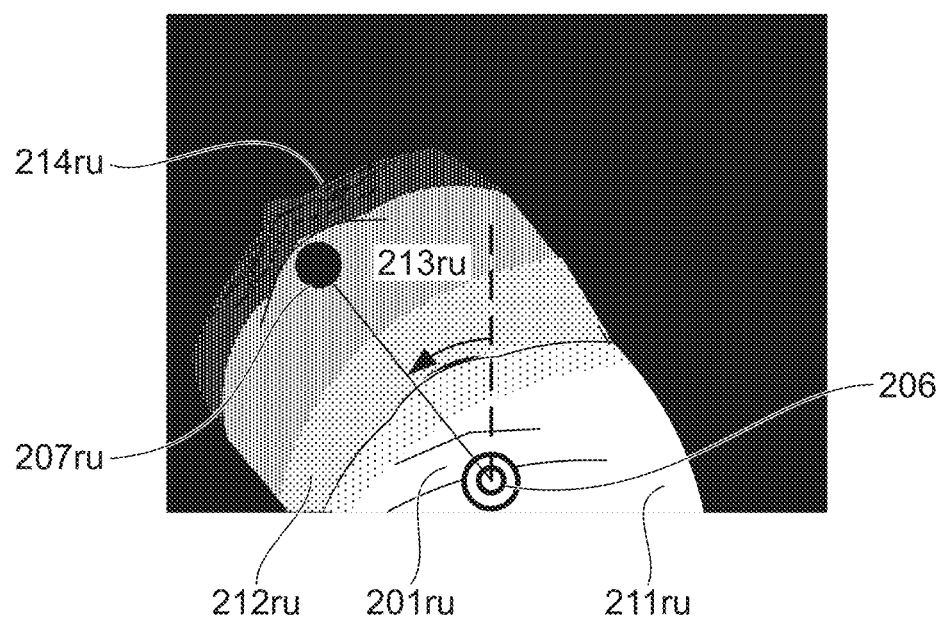
FIG. 23E is a schematic view showing a face direction image that is obtained by the face direction detection unit in the step S3108 in FIG. 21 during the calibration operation for the upper right direction of the user.

Moreover, the face direction detection unit 20 has obtained, as shown in FIG. 23E, the throat position 206 and the chin position 207ru required to calculate the face direction in directing the face to the upper right. Accordingly, the face direction of the user in looking in the direction (in this case, the upper right direction) toward the positioning index center 852 can be correctly measured irrespective of individual difference and adjustment difference of the user.

As mentioned above, the calibration operations for upper right, lower right, upper left, and lower left directions in addition to the front direction are performed in the calibration process shown in FIG. 21. Thereby, when the user turns the head in either of the upper, lower, right, and left directions, the face direction detection unit 20 can correctly detect the direction in which the user turns. Accordingly, the user can use the camera body 1 appropriately irrespective of individual difference and adjustment difference.

In the above description, the method of performing the calibration operation repeatedly for the five directions (front, upper right, lower right, upper left, and lower left) is described to simplify the description.

However, the calibration operation is not limited to this method. For example, the following method may be employed. That is, a user continuously moves the calibrator 850 along a Z-shaped locus, a spiral locus, a polygonal locus, or the like according to the instruction display 855. At the same time, the user continuously catches the positioning index 851 displayed on the calibrator 850 at the visual field center. In this method, the display-apparatus controller 801 transmits the calibration instructions to the camera body 1 multiple times while the calibrator 850 is moving.

Whenever receiving the calibration instruction, the overall control CPU 101 obtains the face direction detected by the face direction detection unit 20 and the positional coordinate information about the positioning index center 852 in the superwide-angle image picked up by the image pickup unit 40, and saves them as history information. After that, the overall control CPU 101 calculates the relation of the extraction center position of the image and the face direction of the user by combining the information extracted from the obtained history information. Furthermore, in this method, the information extracted from the history information may be limited to the information obtained when the user looks at the positioning index 851. The information is limited using the information about the in-camera 805 and face sensor 806 obtained by the calibrator 850 during movement of the calibrator 850. Thereby, the information obtained when the user is looking away is no longer extracted from the history information, which raises the accuracy of calculation of the relation.

Moreover, the display-apparatus controller 801 may transmit a measurement value of the angular speed sensor 807 to the camera body 1 together with the calibration instruction. In this case, the overall control CPU 101 obtains movement information showing a moving locus of the calibrator 850 by the user and the position and posture of the calibrator 850 from the transmitted measurement value of the angular speed sensor 807. The movement information is also saved as the history information. Thereby, the calibration operation can be performed easily and correctly on the basis of the movement information based on the measurement value of the angular speed sensor 807, the face direction detected by the face direction detection unit 20, and the positional coordinate information about the positioning index center 852 in the superwide-angle image picked up by the image pickup unit 40.

In this case, the movement information based on the measurement value of the angular speed sensor 807 should be coincident with the movement information based on the positional coordinate information about the positioning index 851. Accordingly, when the measurement value of the angular speed sensor 807 is used, it is required to synchronize communication between the camera body 1 and the calibrator 850.

As mentioned above, the calibration method that associates the face direction of the user with the center position of the target visual field 125 set in the superwide-angle image irrespective of individual difference and adjustment difference has been described. The calibration method that associates the face direction of the user with the center position of the target visual field 125 is not limited to the exemplified configurations and various modifications are available within the scope of the present invention.

Next, a method of reducing a difference between a visual field of a user and a secondarily recorded image (hereinafter referred to as a "recorded image") due to parallax caused by a positional difference between an eye position of the user and a wearing position of the image-pickup/detection unit 10 will be described with reference to FIG. 24A to FIG. 29D.

First, the difference between the visual field of the user and the recorded image will be described in order to assist understanding.

Figure 24A:
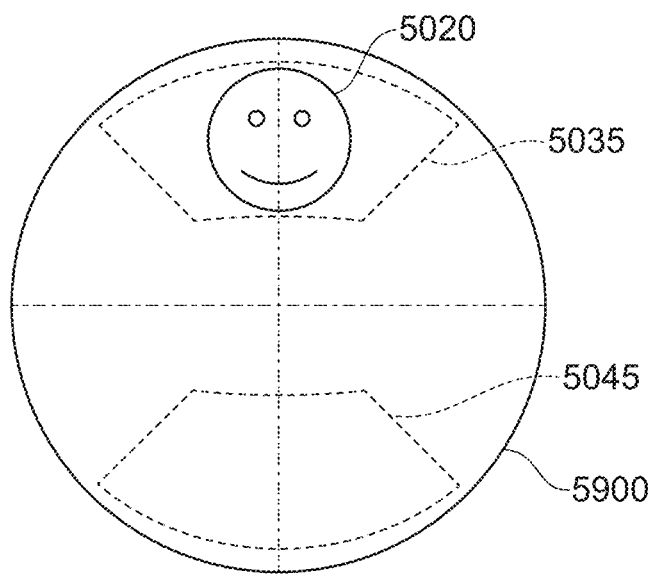
FIG. 24A and FIG. 24B are schematic views for describing a relation between a user's visual field and a target visual field in a case where a short distance object is an observation target in the first embodiment.
Figure 24B:
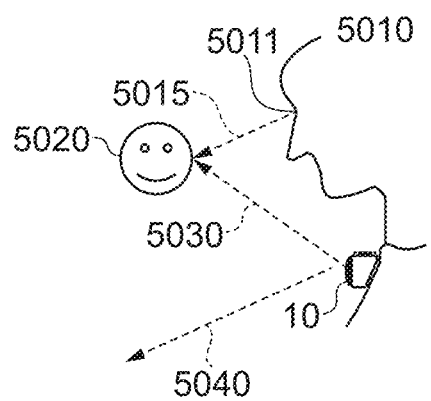

FIG. 24A and FIG. 24B are schematic views for describing a relation between the visual field of the user 5010 and target visual field in a case where a short distance object is an observation target 5020.

FIG. 24A is the schematic view showing an image 5900 including the observation object 5020 captured by the solid state image sensor 42. FIG. 24B is the schematic view showing a positional relation between the user 5010 and the observation object 5020.

As shown in FIG. 24B, when the observation object 5020 is below a height of a user's eye (a view position) 5011, a face direction 5015 of the user 5010 turns downward. At this time, the observation object 5020 with a background like a floor (not shown) is caught in the visual field of the user 5010.

An observation direction 5040 (FIG. 24B) parallel to the user's face direction 5015 detected by the face direction detection unit 20 is set as a recording direction. Accordingly, when the short distance object is the observation object 5020 as shown in FIG. 24B, an area 5045 that does not include the observation object 5020 will be set as the target visual field.

In this embodiment, even if a background (for example, a ceiling (not shown)) caught by the image-pickup/detection unit 10 will be different from the background (for example, a floor (not shown)) of the visual field of the user 5010, the observation direction is set to a direction 5030 that is different from the observation direction 5040 so that an area 5035 including the observation target 5020 will be a target visual field.

Specifically, the above issue is caused by the parallax due to the difference between the position of the eye 5011 of the user 5010 and the wearing position of the image-pickup/detection unit 10. Accordingly, in this embodiment, a parallax correction process mentioned below that appropriately adjusts the recording direction set on the basis of the face direction of the user 5010 according to the parallax is executed.

Figure 25:
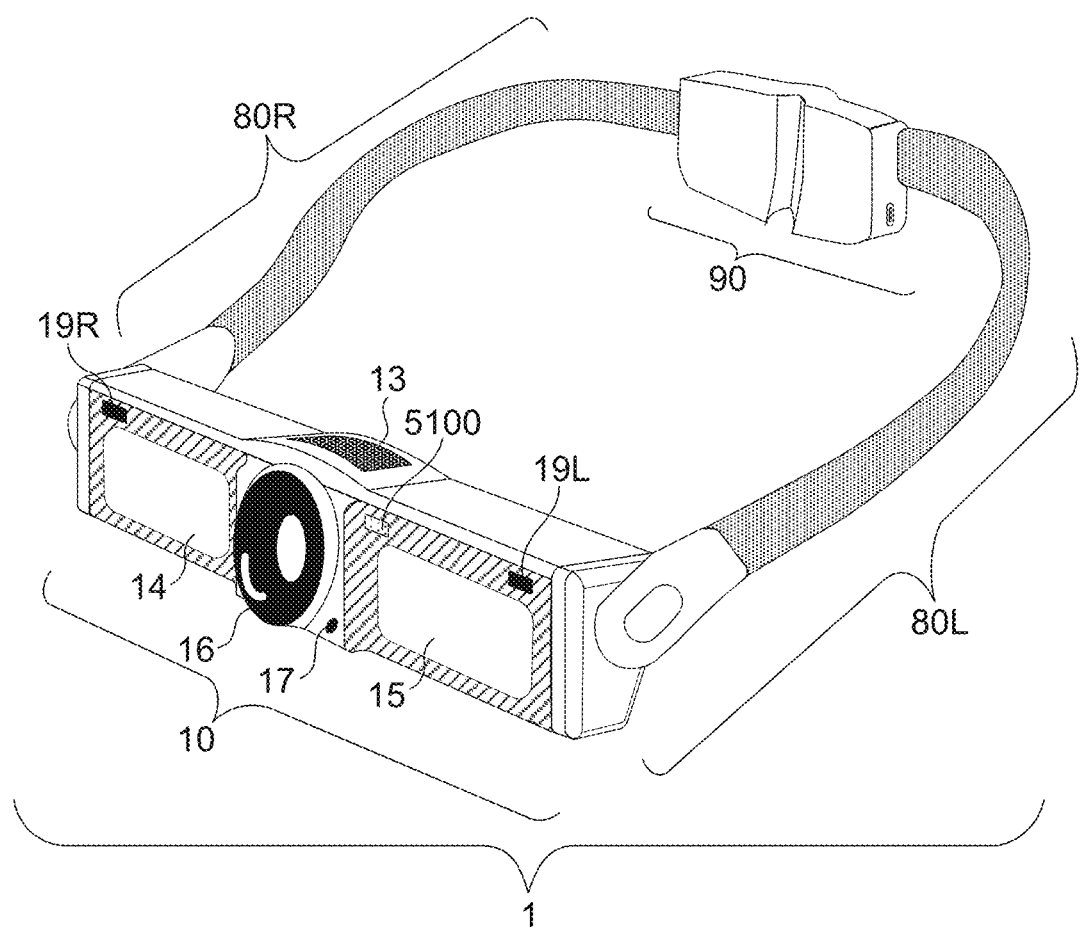
FIG. 25 is an external view showing a camera body that performs a parallax correction process in the fifth embodiment.

FIG. 25 is an external view of the camera body 1 that executes the parallax correction process in this embodiment. The camera body 1 in FIG. 25 differs from the camera body 1 in FIG. 1A in that a distance sensor 5100 is added. In this embodiment, the distance sensor 5100 is provided in an outer edge of the stop switch 15 as shown in FIG. 25. However, a mount position of the distance sensor 5100 is not limited to a certain position.

Figure 26:
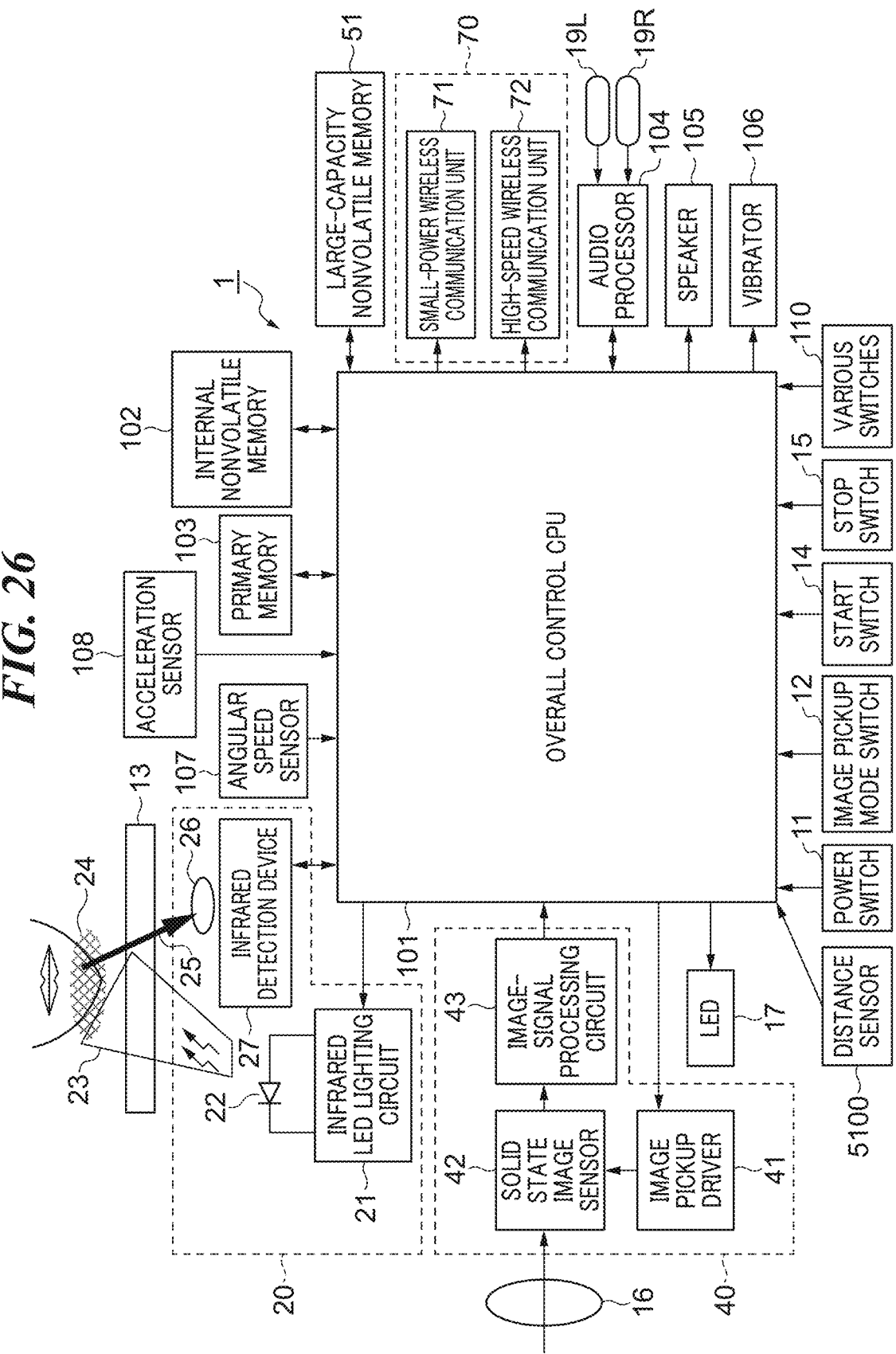
FIG. 26 is a block diagram showing a hardware configuration of the camera body shown in FIG. 25.

FIG. 26 is a block diagram showing a hardware configuration of the camera body 1 shown in FIG. 25. The block diagram in FIG. 26 differs from the block diagram in FIG. 5 in that the distance sensor 5100 is added. The distance sensor 5100 measures a distance to an object. It should be noted that the configuration of the distance sensor 5100 is not limited in particular. In this example, the distance sensor 5100 is an active type sensor that projects infrared light, laser, millimeter wave, etc. to an object and measures a distance to the object by receiving its reflection. Moreover, the distance sensor 5100 may be a passive type sensor like a ToF sensor that measures a distance to an object on the basis of phase difference of incident light through the image pickup lens 16. The distance sensor 5100 is connected to the overall control CPU 101 and is controlled by the overall control CPU 101.

Although the distance to the object is measured by the method using the distance sensor 5100 in this embodiment, this method is not limiting. For example, a distance measurement method using an autofocus (hereinafter referred to as AF) function using the image pickup lens 16 and the solid-state image sensor 42, phase difference, or parallax may be used. Alternatively, the distance may be calculated by AI learning of blur information about the object image.

Next, a method of correcting the extraction position in the calibration by detecting an object in the face direction and measuring or estimating the distance of the detected object in order to correct parallax in consideration of the distance between the camera body 1 and the view position will be described.

Figure 27:
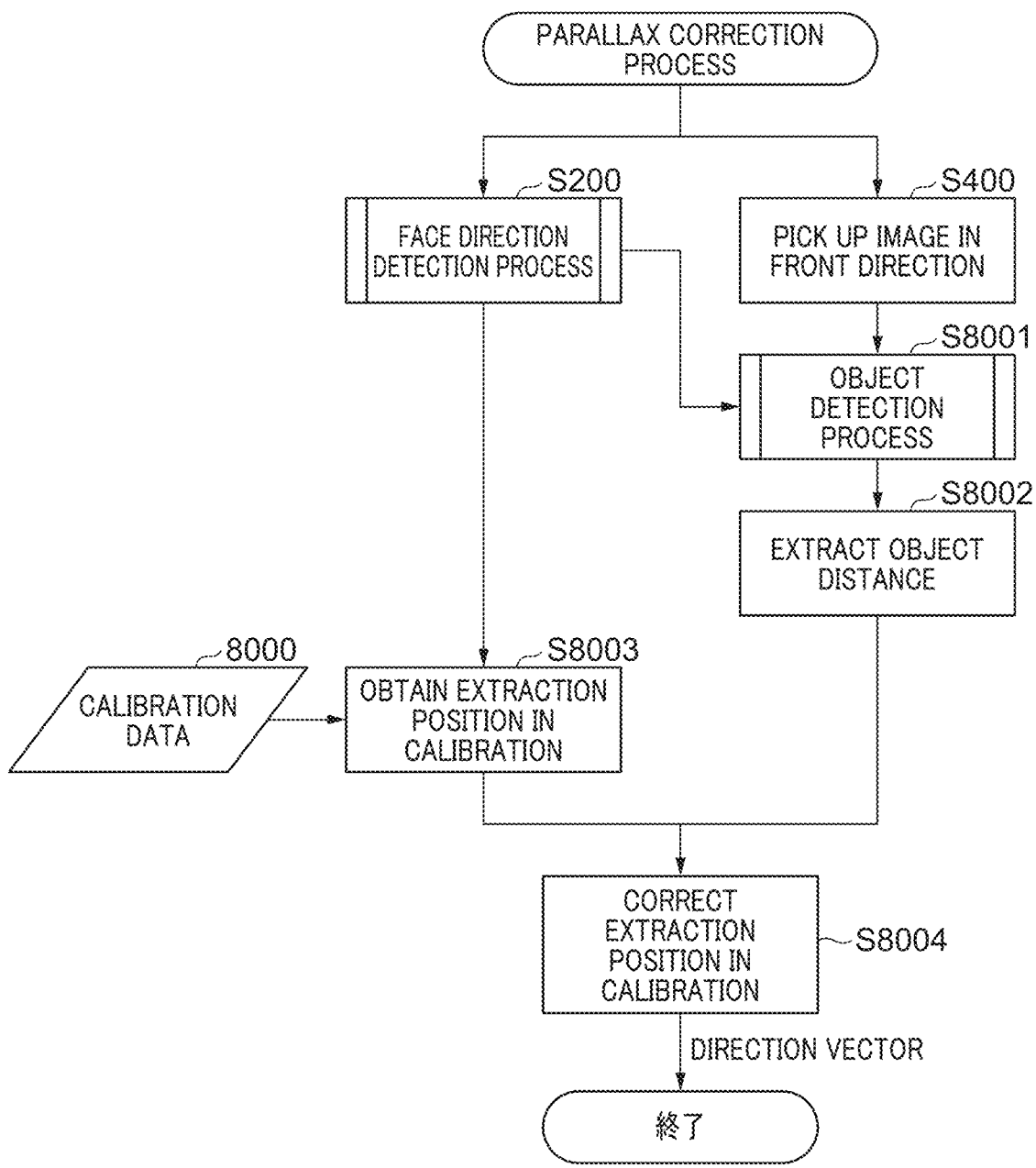
FIG. 27 is a flowchart showing details of the parallax correction process according to the first embodiment.

FIG. 27 is a flowchart showing details of the parallax correction process according to this embodiment. This process is equivalent to a modification of the recording-direction/area determination process in the step S300 in FIG. 7A, and is executed by the overall control CPU 101 (an object detection unit, an object distance detection unit, an obtainment unit, and a correction unit).

In this process, the face direction detection process in the step S200 is performed first, the observation direction is set to be parallel to the detected face direction (visual-line direction), and then the process proceeds to steps S8001 and S8003. In parallel with the step S200, the image pickup unit 40 captures an image in a forward direction of the user (front-direction image pickup) to obtain a superwide-angle image in the step S400, and then the process proceeds to the step S8001.

In the step S8001, the overall control CPU 101 (the object detection unit) performs an object detection process for detecting an object in the observation direction set in the step S400 from the superwide-angle image obtained by the image pickup in the step S200. In a step S8002, the overall control CPU 101 (the object distance detection unit) measures or estimates the distance to the object detected in the step S8001, extracts the object distance from the image pickup unit 40 to the object, and then proceeds with the process to the step S8004.

In a step S8003, the overall control CPU 101 (the obtainment unit) obtains the position of the visual field center of view of the target visual field 125 calculated during calibration as the extraction position and proceeds with the process to the step S8004.

In the step S8004, the overall control CPU 101 (the correction unit) corrects the extraction position obtained in the step S8003. Specifically, first, an angle (hereinafter, referred to as an image pickup angle) of the direction directed from the camera body 1 to the image pickup target (here, the object) is calculated according to the object distances extracted in the step S8002. Next, the extraction position obtained in the step S8003 is corrected based on the calculated image pickup angle. Thereafter, the overall control CPU 101 (an outputting and recording unit) outputs and records the corrected extraction position in the primary memory 103. When this processing is terminated, the process proceeds to the step S500 in FIG. 7A, and the overall control CPU 101 (the development unit) executes the recording-area development process. Although the development process is performed after the image is extracted on the basis of the corrected extraction position in the recording-area development process in the step S500, this configuration is not limiting. That is, the image may be extracted by reading the corrected extraction position from the primary memory 103 after the development process.

Next, the object detection process in the step S8001 in FIG. 27 will be described. In this embodiment, the object detection process using object recognition by machine learning will be described. Although a device that performs the machine learning in the camera body 1 is a dedicated processing device specialized for the machine learning using an ASIC or an FPGA, the device is not limiting. For example, the device may be a neural network processing unit (hereinafter referred to as an NPU, not shown in FIG. 26) or the overall control CPU 101. Although many learning models used for the object recognition by machine learning, such as deep learning, have been proposed, detailed descriptions about these learning models will be omitted in this embodiment. In general object recognition by machine learning, a picked-up image is input to a learning model learned in advance, and information about a type of an object included in the image, such as a person or an animal, and a position (coordinate information) of the recognized object in the image is calculated.

In this embodiment, it is assumed that the image pickup unit 40 picks up the superwide-angle image in the step S400 using the image pickup lens 16 including a fisheye lens or a wide-angle lens. An image picked up using a fisheye lens or a wide-angle lens has optical distortion in a peripheral area of the image. Particularly, a fisheye lens causes strong distortion in a peripheral area. Therefore, it is desirable to perform the object recognition by machine learning after correcting the distortion. In the step S400, the image pickup unit 40 is enough to pick up a wide-angle image whose area is wider than that sensed by human eyes, and the image may not be a superwide-angle image.

Figure 28:
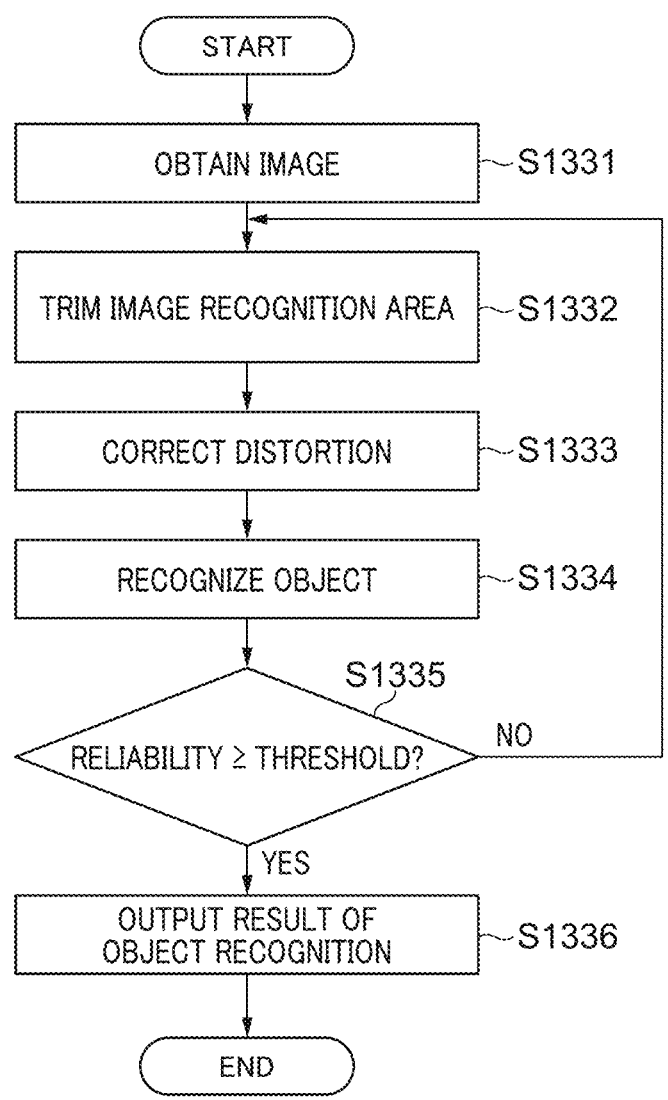
FIG. 28 is a flowchart showing an object detection process in a step S8001 in FIG. 27 using machine learning.

FIG. 28 is a flowchart of the object detection process in the step S8001 in FIG. 27 using the object recognition by machine learning.

In a step S1331, the superwide-angle image picked up in the step S400 is obtained. In a step S1332, an image area centered on the observation direction set in the step S200 is trimmed from the superwide-angle image obtained in the step S1331. In a step S1333, distortion of the image in the area trimmed in the step S1331 is corrected. When the image pickup lens 16 is a fisheye lens, it is desirable to correct distortion by performing perspective projection transformation.

In a step S1334, the object recognition using machine learning is performed to the image of which distortion has been corrected in the step S1333. As the object recognition result, reliability indicating probability of the object recognition is calculated in addition to the information about the type of the object included in the image and the coordinate information.

In a step S1335, it is determined whether the reliability calculated in the step S1334 is equal to or more than a threshold. When the reliability is equal to or more than the threshold (YES in the step S1335), the process proceeds to a step S1336. Otherwise (NO in the step S1335), the process returns to the step S1332, the trimmed image area is widened, and then, the processes form the step S1333 are performed. That is, when the trimmed image area does not include the object that is the observation target 5020 like the target visual field 5045 in FIG. 24A, the trimmed image area is expanded until the object is included.

The object recognition result obtained in the step S1334 is output in the step S1336, and this process is terminated.

As described above, the object detection process in the step S8001 can be performed using the object recognition by the machine learning.

A method of measuring or estimating object distance performed in the step S8002 will now be described. Here, distance measurement using an autofocus (hereinafter, referred to as AF) function or parallax will be described instead of the method using the distance sensor 5100 described above. In general, many fisheye lenses have a fixed focal position, and it is difficult to use the autofocus function. However, when a wide-angle lens having a focal length of 14 mm or 24 mm is used, distance measurement using the AF function is possible. Therefore, a case where the image pickup lens 16 is a wide-angle lens capable of measuring the object distance using the AF function will be described. The distance measurement using the AF function enables calculation of the object distance by contrast AF, phase difference AF, or the like.

Specifically, first, an area (object area) in which the object is estimated to be located in the superwide-angle image is specified on the basis of the object recognition result. Thereafter, in the case of using the contrast AF, images are picked up while driving the focus lens that adjusts the focal position in the image pickup lens 16 in FIG. 5. When the contrast value of the object area reaches the highest position, it is determined that the object is in focus, and the focus lens is stopped. In the meantime, in the case of using the phase difference AF, the phase difference between light beams is measured from the difference between the positions of the light beams passing through the image pickup lens 16 on the image sensor 42. When the phase difference between the light beams from the object area becomes a predetermined phase difference, it is determined that the object is focused, and the focus lens is stopped. In-focus positions (object positions) corresponding to the focus lens positions are calculated in advance. Therefore, in both the contrast AF and the phase difference AF, the distance from the image pickup unit 40 to the object (object distance) can be measured from the focus lens position at which the focus lens is determined to be focused on the object and is stopped.

Even in a method other than the method using the AF function described above, such as a method using the distance sensor 5100, the distance to the object can be easily calculated as long as the object area in the image pickup area can be specified.

Next, the correction of the extraction position obtained in the step S8003 according to the object distance detected in the step S8002 executed in the step S8004 will be described with reference to FIG. 29A and FIG. 29B.

Figure 29A:
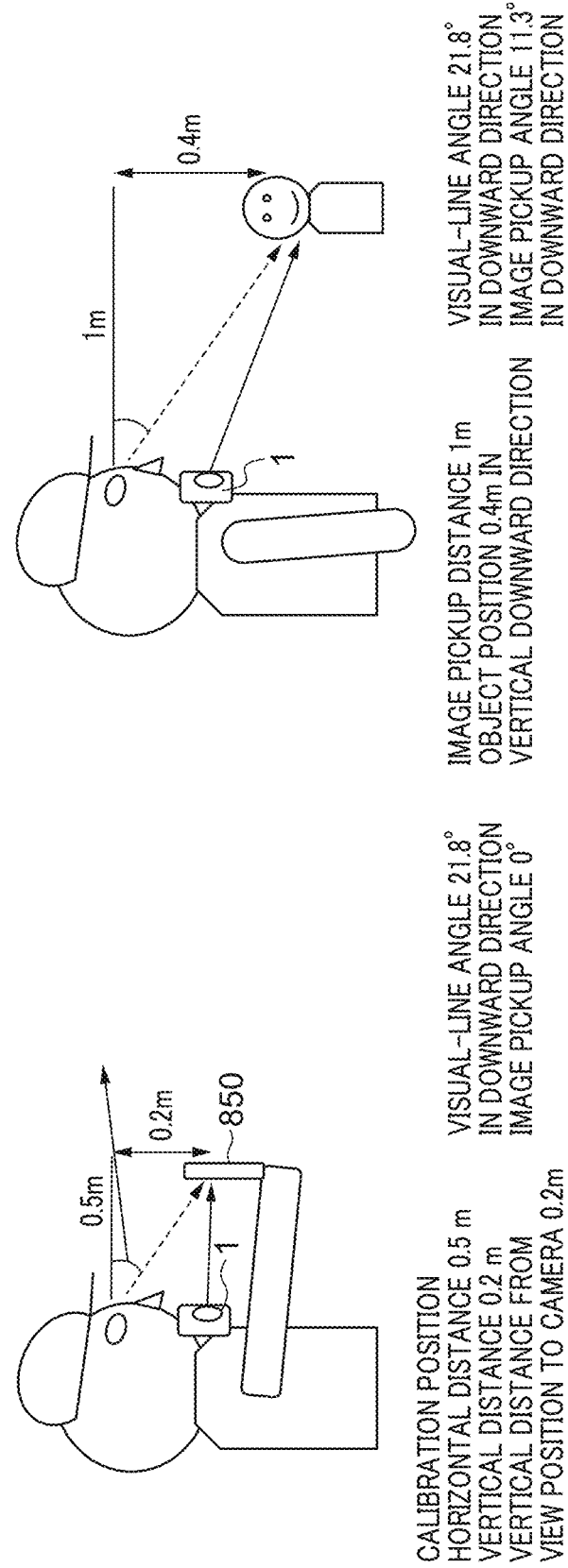
FIG. 29A is a schematic view describing correction in a step S8004 in FIG. 27 with respect to an extraction position calculated during calibration at an image pickup angle of 0 degrees.

In both examples in FIG. 29A and FIG. 29B, the visual-line direction is identical (the visual-line angle is identical) in the calibration (left side) and the image pickup (right side). In the meantime, a horizontal distance from the camera body 1 to the calibrator 850 in the calibration is different from a horizontal distance from the camera body 1 to the object in the image pickup. Therefore, the angle (image pickup angle) in the vertical direction of the direction from the camera body 1 to the calibrator 850 in the calibration is also different from the angle (image pickup angle) in the vertical direction of the direction from the camera body 1 to the object in the image pickup. Hereinafter, as shown in FIG. 29A and FIG. 29B, a case where the horizontal distance from the camera body 1 to the calibrator 850 is 0.5 m and the vertical distance from the view position to the camera body 1 is 0.2 m will be described.

As shown in FIG. 29A, when the vertical distance from the view position to the calibrator 850 in the calibration is 0.2 m in the downward direction, the visual-line angle is 21.8 degrees in the downward direction, and the image pickup angle in the direction from the camera body 1 to the calibrator 850 is 0 degrees. In the meantime, when the horizontal distance from the camera body 1 to the object in the image pickup is 1 m, even if the visual-line angle is 21.8 degrees in the downward direction which is identical to that in the calibration, the vertical distance from the view position to the object is 0.4 m in the downward direction, and the image pickup angle is 11.3 degrees in the downward direction.

Similarly, as shown in FIG. 29B, when the vertical distance from the view position to the calibrators 850 in the calibration is 0.05 m in the downward direction, the visual-line angle is 5.7 degrees in the downward direction and the image pickup angle is 16.7 degrees in the upward direction. In the meantime, when the horizontal distance from the camera body 1 to the object in the image pickup is 4 m, even if the visual-line angle is 5.7 degrees in the downward direction that is identical to that in the calibration, the vertical distance from the view position to the subject is 0.4 m in the downward direction, and the image pickup angle is 2.9 degrees in the downward direction.

Figures 29C, 29D:
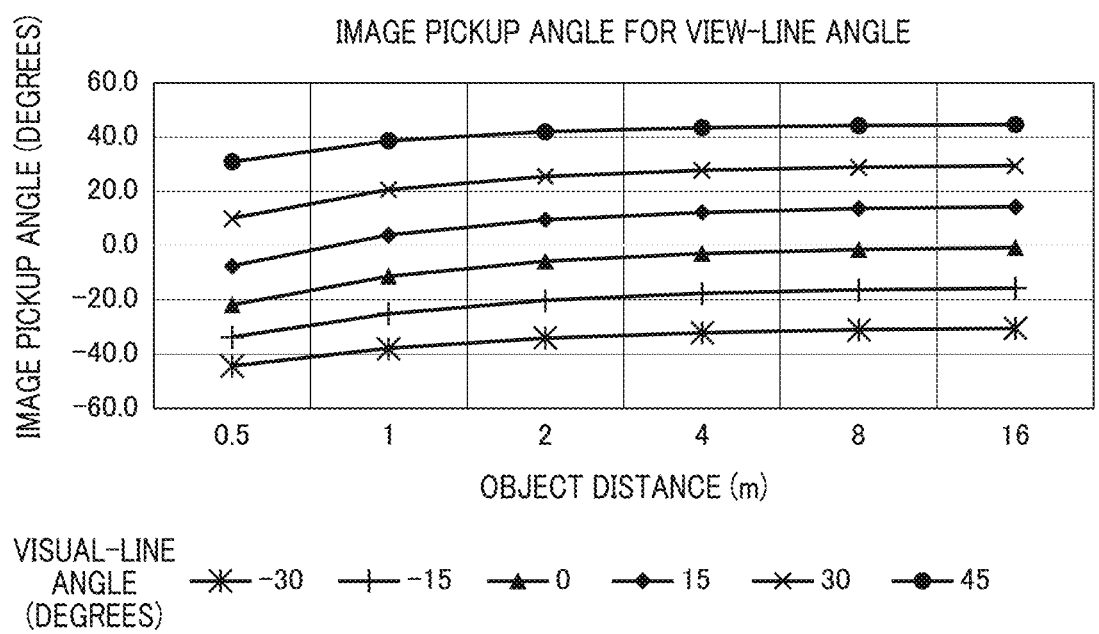
FIG. 29C is a table showing image pickup angles calculated according to object distances for each visual-line angle.
FIG. 29D is a graphical representation of the table in FIG. 29C.

FIG. 29C is a table showing the image pickup angles calculated according to the object distances for each visual-line angle. The angle in the vertical direction is 0 degrees in the front direction, a negative value in the upward direction, and a positive value in the downward direction. FIG. 29D is a graphical representation of the table in FIG. 29C. It is understood that the image pickup angle is corrected downward as the object distance (here, the horizontal distance from the image pickup unit 40 to the object in the image pickup) becomes longer.

When the visual-line angle is fixed in this way, the image pickup angle from the view position to the object can be calculated on the basis of the vertical distance from the camera body 1 to the view position, the horizontal distance from the calibrator 850 to the view position in the calibration, and the horizontal distance from the camera body 1 to the object in the image pickup. This enables to extract the image in the area including the object from the picked-up superwide-angle image.

The distance between the camera body 1 and the view position and the distance between the camera body 1 and the calibrator 850 may be measured in the calibration as described above, or may be set according to physical characteristics, such as height and age of the user. In the case where the camera body 1 is hung on the neck, the vertical distance from the view position to the camera body 1 varies little among individuals, and therefore, the vertical distance may be a predetermined numerical value. Similarly, the horizontal distance from the camera body 1 to the calibrator 850 in the calibration may be a predetermined numerical value because the length of the hand when extended is not so different among individuals.

As described above, the distance from the camera body 1 to the object in the image pickup may be calculated using the distance measured by the AF described above or the distance measured by the distance sensor 5100. The horizontal distance and the vertical distance can be calculated by simple calculation on the basis of the distance measured by such a method and the angles (visual-line angles) in the lateral direction and the vertical direction in which the face is directed.

As shown in FIG. 29C and FIG. 29D, the image pickup angles may be found corresponding to the visual-line angles and the object distances in advance. Alternatively, the image pickup angle may be calculated in the step S8003 every time the object distance is extracted in the step S8002.

The extraction position obtained in the step S8003 is corrected as follows. First, the difference between the image pickup angle when the object is at the calibration position (the position where the horizontal distance from the camera body 1 to the object is 0.5 m) and the image pickup angle when the object is at the position in the image pickup is calculated. Next, the angle in the vertical direction of the extraction position calculated in the calibration is corrected on the basis of the calculated difference.

Although the measurement methods using the distance sensor 5100 and the AF function have been described as examples in this embodiment, the object distance may be measured by other methods. For example, when the object in the image generated by the image-signal processing circuit 43 in FIG. 5 is recognized by the overall control CPU 101, the object of the type whose size is roughly estimated, such as a person or a vehicle, may be detected. In such a case, the object distance may be roughly estimated from the size of the object in the image. The overall control CPU 101 may have functions of estimating approximate age of a person detected as an object and performing personal authentication and may estimate the object distance by using these functions, in addition to the estimation of the object distance according to the type of the object described above.

As described above, in this embodiment, first, the calibration is performed so that the visual field of the user will match the extraction position at infinity. Thereafter, the parallax correction process is performed to correct a deviation of the image pickup angle caused by the parallax in a case where the distance between the user and the observation target is short, that is, to correct a deviation of the extraction position of the image in the image pickup. In this embodiment, the case where the distance between the user who wears and uses the camera body 1 and the object in the image pickup is longer than the distance between the user and the calibrator 850 in the calibration has been described. However, this embodiment is also applicable to a case where the distance to the object in the image pickup is shorter.

Figure 30:
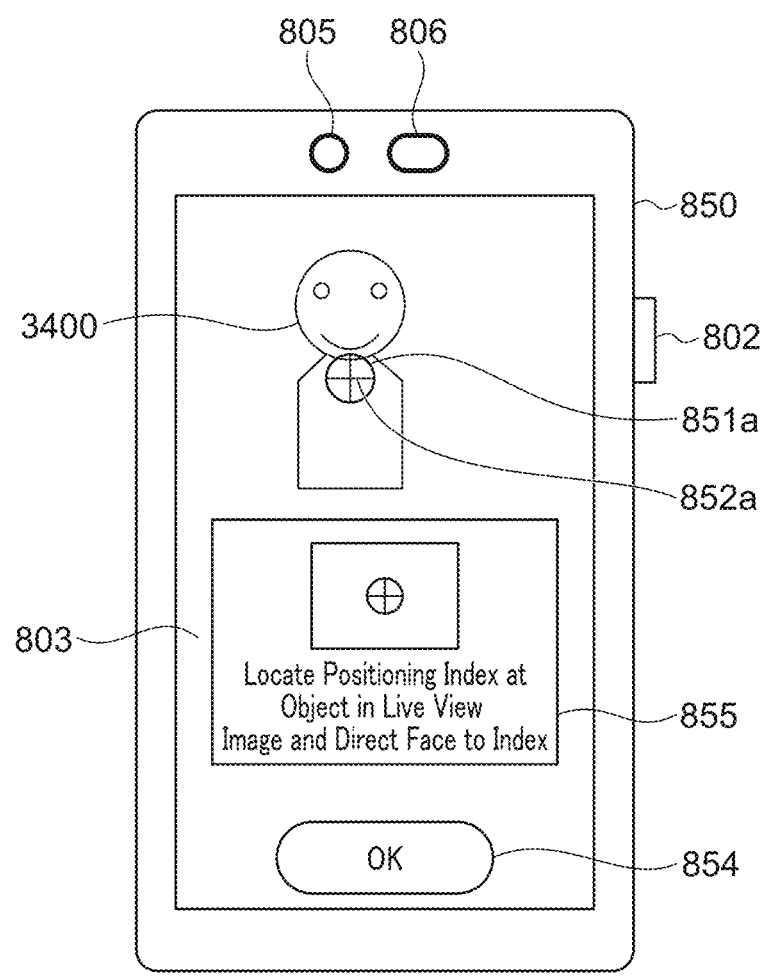
FIG. 30 is a view showing a modification of a screen displayed on the display unit of the calibrator during the calibration operation.

Although the calibration is performed by displaying the screen shown in FIG. 22A on the display unit 803 of the calibrators 850 in this embodiment, this is not limiting. For example, a live view image 3400 of an object to be picked up may be superimposed as shown in FIG. 30 in the calibration. At this time, first and second instructions are displayed as the instruction display 855. The first instruction instructs the user to hold the calibrator 850 so that a center 852a of a positioning index 851a will be located on the live view image 3400 of the object. The second instruction instructs the user to direct a face toward the center 852a (to look at the positioning index 851a). When the user adjusts the holding position of the calibrator 850 and the face direction according to these instructions and then presses the calibration button 854, the display-apparatus controller 801 of the calibrator 850 determines that these adjustments have been made. In this case, the display-apparatus controller 801 (a transmission unit) transmits a calibration start instruction to the camera body 1 via the high-speed wireless communication unit 872. Thus, the visual-line angle in the image pickup can be set appropriately in the calibration.

Next, a second embodiment will be described. In the first embodiment, the extraction position of the image obtained in the calibration is corrected according to the distance between the user who wears and uses the camera body 1 and the calibrator 850 in the calibration and the distance (object distance) between the user and the object in the image pickup. In the meantime, in this embodiment, a deviation of a default image extraction position caused by parallax is corrected on the basis of a face direction and an object distance detected in image pickup without performing calibration.

Figure 31:
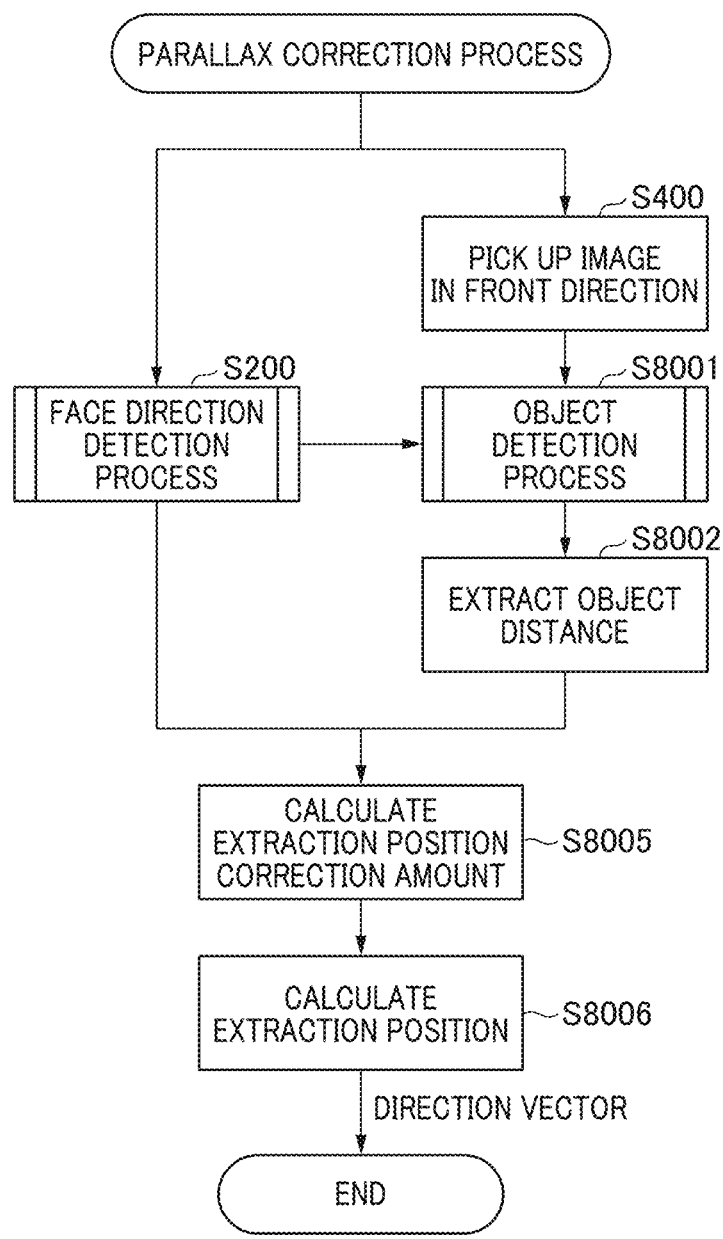
FIG. 31 is a flowchart showing details of the parallax correction process according to a second embodiment.

FIG. 31 is a flowchart showing details of a parallax correction process according to this embodiment. This process is different from the parallax correction process (FIG. 27) of the first embodiment in that an extraction position correction amount is calculated from the face direction (visual-line angle) and the object distance without performing the calibration and the default image extraction position is corrected on the basis of the calculated correction amount. That is, in this process, when the processes in the steps S200 and S8002 are finished, the process proceeds to a step S8005 described below. Hereinafter, the descriptions of the steps S200, S400, S8001, and S8002 overlapping with FIG. 27 will be omitted, and steps from the step S8005 of this process will be described.

In the step S8005, the overall control CPU 101 (a calculation unit) calculates the extraction position correction amount according to the face direction (visual-line angle) detected in the step S200 and the object distance extracted in the step S8002. And then, the process proceeds to a step S8006.

In the step S8006, the extraction position is calculated. Specifically, the overall control CPU 101 (an obtainment unit) first obtains a pre-recorded default image extraction position (an extraction position when the image pickup angle is 0 degrees) from the internal nonvolatile memory 102. Next, the overall control CPU 101 corrects the default image extraction position on the basis of the extraction position correction amount calculated in the step S8005 and calculates the extraction position. And then, this process ends.

Figures 32, 33A:
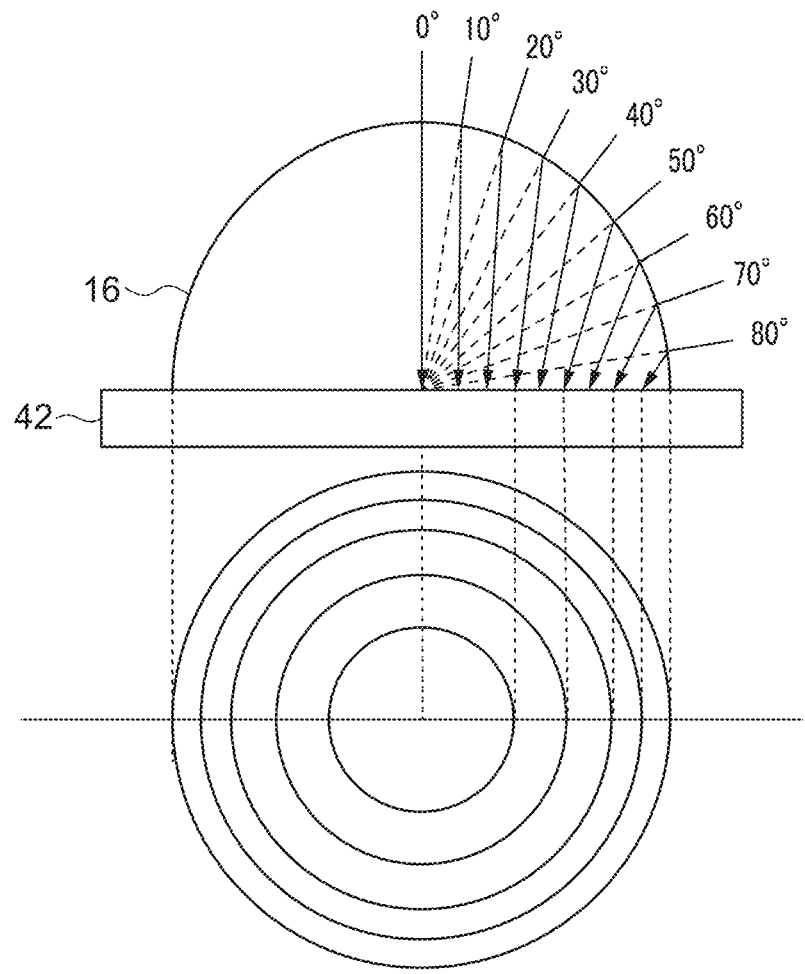
FIG. 32 is a table showing an extraction position correction amount calculated according to an object distance and a visual-line angle in a step S8005 in FIG. 31.
FIG. 33A is a view schematically showing a relation between a solid state image sensor and light beams incident through the image pickup lens.

FIG. 32 is a table showing an extraction position correction amount calculated according to an object distance and a visual-line angle in the step S8005. FIG. 32 shows an extraction position correction amount corresponding to an object distance for each visual-line angle when the vertical distance from the view position to the camera body 1 is 0.2 m. When the visual line is directed below the horizontal direction, the visual-line angle becomes negative. When the visual line is directed above the horizontal direction, the visual-line angle becomes positive.

All the extraction position correction amounts shown in FIG. 32 are positive values. This shows that the extraction positions in the image pickup are shifted upward from the corresponding default image extraction positions. It is understood from the table in FIG. 32 that a shift amount of an extraction position in the image pickup from a default image extraction position becomes smaller as an object distance becomes longer and that the shift amount in the upper direction becomes larger as the object distance becomes shorter. It is also understood that the value of the extraction position correction amount is maximized when the visual-line angle is about 15 degrees. In this way, the extraction position correction amount can be obtained from the vertical distance from the view position to the camera body 1, the visual-line angle, and the object distance. The extraction position correction amounts shown in the table in FIG. 32 may be calculated in advance, or may be calculated each time the object distance is extracted. As can be seen from the table in FIG. 32, variation of the extraction position correction amount is small in the range of the visual-line angle from 30 degrees to 15 degrees regardless of the object distance. Therefore, in a case where the visual-line angle falls within such a range, a uniform extraction position correction amount may be calculated according to the object distance. For example, the extraction position correction amount at the visual-line angle of 0 degrees may be set as the extraction position correction amount at the visual-line angle in such a range.

Next, a method of calculating the image extraction position in the step S8006 will be described. Hereinafter, a case where the image pickup lens 16 in FIG. 5 is an equidistant projection fisheye lens will be described as an example.

FIG. 33A is a view schematically showing a relation between the solid-state image sensor 42 and light rays incident via the image pickup lens 16. An upper part of FIG. 33A schematically shows a relation between the light rays and image forming positions when the solid-state image sensor 42 is viewed from a plane parallel to the optical axis of the image pickup lens 16. A lower part of FIG. 33A shows a relation between the incident angles of the light rays and the image forming positions when the image forming surface of the solid-state image sensor 42 is viewed from the optical axis. Here, a case where the image pickup lens 16 is the equidistant projection fisheye lens having the field angle corresponding to the incident angle of ±90 degrees with respect to the optical axis as shown in FIG. 33A will be described.

As shown in FIG. 33A, height of an image formed on the solid-state image sensor 42 is proportional to an incident angle of a light ray to the image pickup lens 16 that is an equidistant projection fisheye lens. When height of an image formed on an image plane is represented by T and an incident angle of a light ray with respect to the optical axis direction is represented by θ, T=θ/90 is given.

Figure 33B:
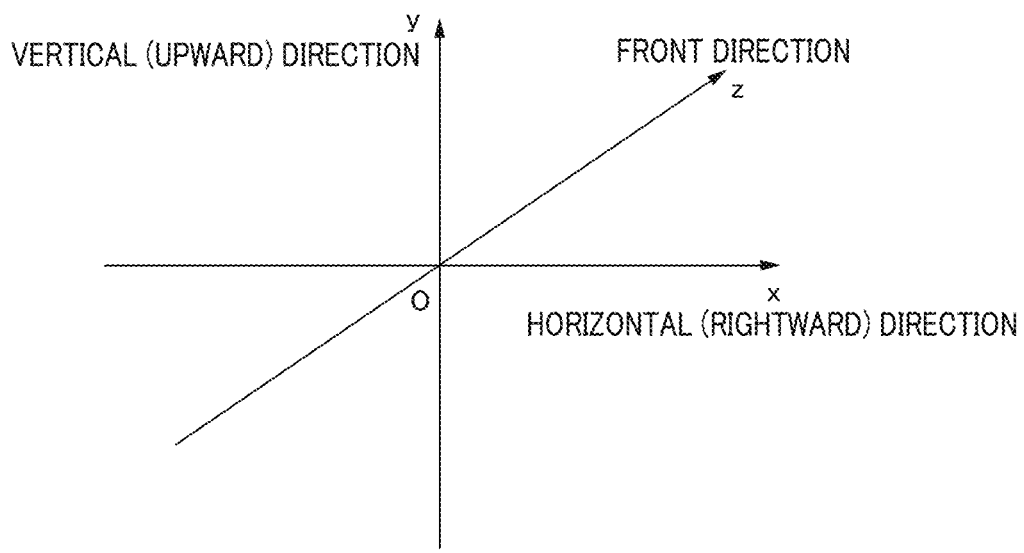
FIG. 33B is a view defining a (x, y, z) coordinate indicating horizontal, vertical, and front directions of components of the visual-line direction.
Figure 33C:
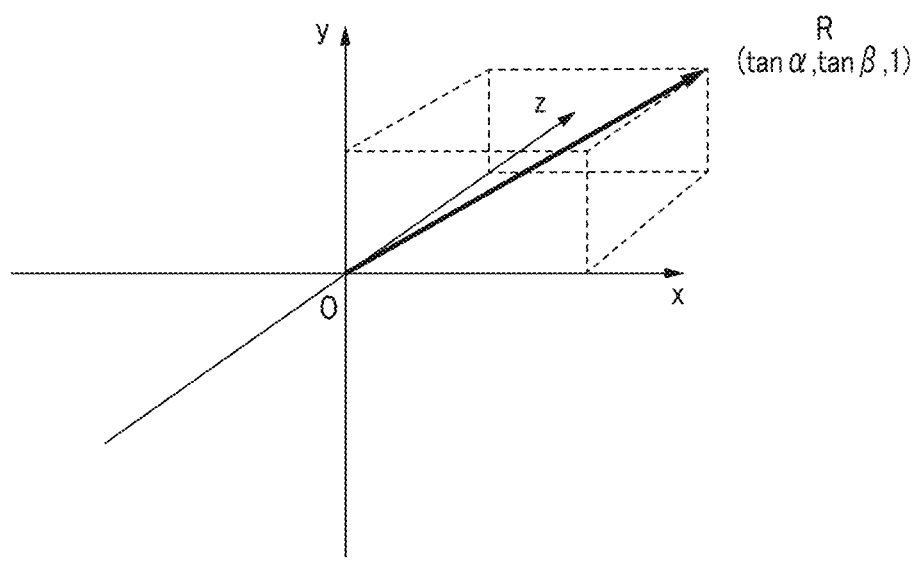
FIG. 33C is a view showing an example of the visual-line direction.
Figure 33D:
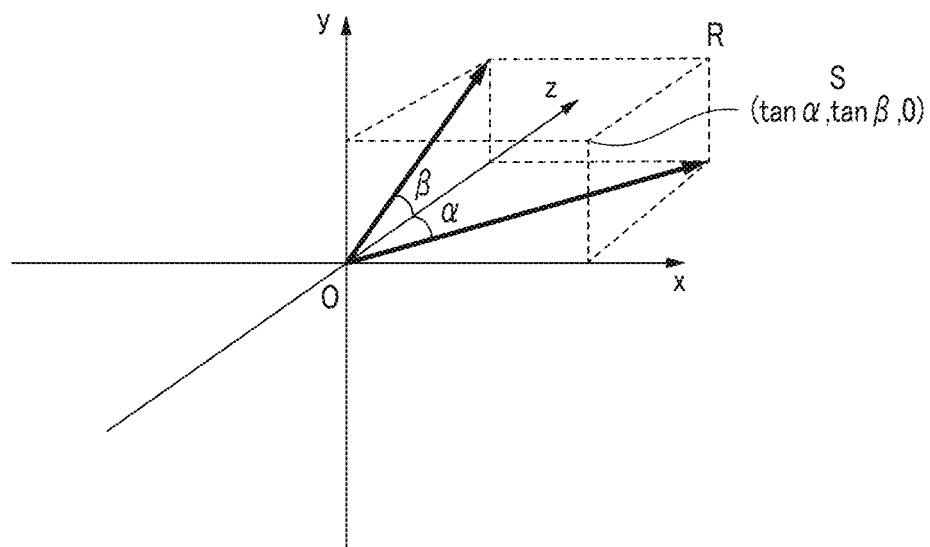
FIG. 33D is a view showing angles formed by the visual-line direction and a horizontal direction, a vertical direction, and a z-axis as the front direction.

Hereinafter, in the description of the visual-line direction, as shown in FIG. 33B, the visual-line direction is represented by (x, y, z) coordinates indicating respective directions of horizontal, vertical, and front components. The vertical direction indicates an up/down direction. The front direction indicates a forward direction of the user, that is, an optical axis direction of the image pickup unit 40. For example, when the visual-line direction R shown in FIG. 33C is divided into a horizontal component and a vertical component as shown in 33D, angles formed by the horizontal and vertical components and the z-axis in the front direction are represented by a and B, and the coordinate in the z-direction is "1", the coordinate of the end point of the visual-line direction R becomes (tan α, tan β, 1).

Therefore, an angle A formed by the visual-line direction R and the optical axis direction (z-axis direction (0, 0, 1)) is represented by a formula 2 by an inner product operation of the vectors.

$$\cos A = \frac{1}{\sqrt{\tan^2 \alpha + \tan^2 \beta + 1}} \qquad \text{Formula 2}$$

The distance from the optical axis center on the image plane, that is, the image height T is represented by T=Δ/90.

Figure 33E:
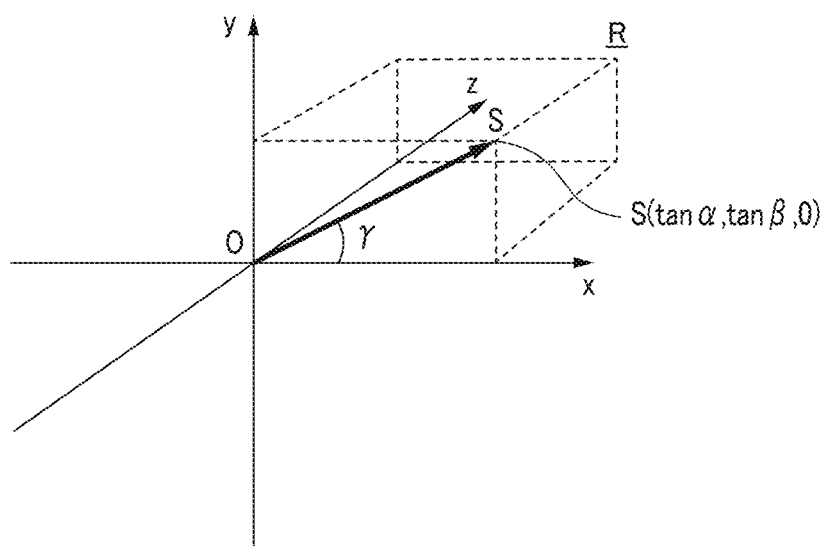
FIG. 33E is a view showing a mapping position of the visual-line direction on an x-y plane.
Figure 33F:
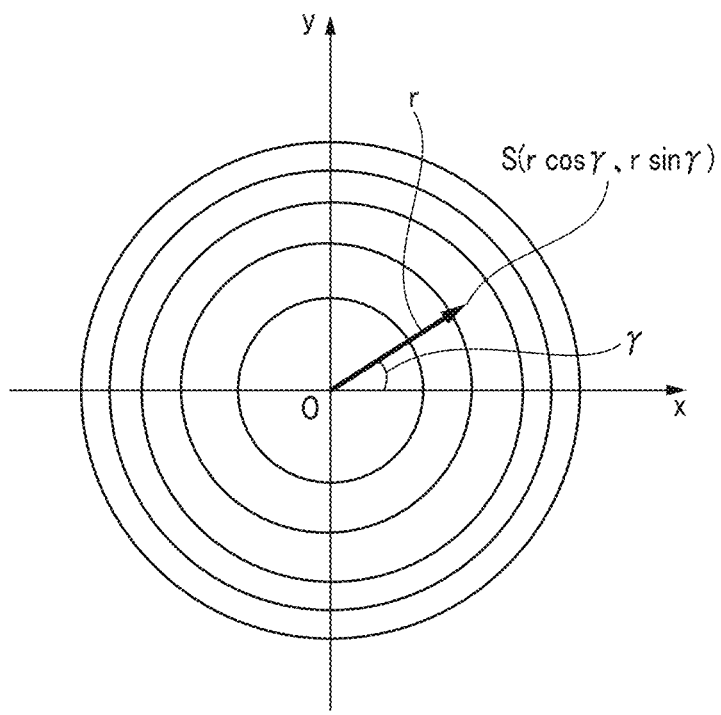
FIG. 33F is a view showing an extraction position of an image centered on an optical axis position.
Figure 34A:
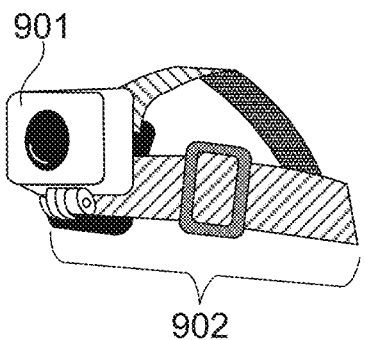
FIG. 34A and FIG. 34B are views showing a configuration example of a camera fixed to a head using a conventional fixing-to-head accessory.
Figure 34B:
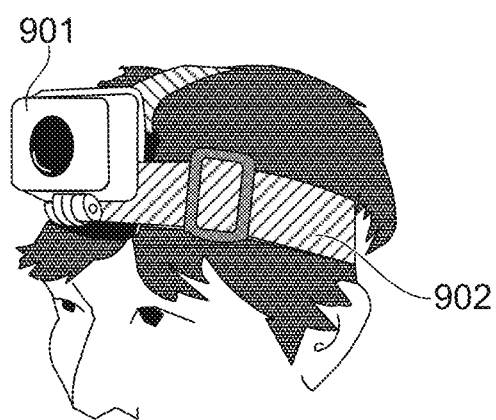

In the meantime, as shown in FIG. 33E, a mapping position S of the visual-line direction R on the xy plane becomes (tan α, tan β, 0), and an angle γ formed with the x-axis on the image plane is represented by tan γ=tan β/tan α. That is, the image extraction position centering the optical axis position can be represented by (r·cos γ, r·sin γ) as shown in FIG. 33F, which enables calculation of the image forming position, i.e., the image extraction position from the visual-line direction R.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-000730, filed Jan. 5, 2023, which is hereby incorporated by reference herein in its entirety.

What is claimed is:

1. An image pickup apparatus to be worn on a body part of a user other than a head of the user, the image pickup apparatus comprising:
a first image pickup unit that obtains a wide-angle image;
a memory device that stores a set of instructions; and
at least one processor that executes the set of instructions to:
detect a visual-line direction of the user;
set an observation direction of the first image pickup unit to be parallel to the visual-line direction;
obtain an image extraction position from the wide-angle image;
detect an object in the observation direction from the wide-angle image in picking up an image of the object;
detect an object distance from the first image pickup unit to the object;
correct the image extraction position according to the visual-line direction and the object distance; and
output and record a corrected image extraction position to a memory.

2. The image pickup apparatus according to claim 1, wherein the at least one processor executes instructions in the memory device to develop an image extracted from the wide-angle image at the corrected image extraction position.

3. The image pickup apparatus according to claim 1, wherein the at least one processor executes instructions in the memory device to correct the image extraction position so as to be closer to the first imaging unit from the view position of the user as the detected object distance becomes shorter.

4. The image pickup apparatus according to claim 1, wherein the at least one processor executes instructions in the memory device to recognize the object by machine learning.

5. The image pickup apparatus according to claim 4, wherein the at least one processor executes instructions in the memory device to detect the object distance by using an autofocus function.

6. The image pickup apparatus according to claim 5, wherein the at least one processor executes instructions in the memory device to detect the object distance by using a contrast autofocus function.

7. The image pickup apparatus according to claim 5, wherein the at least one processor executes instructions in the memory device to detects the object distance by using a phase difference autofocus function.

8. The image pickup apparatus according to claim 4, wherein the at least one processor executes instructions in the memory device to detect the object distance by using a distance sensor.

9. The image pickup apparatus according to claim 8, wherein the distance sensor is a ToF sensor.

10. The image pickup apparatus according to claim 1, wherein the position other than the head of the user is under a jaw of the user,
further comprising a second image pickup unit that picks up an image of the jaw of the user, and
wherein the at least one processor executes instructions in the memory device to detect the visual-line direction from the image of the jaw picked up by the second image pickup unit.

11. The image pickup apparatus according to claim 10, wherein the first image pickup unit is attached at a position farther from the jaw than the second image pickup unit and picks up an image in a forward direction of the user.

12. The image pickup apparatus according to claim 1, wherein the at least one processor executes instructions in the memory device to:
determine the image extraction position according to the visual-line direction in calibration; and
correct the determined image extraction position according to the object distance in image pickup.

13. The image pickup apparatus according to claim 1, wherein the at least one processor executes instructions in the memory device to:
obtain a default image extraction position;
calculate an image extraction position correction amount according to the visual-line direction and the object distance; and
correct the default image extraction position according to the image extraction position correction amount.

14. The image pickup apparatus according to claim 13, wherein the at least one processor executes instructions in the memory device to decrease the image extraction position correction amount as the detected object distance increases.

15. A control method for an image pickup apparatus including an image pickup unit configured to obtain a wide-angle image and is worn on a body part of a user other than a head of the user, the control method comprising:
   detecting a visual-line direction of the user;
   setting an observation direction of the image pickup unit to be parallel to the visual-line direction;
   obtaining an image extraction position from the wide-angle image;
   detecting an object in the observation direction from the wide-angle image in picking up an image of the object;
   detecting an object distance from the image pickup unit to the object;
   correcting the image extraction position according to the visual-line direction and the object distance; and
   outputting and recording a corrected image extraction position to a memory.

16. A non-transitory computer-readable storage medium storing a control program causing a computer to execute a control method for an image pickup apparatus including an image pickup unit configured to obtain a wide-angle image and is worn on a body part of a user other than a head of the user, the control method comprising:
   detecting a visual-line direction of the user;
   setting an observation direction of the image pickup unit to be parallel to the visual-line direction;
   obtaining an image extraction position from the wide-angle image;
   detecting an object in the observation direction from the wide-angle image in picking up an image of the object;
   detecting an object distance from the image pickup unit to the object;
   correcting the image extraction position according to the visual-line direction and the object distance; and
   outputting and recording a corrected image extraction position to a memory.

\* \* \* \* \*